US012567805B2

(12) United States Patent
Sigamani et al.

(10) Patent No.: US 12,567,805 B2
(45) Date of Patent: Mar. 3, 2026

(54) VOLTAGE CONVERTER WITH WIDE RANGE OUTPUT

(71) Applicant: Advanced Energy Industries, Inc., Denver, CO (US)

(72) Inventors: James Sigamani, Manila (PH); Jonathan Ross Bernardo Fauni, Quezon (PH); Raphael Victor Luna Canseco, Pasig (PH)

(73) Assignee: AES GLOBAL HOLDINGS PTE. LTD., Singapore (SG)

( * ) Notice: Subject to any disclaimer, the term of this patent is extended or adjusted under 35 U.S.C. 154(b) by 250 days.

(21) Appl. No.: 18/398,502

(22) Filed: Dec. 28, 2023

(65) Prior Publication Data

US 2025/0219537 A1 Jul. 3, 2025

(51) Int. Cl.
*H02M 3/158* (2006.01)
*H02M 1/00* (2006.01)

(52) U.S. Cl.
CPC ......... *H02M 3/158* (2013.01); *H02M 1/0048* (2021.05)

(58) Field of Classification Search
CPC ............................ H02M 3/158; H02M 1/0048
See application file for complete search history.

(56) References Cited

U.S. PATENT DOCUMENTS

| | | | |
|---|---|---|---|
| 6,272,023 B1 * | 8/2001 | Wittenbreder .... | H02M 3/33592 |
| | | | 363/16 |
| 9,602,011 B1 * | 3/2017 | Baker ............... | H02M 3/33507 |
| 2023/0006540 A1 * | 1/2023 | Wang .................. | H02M 1/0095 |
| 2023/0327566 A1 * | 10/2023 | Lee ................... | H02M 3/33571 |

* cited by examiner

*Primary Examiner* — Rafael O De Leon Domenech

(57) ABSTRACT

A power conversion apparatus comprises a voltage bus has a first rail, a second rail, and a plurality of switch legs coupled between the first rail and the second rail, each switch leg has a switch assembly. A first resonant assembly is coupled in series with a first transformer assembly, and a second resonant assembly coupled in series with a second transformer assembly. The first resonant assembly and the first transformer assembly are coupled between a first switch leg of the plurality of switch legs and a second switch leg of the plurality of switch legs. The second resonant assembly and the second resonant assembly are coupled between the second switch leg and a third switch leg of the plurality of switch legs.

20 Claims, 39 Drawing Sheets

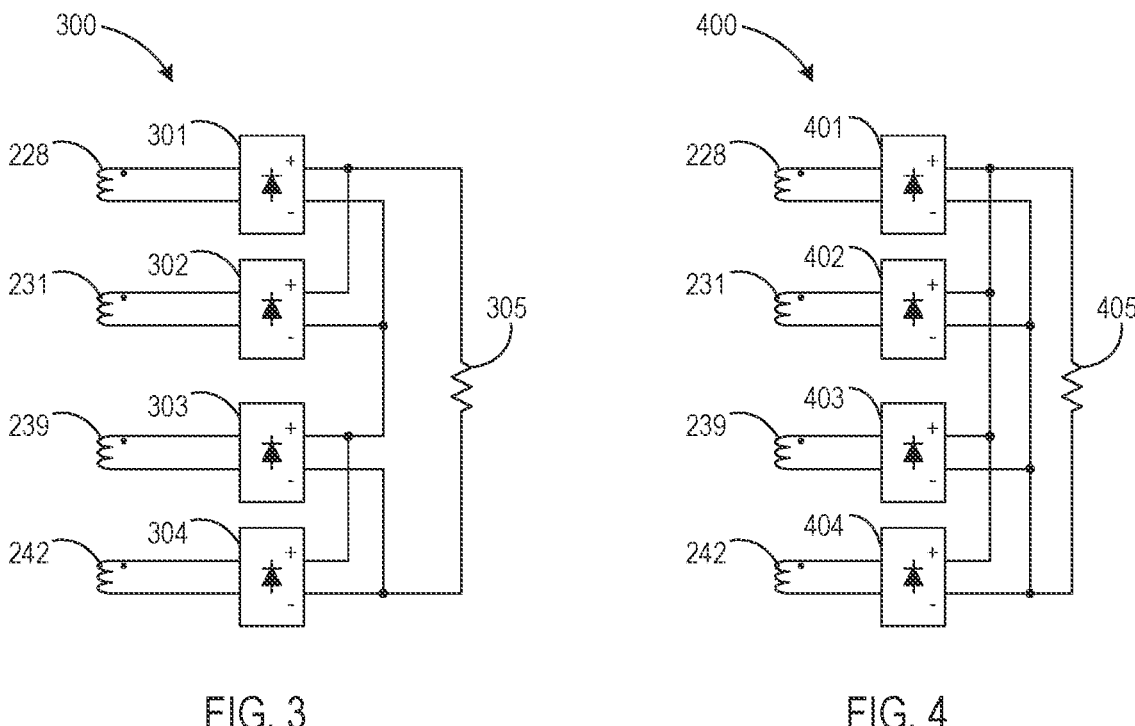
FIG. 3                        FIG. 4
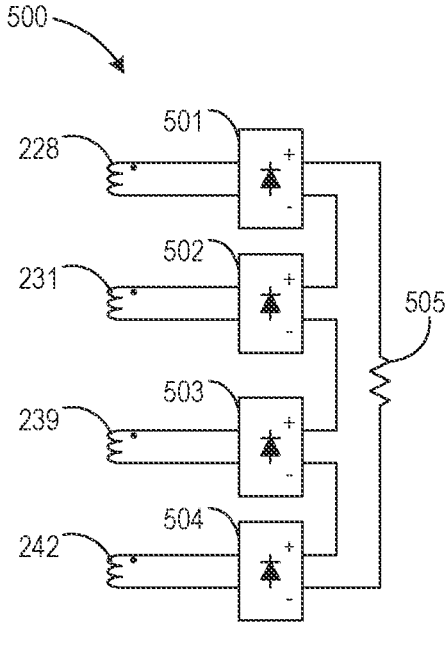
FIG. 5

600

700

VOLTAGE CONVERTER WITH WIDE RANGE OUTPUT

TECHNICAL FIELD

Aspects of the disclosure relate to output power distribution, and more particularly to power converters having configurable output voltages.

BACKGROUND

A power supply unit is an electrical device that supplies electric power to an electrical load. Indeed, power supply units typically have a power input connection, which receives energy in the form of electric current from a source, and one or more power output connections that deliver current to the load. The primary function of a power supply is to convert electric current from a source to a correct voltage, current, and frequency to power a load. Indeed, a power supply unit may perform a variety of functions, such as, but not limited to, power conversion, alternating current to direct current (AC-DC) or DC-DC conversion, adjusting voltage levels, and providing backup power during power grid outages.

Some uses for power conversion include providing charging energy to a battery such as a battery in an electric vehicle (EV). EV charging benefits from voltage converters with a wide output voltage range. For example, extreme conditions like deeply discharged batteries can benefit from ultra-wide range output. In addition to being capable of providing a wide output voltage range, such voltage converters are desired to achieve a high degree of efficiency such as an efficiency greater than 98%. A strategy for providing a wide output voltage range with high efficiency is, therefore, desirable.

SUMMARY

In accordance with one aspect of the present disclosure, a power conversion apparatus comprises a voltage bus has a first rail, a second rail, and a plurality of switch legs coupled between the first rail and the second rail, each switch leg has a switch assembly. A first resonant assembly is coupled in series with a first transformer assembly, and a second resonant assembly coupled in series with a second transformer assembly. The first resonant assembly and the first transformer assembly are coupled between a first switch leg of the plurality of switch legs and a second switch leg of the plurality of switch legs. The second resonant assembly and the second resonant assembly are coupled between the second switch leg and a third switch leg of the plurality of switch legs.

In accordance with another aspect of the present disclosure, a power converter comprises a voltage bus configured to receive a voltage from a power source, the voltage bus including a first rail and a second rail. The power converter also comprises a first switch leg having a switch assembly coupled to the voltage bus, a second switch leg having a switch assembly coupled to the voltage bus, and a third switch leg having a switch assembly coupled to the voltage bus. A first resonant assembly and a first transformer assembly are coupled in series between the first switch leg and the second switch leg, and a second resonant assembly and a second transformer assembly are coupled in series between the second switch leg and the third switch leg. A controller is coupled with the switch assemblies of the first, second, and third switch legs and configured to control the first, second, and third switch legs to generate a voltage in the first and second transformer assemblies based on the voltage from the power source.

BRIEF DESCRIPTION OF THE DRAWINGS

The drawings illustrate embodiments presently contemplated for carrying out the invention.

In the drawings:

FIG. 3 is a schematic block diagram of an output diode assembly according to one or more embodiments.

FIG. 4 is a schematic block diagram of an output diode assembly according to one or more embodiments.

FIG. 5 is a schematic block diagram of an output diode assembly according to one or more embodiments.

Figure 1:
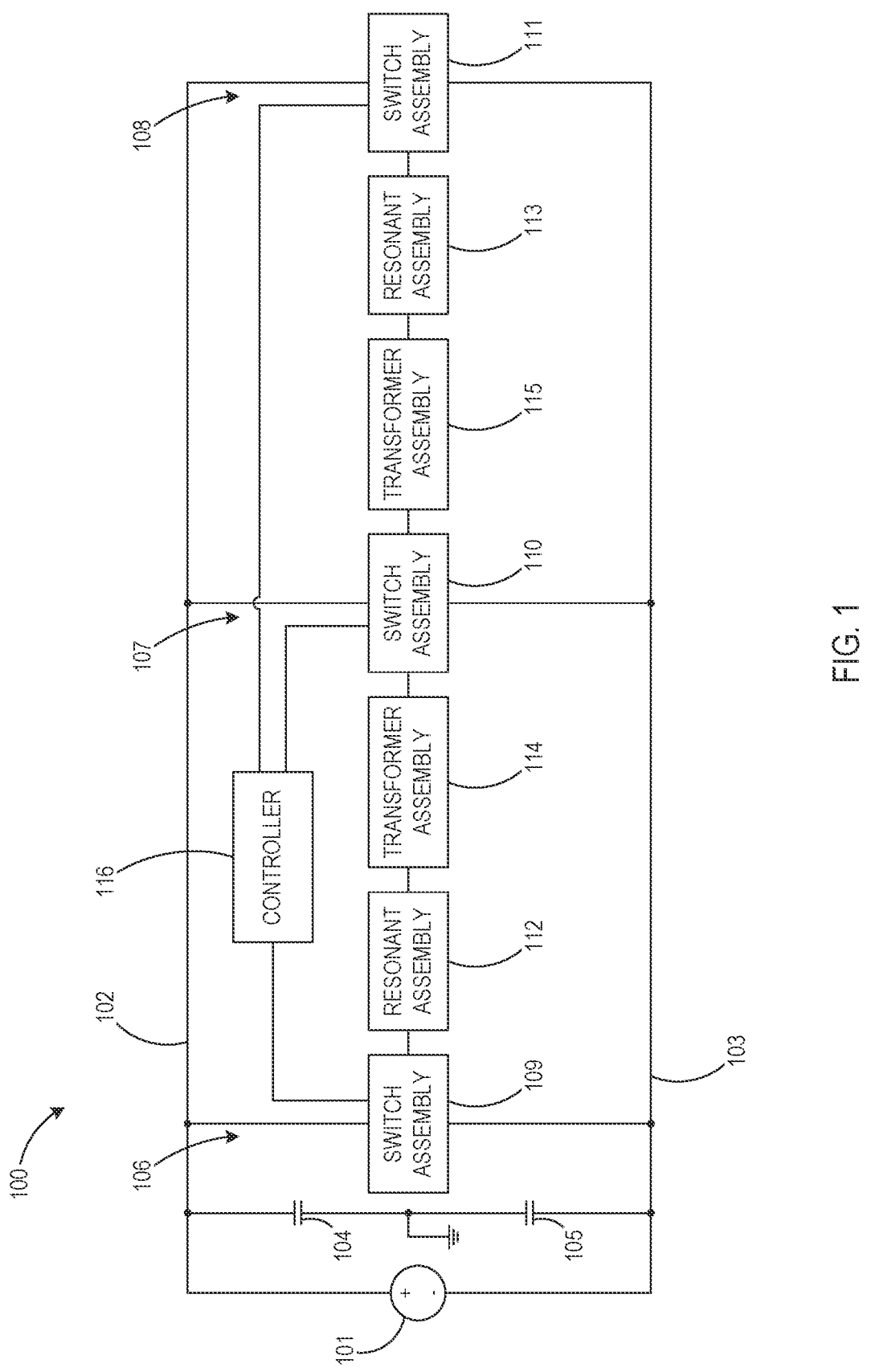
FIG. 1 is a schematic block diagram of a voltage converter according to one or more embodiments.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

FIG. 1 is a schematic block diagram of a voltage converter 100 according to an embodiment. A voltage source 101 is coupled to a voltage bus having a positive rail 102 and a negative rail 103. A pair of capacitors 104, 105 are respectively coupled between the positive and negative rails 102, 103 and a common ground.

In one embodiment, the voltage converter 100 is an LLC converter configurable by the controller 116 to be operated in a plurality of operating modes described herein. The voltage converter 100 includes a plurality of switch legs 106-108 coupled in parallel across the voltage bus 102, 103. Each leg includes a respective switch assembly 109-111 comprising one or more switching devices or components as described in various embodiments herein. A first resonant assembly 112 is illustrated coupled to switch assembly 109 between switch legs 106, 107, and a second resonant assembly 113 is coupled to switch assembly 111 between switch legs 107, 108. A first transformer assembly 114 is positioned between the resonant assembly 112 and the switch assembly 110, and a second transformer assembly 115 is positioned between the resonant assembly 113 and the switch assembly 110.

A controller 116, coupled to the switch assemblies 109-111, is configured to control switch elements of the switch assemblies 109-111 during voltage conversion operations. As described herein, various switch control schemes may be used by the controller 116 to electrically arrange the switch assemblies 109-111, resonant assemblies 112-113, and transformer assemblies 114-115 in configurable coupling arrangements as described herein.

Figure 2:
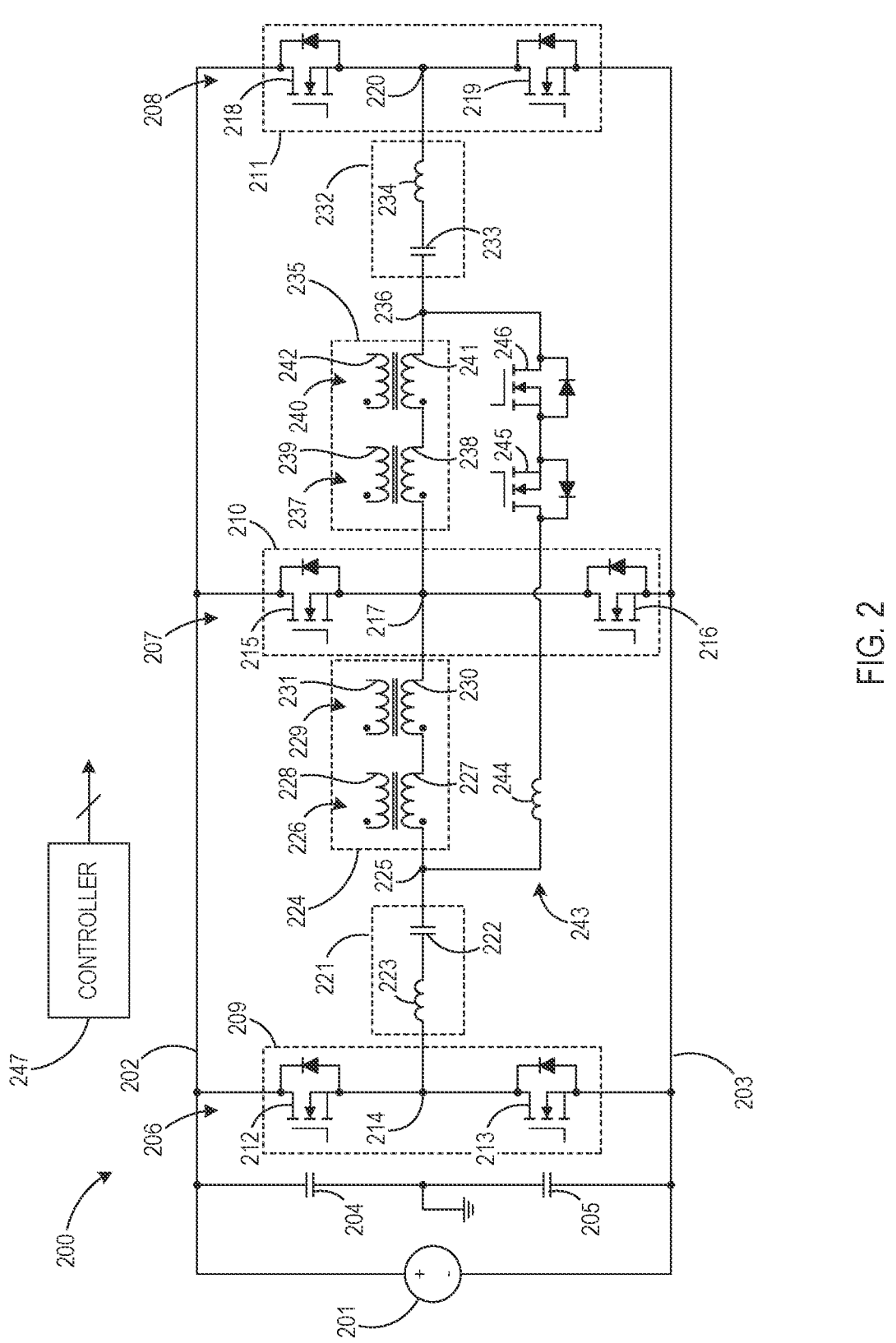
FIG. 2 is a schematic diagram illustrating a portion of the voltage converter of FIG. 1 according to one or more embodiments.

FIG. 2 shows a schematic diagram of a voltage converter 200 illustrating circuit elements of the voltage converter 100 of FIG. 1 according to an embodiment. A voltage source 201 is coupled to a voltage bus having a positive rail 202 and a negative rail 203. A pair of capacitors 204, 205 are respectively coupled between the positive and negative rails 202, 203 and a common ground.

The voltage converter 200 includes a plurality of switch legs 206-208 coupled in parallel across the voltage bus 202, 203. Each of the switch assemblies 209-211 in switch legs 206, 207, 208 comprises a pair of serially coupled switching devices such as metal oxide semiconductor field-effect transistor controllable switches (MOSFETs). Switch assembly 209 includes switching devices 212, 213 serially coupled between the positive and negative bus rails 202, 203 via a common node 214. Switch assembly 210 includes switching devices 215, 216 serially coupled between the positive and negative bus rails 202, 203 via a common node 217. Switch assembly 211 includes switching devices 218, 219 serially coupled between the positive and negative bus rails 202, 203 via a common node 220.

A first resonant assembly 221 coupled to switch assembly 209 between switch legs 206, 207 includes a resonant capacitor 222 and a resonant inductor 223. A first transformer assembly 224 coupled with the resonant assembly 221 via a common node 225 is illustrated positioned between the resonant assembly 221 and the switch assembly 210 and includes a pair of serially-coupled transformers 226, 229. The primary windings 227, 230 of the transformers 226, 229 are serially coupled together and with the resonant assembly 221. A second resonant assembly 232 coupled to switch assembly 211 between switch legs 207, 208 includes a resonant capacitor 233 and a resonant inductor 234. A second transformer assembly 235 coupled with the resonant assembly 232 via a common node 236 is illustrated positioned between the resonant assembly 232 and the switch assembly 210 includes a pair of serially-coupled transformers 237, 240. The primary windings 238, 241 of the transformers 237, 240 are serially coupled together and with the resonant assembly 232. While the transformer assemblies 224, 235 are illustrated as being coupled between the respective resonant assemblies 221, 232 and the switch assembly 210, either or both of the resonant assemblies 221, 232 may alternatively be positioned between the respective transformer assemblies 224, 235 and the switch assembly 210.

The secondary windings 228, 231, 239, 242 are coupled to rectifier bridges in one embodiment to complete conversion of the energy of the voltage source 201 to provide an output voltage to a load. FIGS. 3-5 illustrate embodiments of secondary side schematics coupleable to the secondary windings 228, 231, 239, 242 according to various examples. In FIG. 3, an output diode assembly 300 is illustrated that includes four rectifier or diode bridges 301-304 coupleable to the secondary windings 228, 231, 239, 242. The diode bridges 301-304 in FIG. 3 are arranged in a parallel stacked arrangement. That is, the outputs of diode bridges 301, 302 are coupled in parallel, and the outputs of diode bridges 303, 304 are coupled in parallel. The positive outputs of the diode bridges 303, 304 are coupled in series with the negative outputs of the diode bridges 301, 302 to stack the parallel bridge pairs. A load 305 is coupled in parallel across the positive outputs of the diode bridges 301, 302 and the negative outputs of the diode bridges 303, 304. In an example of a voltage of 220 V across each of the secondary windings 228, 231, 239, 242, a voltage of 440 V is generated across the load 305.

In FIG. 4, an output diode assembly 400 is illustrated that includes four rectifier or diode bridges 401-404 coupleable to the secondary windings 228, 231, 239, 242. The diode bridges 401-404 in FIG. 4 are arranged in a parallel only arrangement. That is, the outputs of all of the diode bridges 401-404 are coupled in parallel. A load 405 is coupled in parallel across the positive and negative outputs of the diode bridges 401-404. the parallel only arrangement illustrated in FIG. 4 keeps the same voltage across any one of the secondary windings 228, 231, 239, 242. For example, a voltage of 220 V across each of the secondary windings 228, 231, 239, 242 generates 220 V across the load 405.

In FIG. 5, an output diode assembly 500 is illustrated that includes four rectifier or diode bridges 501-504 coupleable to the secondary windings 228, 231, 239, 242. The diode bridges 501-504 in FIG. 5 are arranged in a stacked only arrangement. That is, the outputs of diode bridges 501, 502 are coupled in series to stack their outputs. As shown, the positive output of the diode bridge 504 is coupled in series with the negative output of the diode bridge 503, the positive output of the diode bridge 503 is coupled in series with the negative output of the diode bridge 502, and the positive output of the diode bridge 502 is coupled in series with the negative output of the diode bridge 501. A load 505 is coupled in series with the positive output of diode bridge 501 and the negative outputs of the diode bridge 504. The parallel stacked arrangement illustrated in FIG. 5 quadruples the voltage across any one of the secondary windings 228, 231, 239, 242. For example, a voltage of 220 V across each of the secondary windings 228, 231, 239, 242 generates 880 V across the load 505.

Figure 6:
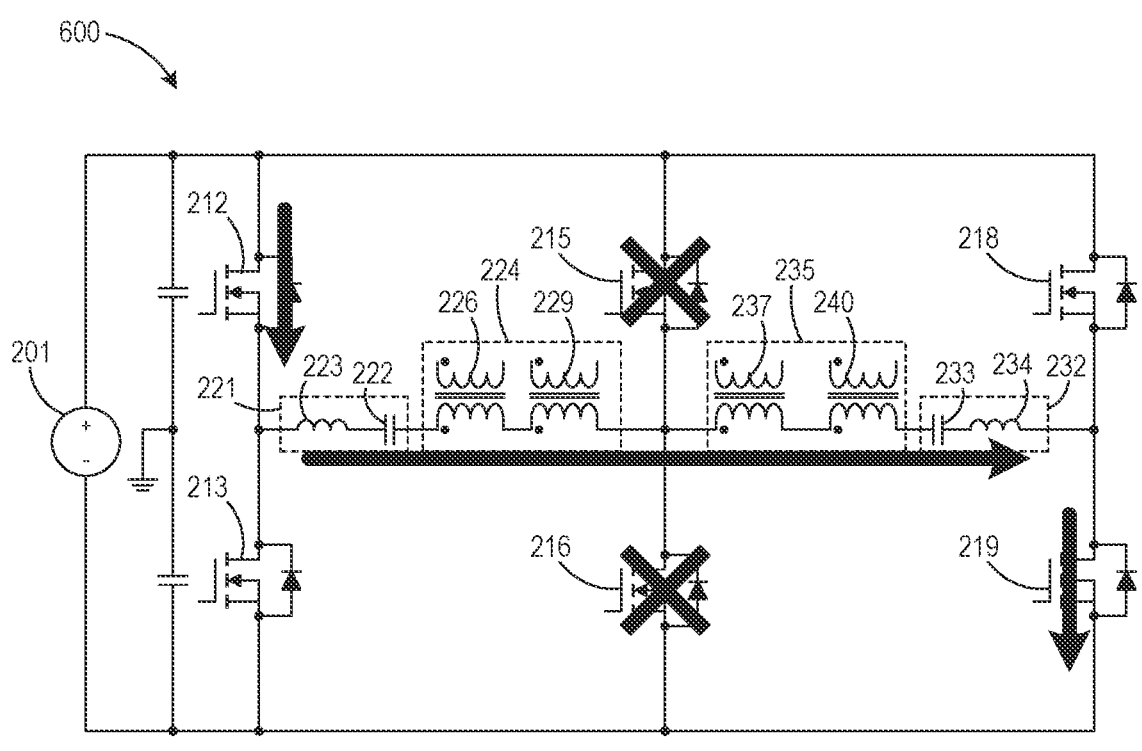
FIGS. 6 and 7 illustrate operational modes of the voltage converter of FIG. 2 during a first control scheme according to one or more embodiments.
Figure 7:
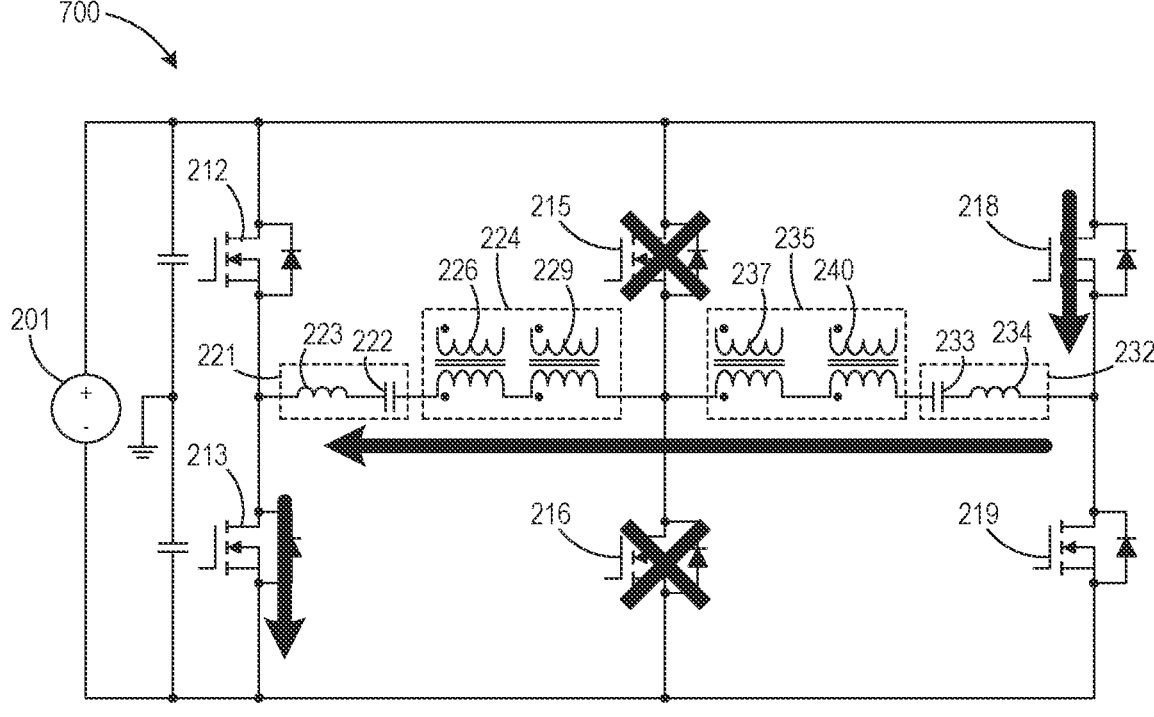

Based on the arrangement of the voltage converter 200 of FIG. 2, multiple control schemes may be used to operate the voltage converter 200 to produce output voltages in a wide range of values with a high efficiency. A first control scheme is illustrated in FIGS. 6 and 7 that show two operating modes 600, 700 of a full bridge operation in which the four transformers 226, 229, 237, 240 are operated in series (e.g., a four-transformer-in-series full bridge operational control scheme). In the first operating mode 600 of FIG. 6, switching devices 212, 219 are controlled into their conducting modes, and switching devices 213, 218 are controlled into their non-conducting modes. In this manner, current from the voltage source 201 flows through the resonant assemblies 221, 232 and the transformer assemblies 224, 235 as indicated by the bold arrows. In the second operating mode 700, switching devices 213, 218 are controlled into their conducting modes, and switching devices 212, 219 are controlled into their non-conducting modes. Accordingly, current from the voltage source 201 flows in an opposite direction through the resonant assemblies 221, 232 and the transformer assemblies 224, 235 as indicated. In both operating modes 600, 700, switching devices 215, 216 remain controlled into their non-conducting modes to facilitate the series connection of the transformer assemblies 224, 235.

Figure 8:
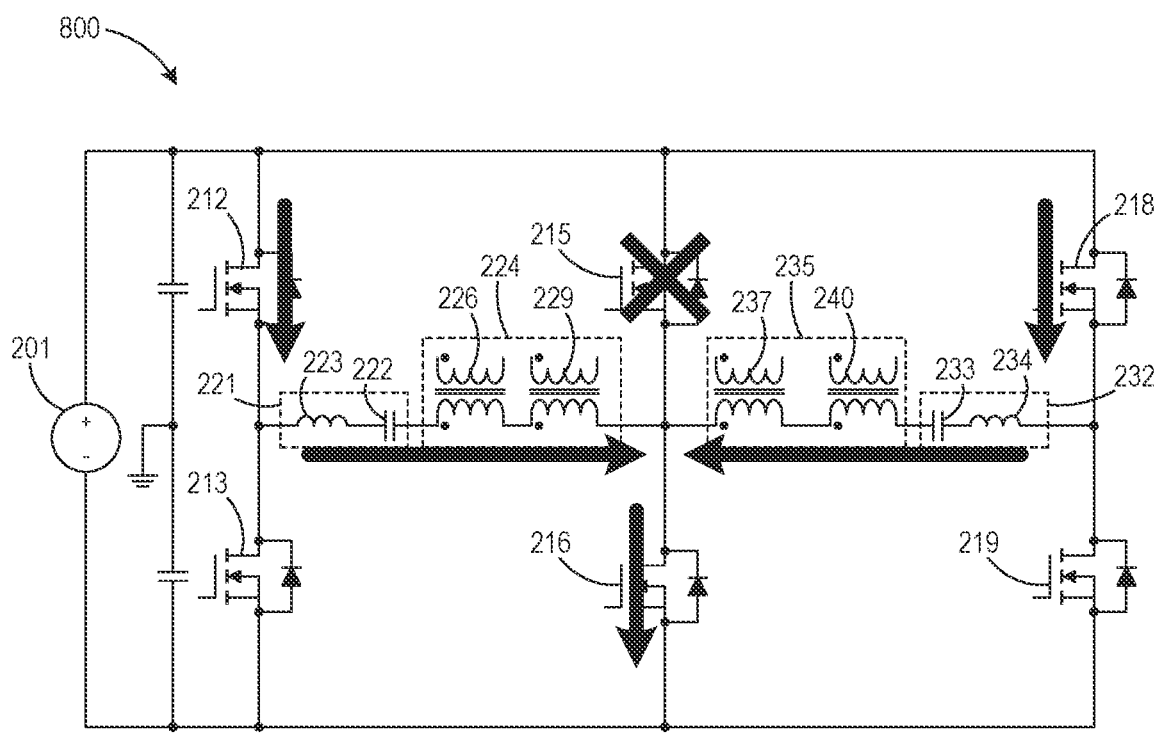
FIGS. 8 and 9 illustrate operational modes of the voltage converter of FIG. 2 during a second control scheme according to one or more embodiments.
Figure 9:
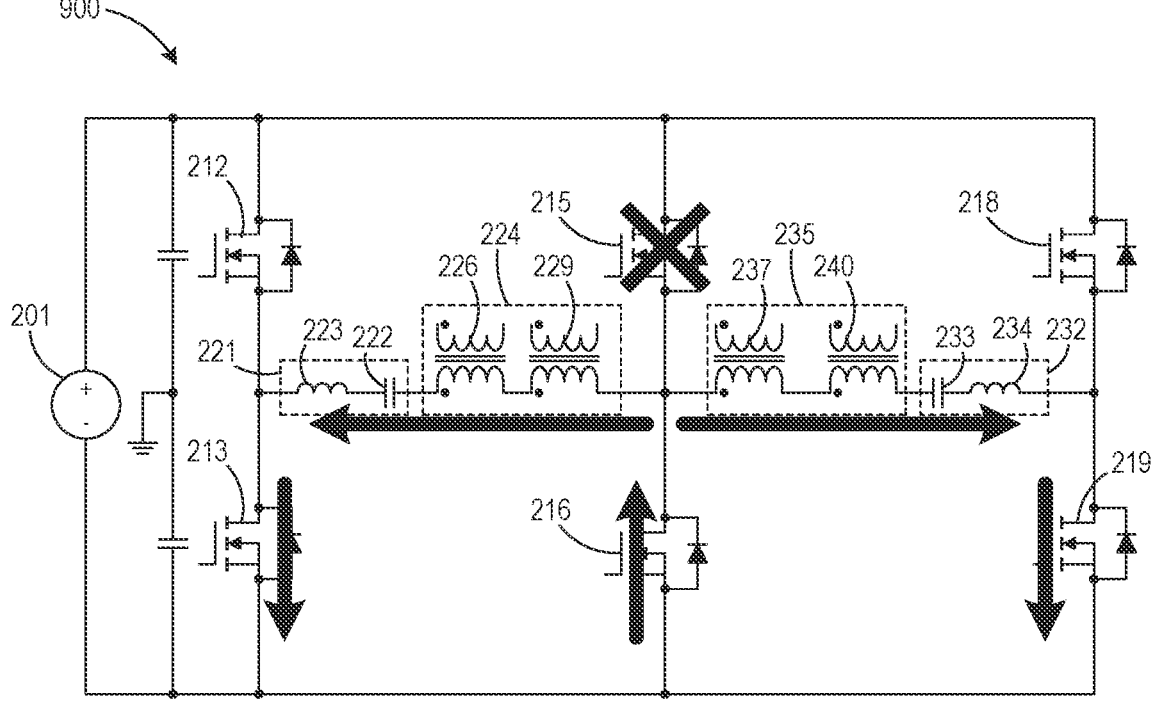

A second control scheme is illustrated in FIGS. 8 and 9 that show two operating modes 800, 900 of a parallel half bridge operation in which the transformer assemblies 224, 235 are operated in parallel (e.g., a two-transformer-in-series parallel half bridge operational control scheme). In the first operating mode 800 of FIG. 8, switching devices 212, 216, 218 are controlled into their conducting modes, and switching devices 213, 219 are controlled into their non-conducting modes. In this manner, current from the voltage source 201 flows through the resonant assemblies 221, 232 and the transformer assemblies 224, 235 in contrary directions as indicated by the bold arrows. In the second operating mode 900, switching devices 213, 216, 219 are controlled into their conducting modes, and switching devices 212, 218 are controlled into their non-conducting modes. Accordingly, stored energy causes a current to flow in an opposite direction through the resonant assemblies 221, 232 and the transformer assemblies 224, 235 as indicated. In both operating modes 800, 900, switching device 216 remains controlled into its conducting mode, and switching device 215 remains controlled into its non-conducting mode to facilitate the parallel connection of the transformer assemblies 224, 235.

Figure 10:
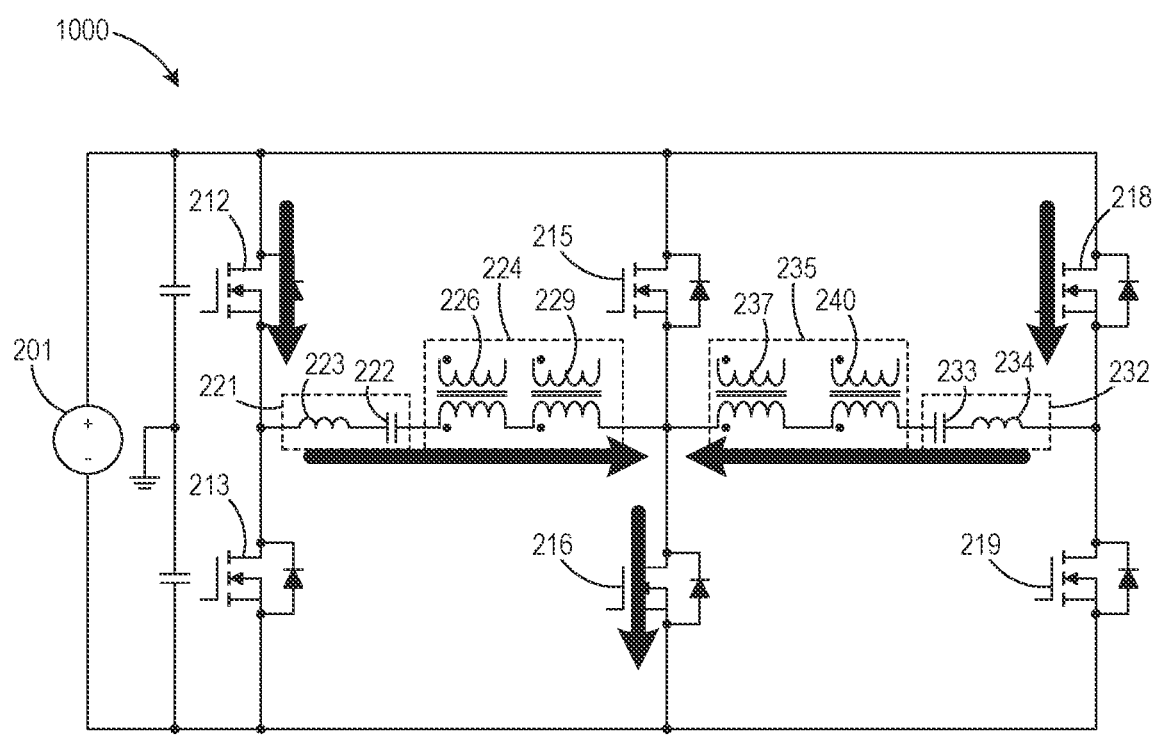
FIGS. 10 and 11 illustrate operational modes of the voltage converter of FIG. 2 during a third control scheme according to one or more embodiments.
Figure 11:
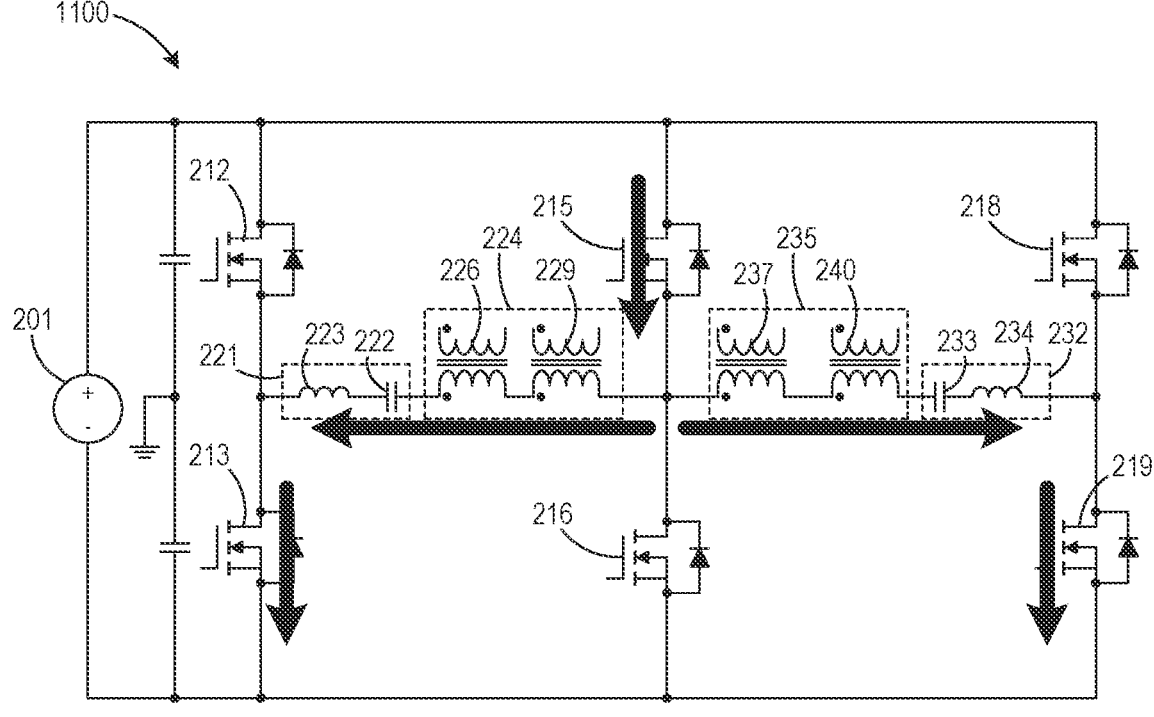

A third control scheme is illustrated in FIGS. 10 and 11 that show two operating modes 1000, 1100 of a parallel full bridge operation in which the transformer assemblies 224, 235 are operated in parallel (e.g., a two-transformer-in-series parallel full bridge operational control scheme). In the first operating mode 1000 of FIG. 10, switching devices 212, 216, 218 are controlled into their conducting and in a similar manner as the first operating mode 800 of FIG. 8. In the second operating mode 1100, switching devices 213, 215, 219 are controlled into their conducting modes, and switching devices 212, 216, 218 are controlled into their non-conducting modes. In this manner, current from the voltage source 201 flows in an opposite direction through the resonant assemblies 221, 232 and the transformer assemblies 224, 235 as indicated. In the operating modes 1000, 1100, none of the switching devices 212-219 remains in its non-conducting mode during both of the operating modes 1000, 1100. As described, in operating mode 1000, switching devices 212, 216, 218 are conducting while switching devices 213, 215, 219 are non-conducting. In operating mode 1100, the reverse happens.

Figure 12:
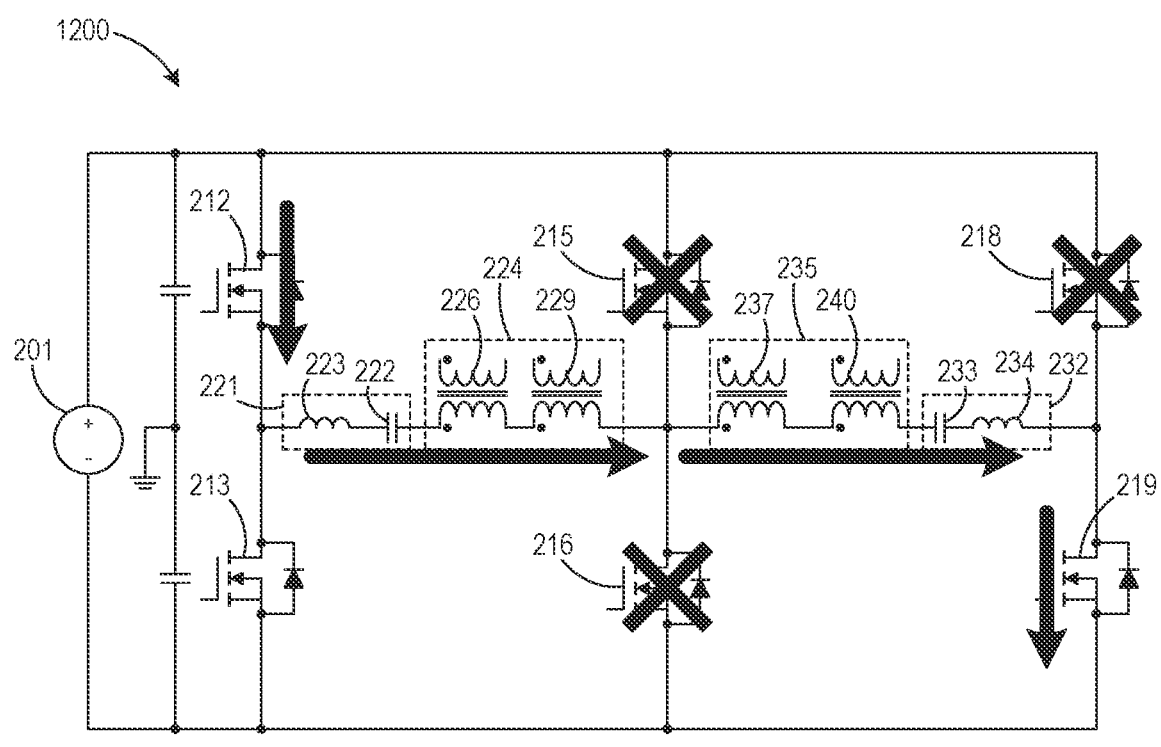
FIGS. 12 and 13 illustrate operational modes of the voltage converter of FIG. 2 during a third control scheme according to one or more embodiments.
Figure 13:
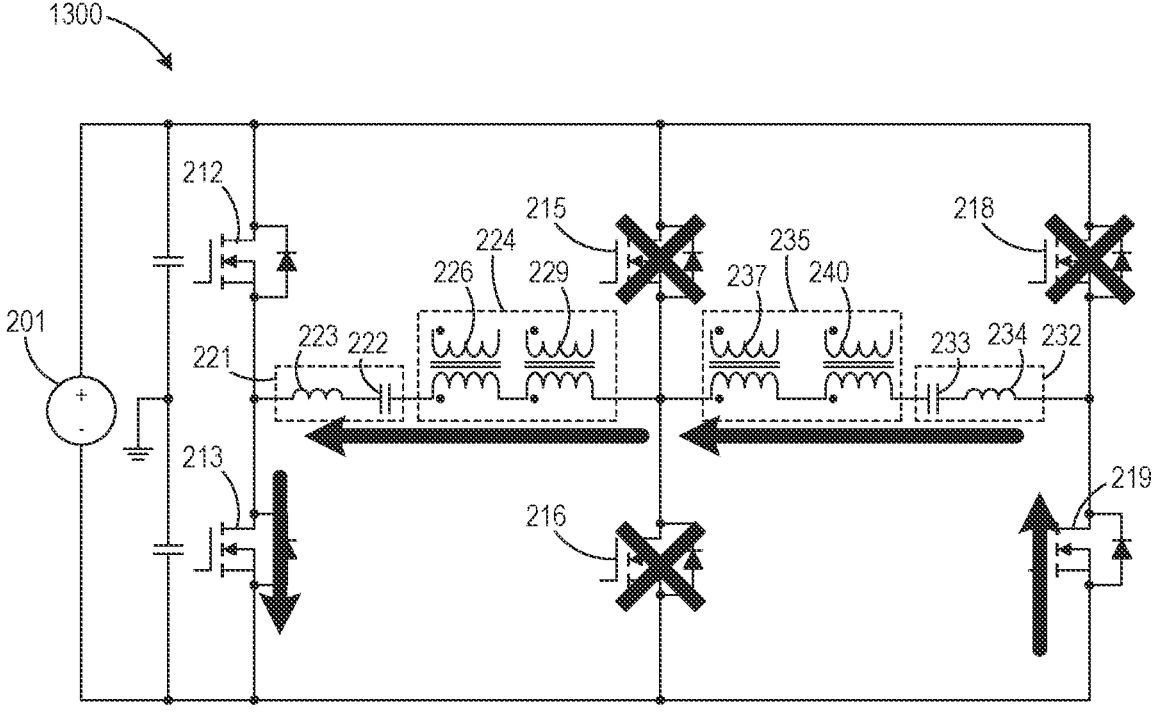

A fourth control scheme is illustrated in FIGS. 12 and 13 that show two operating modes 1200, 1300 of a half bridge operation in which the four transformers 226, 229, 237, 240 are operated in series (e.g., a four-transformer-in-series half bridge operational control scheme). In the first operating mode 1200 of FIG. 12, switching devices 212, 213, 219 are controlled into their conducting and non-conducting modes in a similar manner as the first operating mode 600 of FIG. 6. In the second operating mode 1100, switching devices 213, 219 are controlled into their conducting modes, and switching device 212 is controlled into its non-conducting modes. In this manner, current from the voltage source 201 flows in an opposite direction through the resonant assemblies 221, 232 and the transformer assemblies 224, 235 as indicated. In both operating modes 1200, 1300, switching device 219 is permanently controlled into its conducting mode, and switching devices 215, 216, 218 remain controlled into their non-conducting modes to facilitate the series connection of the transformer assemblies 224, 235.

While not illustrated in FIG. 1, the voltage converter 200 of FIG. 2 may additionally include an additional parallel assembly 243 coupled in parallel across the pair of transformer assemblies 224, 235. As shown in FIG. 2, the parallel assembly 243 includes an inductor 244 coupled in series with a pair of controllable switching devices 245, 246. The inductor 244 may be activated during control of the voltage converter 200 by the controller 247 to modify the resonant tank characteristic during the control schemes of FIGS. 6-7 and 12-13 while not influencing parallel mode resonant tank characteristics.

Figure 14:
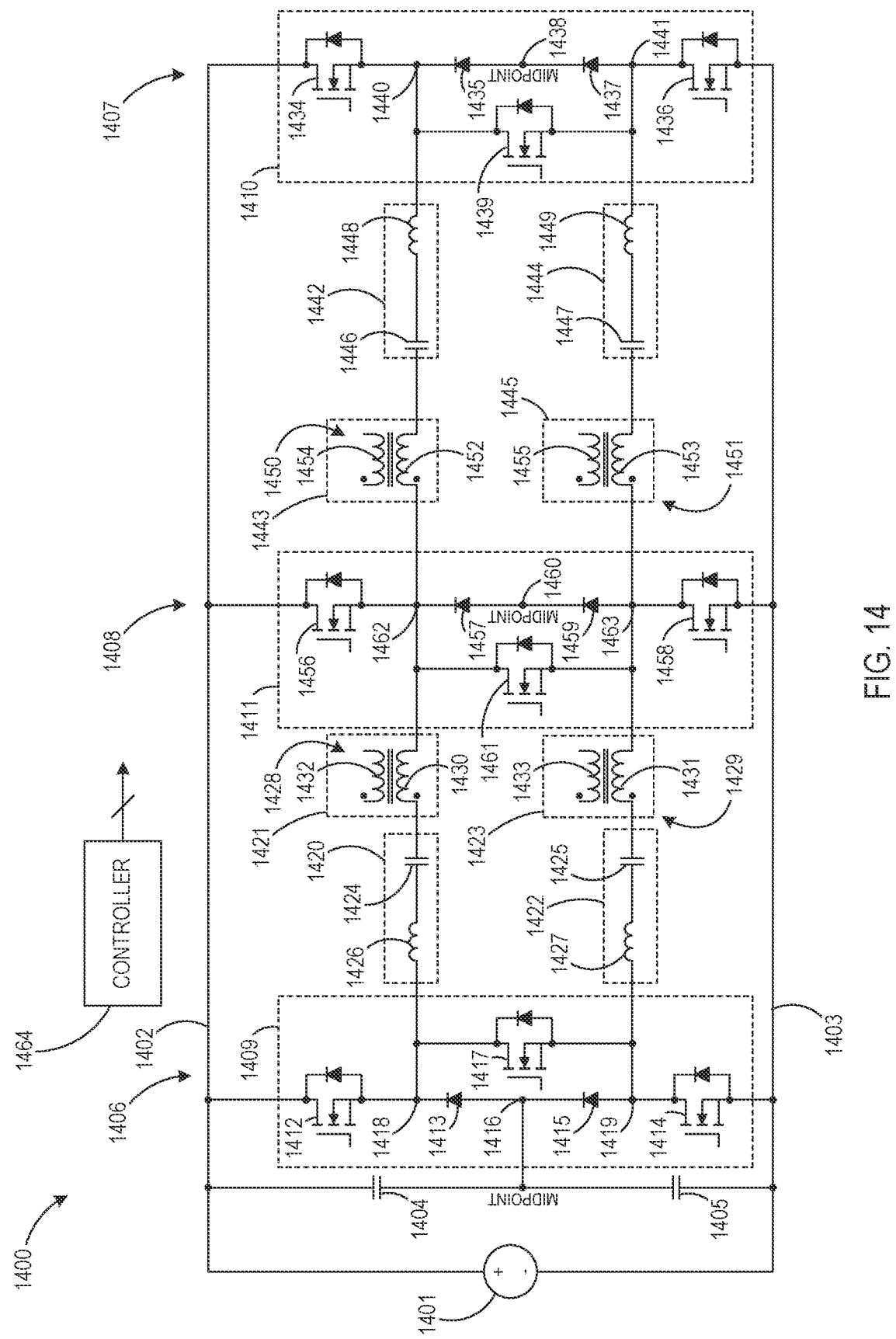
FIG. 14 is a schematic diagram of a voltage converter according to one or more embodiments.

FIG. 14 is a schematic block diagram of a voltage converter 1400 according to an embodiment. A voltage source 1401 is coupled to a voltage bus having a positive rail 1402 and a negative rail 1403. A pair of capacitors 1404, 1405 are respectively coupled between the positive and negative rails 1402, 1403 and a midpoint node (e.g., netname MIDPOINT).

The voltage converter 1400 includes a plurality of switch legs 1406-1408 coupled in parallel across the voltage bus 1402, 1403. Each leg includes a respective switch assembly 1409-1411 comprising a plurality of switching components as described hereinbelow. The switch assembly 1409 includes a pair of serially-coupled switching devices 1412, 1413 and 1414, 1415. In the embodiment illustrated, switching devices 1412, 1414 are MOSFETs, and switching devices 1413, 1415 are diodes. The diodes 1413, 1415 are serially coupled together at a common node 1416 coupled to the common_NET node. A third switching device, such as MOSFET 1417, is coupled to common nodes 1418, 1419 between the switching device 1412 and the diode 1413 and between the switching device 1414 and the diode 1415.

A resonant assembly 1420 and a transformer assembly 1421 are serially coupled together and coupled with the common node 1418 between the switching device 1412 and the diode 1413. A separate resonant assembly 1422 and transformer assembly 1423 are serially coupled together and coupled with the common node 1419 between the switching device 1414 and the diode 1415. Each of the resonant assemblies 1420, 1422 includes a capacitor 1424, 1425 and an inductor 1426, 1427. The transformer assemblies 1421, 1423 include a single transformer 1428, 1429 each with respective primary windings 1430, 1431 and secondary windings 1432, 1433.

The switch assembly 1410 includes a pair of serially-coupled switching devices 1434, 1435 and 1436, 1437. As illustrated, switching devices 1434, 1436 are MOSFETs, and switching devices 1435, 1437 are diodes. The diodes 1435, 1437 are serially coupled together at a common node 1438 coupled to the common_NET node. A third switching device, such as MOSFET 1439, is coupled to common nodes 1440, 1441 between the switching device 1434 and the diode 1435 and between the switching device 1436 and the diode 1437.

A resonant assembly 1442 and a transformer assembly 1443 are serially coupled together and coupled with the common node 1440 between the switching device 1434 and the diode 1435. A separate resonant assembly 1444 and transformer assembly 1445 are serially coupled together and coupled with the common node 1441 between the switching device 1436 and the diode 1437. Each of the resonant assemblies 1442, 1444 includes a capacitor 1446, 1447 and an inductor 1448, 1449. The transformer assemblies 1443, 1445 include a single transformer 1450, 1451 each with respective primary windings 1452, 1453 and secondary windings 1454, 1455.

The switch leg 1408 includes a pair of serially-coupled switching devices 1456, 1457 and 1458, 1459. As illustrated, switching devices 1456, 1458 are MOSFETs, and switching devices 1457, 1459 are diodes. The diodes 1457, 1459 are serially coupled together at a common node 1460 coupled to the common_NET node. A third switching device, such as MOSFET 1461, is coupled to common nodes 1462, 1463 between the switching device 1456 and the diode 1457 and between the switching device 1458 and the diode 1459. The common nodes 1462, 1463 are further coupled to the primary windings 1430, 1452 of transformers 1428, 1450 and to the primary windings 1431, 1453 of transformers 1429, 1451, respectively.

A controller 1464, coupled to the switch assemblies 1409-1411, is configured to control switching device elements of the switch assemblies 1409-1411 during voltage conversion operations. As described herein, various switch control schemes may be used by the controller 1464 to electrically arrange the switch assemblies 1409-1411, resonant assemblies 1420, 1422, 1442, 1444, and transformer assemblies 1421, 1423, 1443, 1445 in configurable coupling arrangements as described herein.

Figure 15:
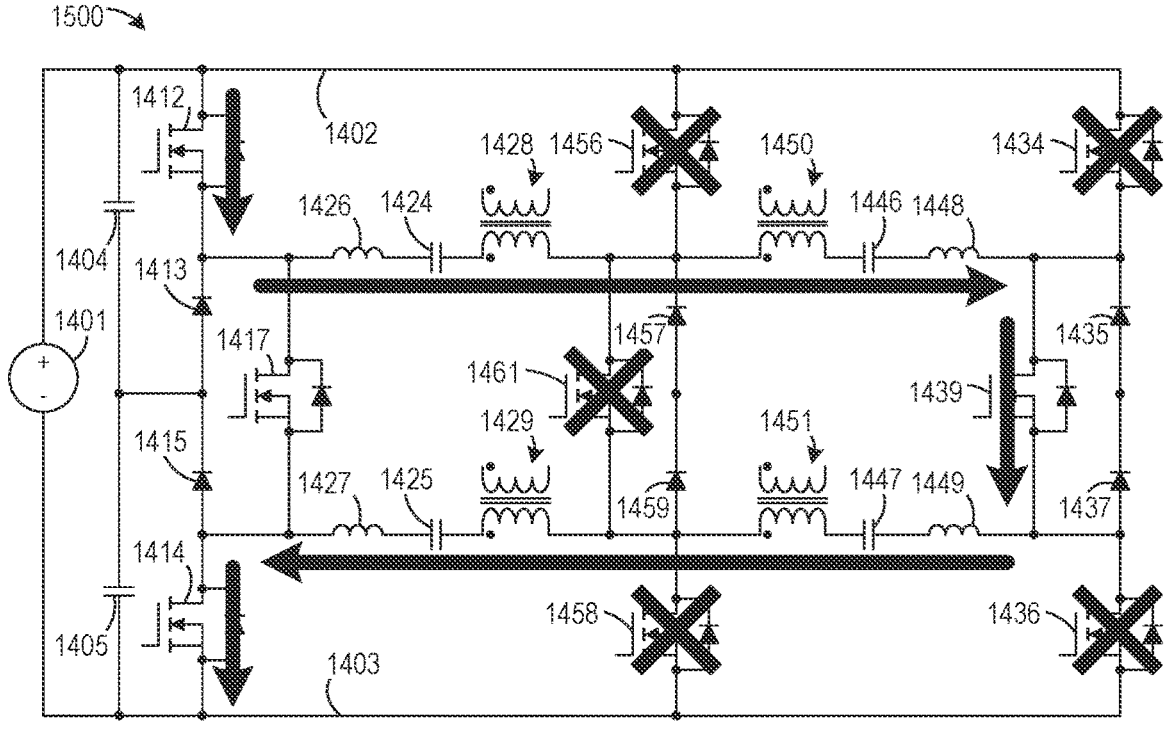
FIGS. 15 and 16 illustrate operational modes of the voltage converter of FIG. 14 during a first control scheme according to one or more embodiments.
Figure 16:
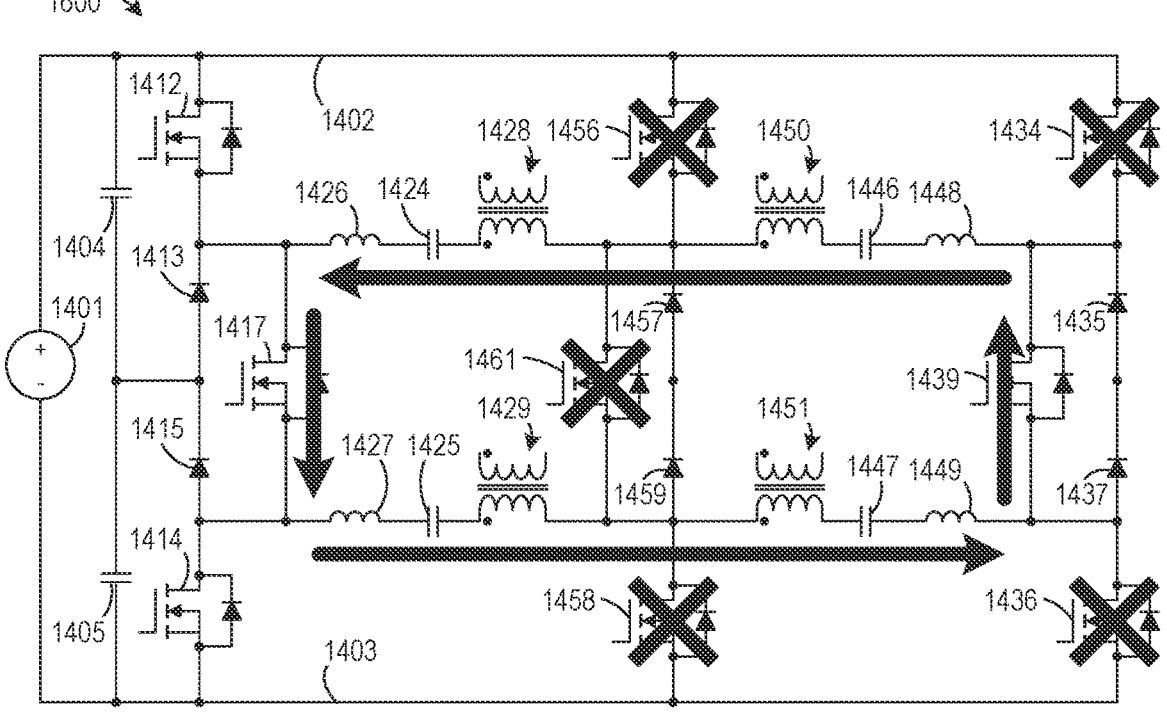

Based on the arrangement of the voltage converter 1400 of FIG. 14, multiple control schemes may be used to operate the voltage converter 1400 to produce output voltages in a wide range of values with a high efficiency. A first control scheme is illustrated in FIGS. 15 and 16 that show two operating modes 1500, 1600 of a half bridge operation in which the four transformers 1428, 1429, 1450, 1451 are operated in series. In the first operating mode 1500 of FIG. 15, the switching devices 1412, 1439, 1414 are controlled into their conducting modes, and current from the voltage source 1401 flows through the transformers 1428, 1429, 1450, 1451 as indicated by the bold arrows. In the second operating mode 1600 of FIG. 16, the switching devices 1417, 1439 are controlled into their conducting modes, and current flows in an opposite direction through the transformers 1428, 1429, 1450, 1451 as indicated. In both operating modes 1500, 1600, the switching device 1439 remains controlled into its conducting mode, and the switching devices 1434, 1436, 1456, 1458, 1461 remain controlled into their non-conducting modes to facilitate the arrangements shown.

Connecting the secondary windings 1432, 1433, 1454, 1455 to the output diode assembly 300 of FIG. 3 and controlling the voltage converter 1400 according to the first control scheme of FIGS. 15 and 16 results in an output voltage (Vout) equal to the input voltage (Vin) divided by four. When coupled to the output diode assembly 400 of FIG. 4, the Vout is equal to Vin divided by eight. When coupled to the output diode assembly 500 of FIG. 5, the Vout is equal to Vin divided by two.

Figure 17:
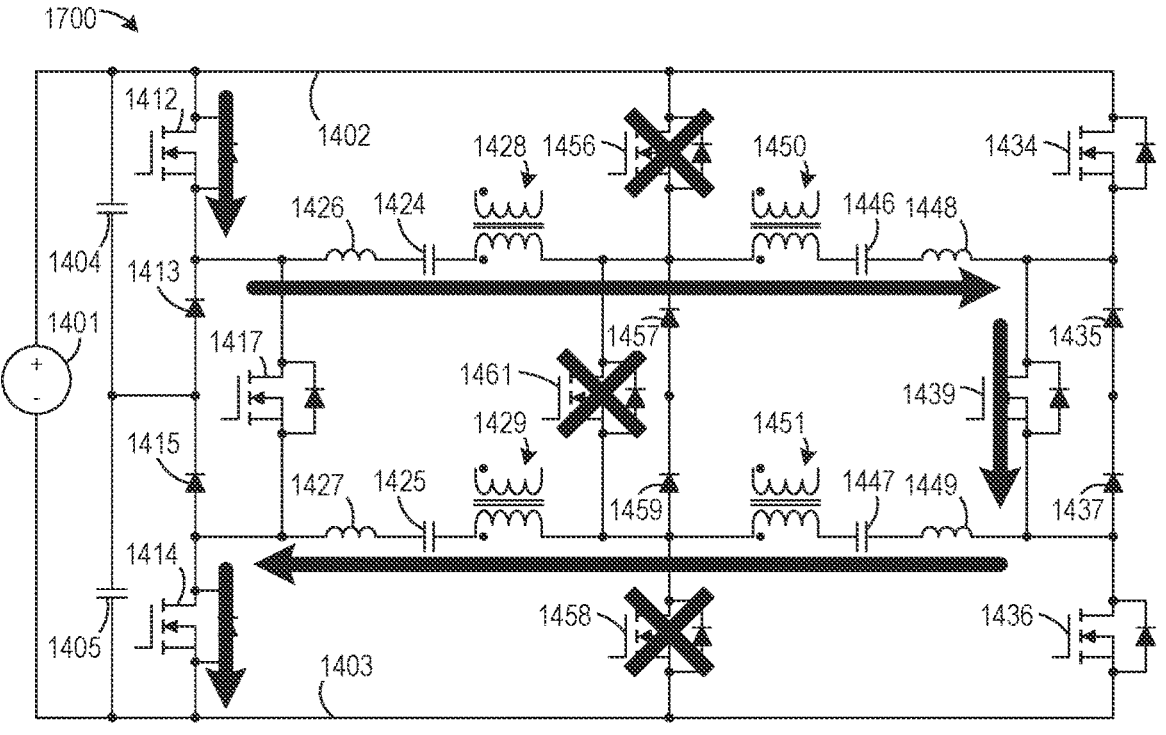
FIGS. 17 and 18 illustrate operational modes of the voltage converter of FIG. 14 during a second control scheme according to one or more embodiments.
Figure 18:
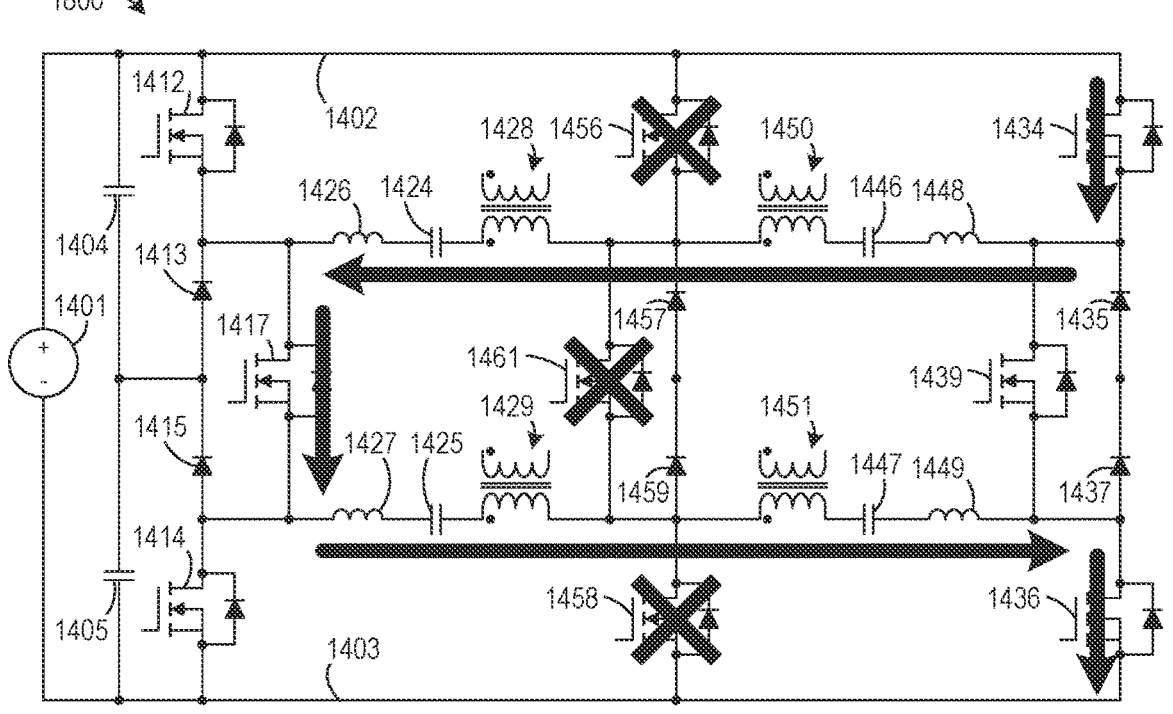

A second control scheme is illustrated in FIGS. 17 and 18 that show two operating modes 1700, 1800 of a full bridge operation in which the four transformers 1428, 1429, 1450, 1451 are operated in series. In the first operating mode 1700 of FIG. 17, switching devices 1412, 1439, 1414 are controlled into their conducting modes, and current from the voltage source 1401 flows through the transformers 1428, 1429, 1450, 1451 as indicated by the bold arrows. In the second operating mode 1800 of FIG. 18, switching devices 1434, 1417, 1436 are controlled into their conducting modes, and current from the voltage source 1401 flows in an opposite direction through the transformers 1428, 1429, 1450, 1451 as indicated. In both operating modes 1700, 1800, switching devices 1456, 1458, 1461 remain controlled into their non-conducting modes to facilitate the arrangements shown.

Connecting the secondary windings 1432, 1433, 1454, 1455 to the output diode assembly 300 of FIG. 3 and controlling the voltage converter 1400 according to the first control scheme of FIGS. 15 and 16 results in the Vout being equal to Vin divided by two. When coupled to the output diode assembly 400 of FIG. 4, the Vout is equal to Vin divided by four. When coupled to the output diode assembly 500 of FIG. 5, the Vout is equal to Vin.

Figure 19:
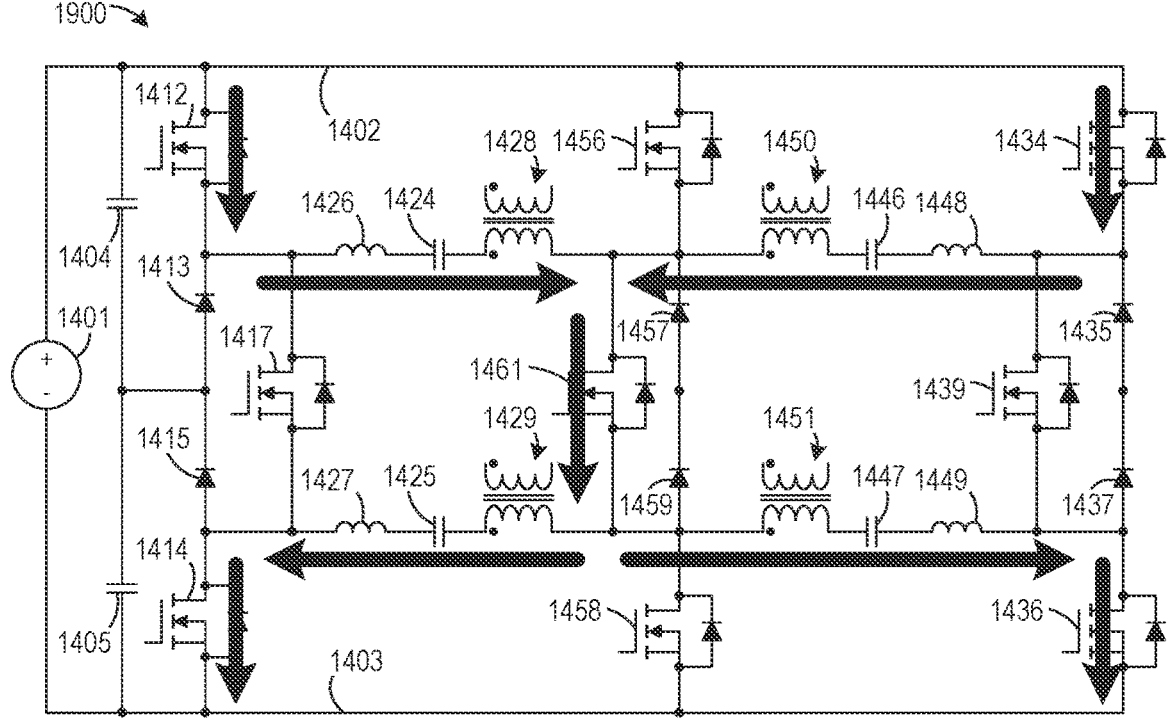
FIGS. 19 and 20 illustrate operational modes of the voltage converter of FIG. 14 during a third control scheme according to one or more embodiments.
Figure 20:
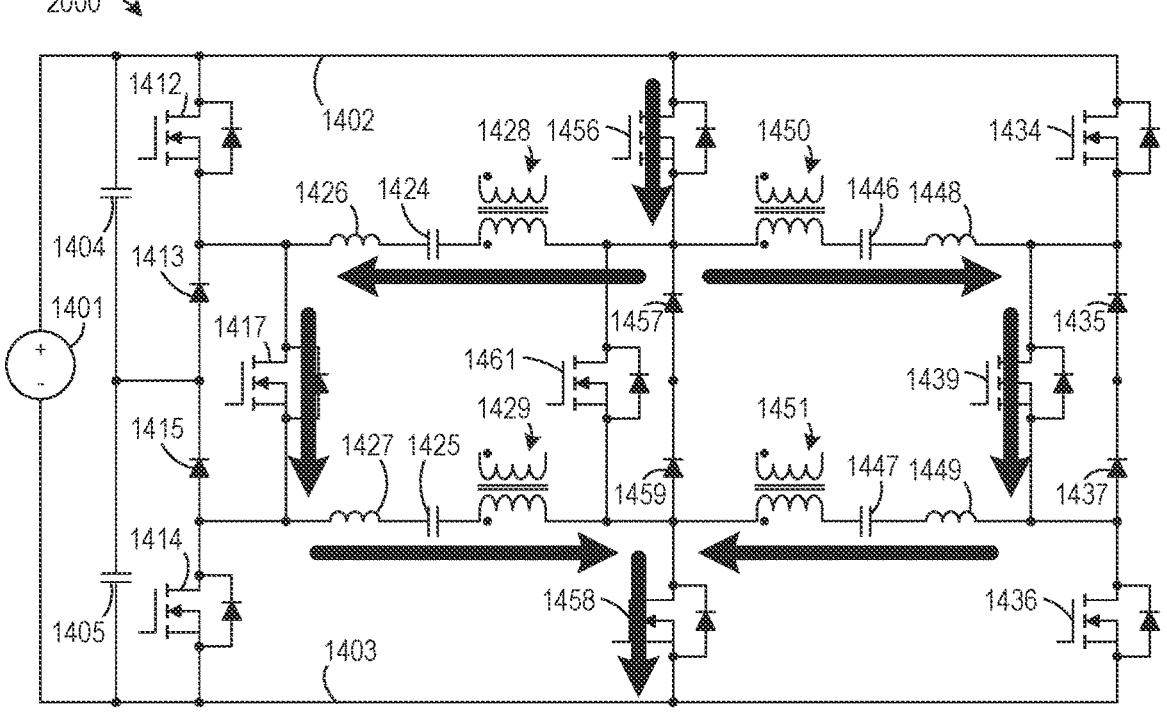

A third control scheme is illustrated in FIGS. 19 and 20 that show two operating modes 1900, 2000 of a full bridge operation in which the four transformers 1428, 1429, 1450, 1451 are operated in a series/parallel arrangement. In the first operating mode 1900 of FIG. 19, switching devices 1412, 1414, 1434, 1436, 1461 are controlled into their conducting modes, and current from the voltage source 1401 flows through the transformers 1428, 1429, 1450, 1451 as indicated by the bold arrows. In the second operating mode 2000 of FIG. 20, switching devices 1417, 1439, 1456, 1458 are controlled into their conducting modes, and current from the voltage source 1401 flows in an opposite direction through the transformers 1428, 1429, 1450, 1451 as indicated. In both operating modes 1900, 2000, none of the switching devices 1412, 1414, 1417, 1434, 1436, 1439, 1456, 1458, 1461 remains in its non-conducting mode during both of the operating modes 1900, 2000.

Connecting the secondary windings 1432, 1433, 1454, 1455 to the output diode assembly 300 of FIG. 3 and controlling the voltage converter 1400 according to the first control scheme of FIGS. 15 and 16 results in the Vout being equal to the Vin. When coupled to the output diode assembly 400 of FIG. 4, the Vout is equal to Vin divided by two. When coupled to the output diode assembly 500 of FIG. 5, the Vout is equal to twice the Vin.

Figure 21:
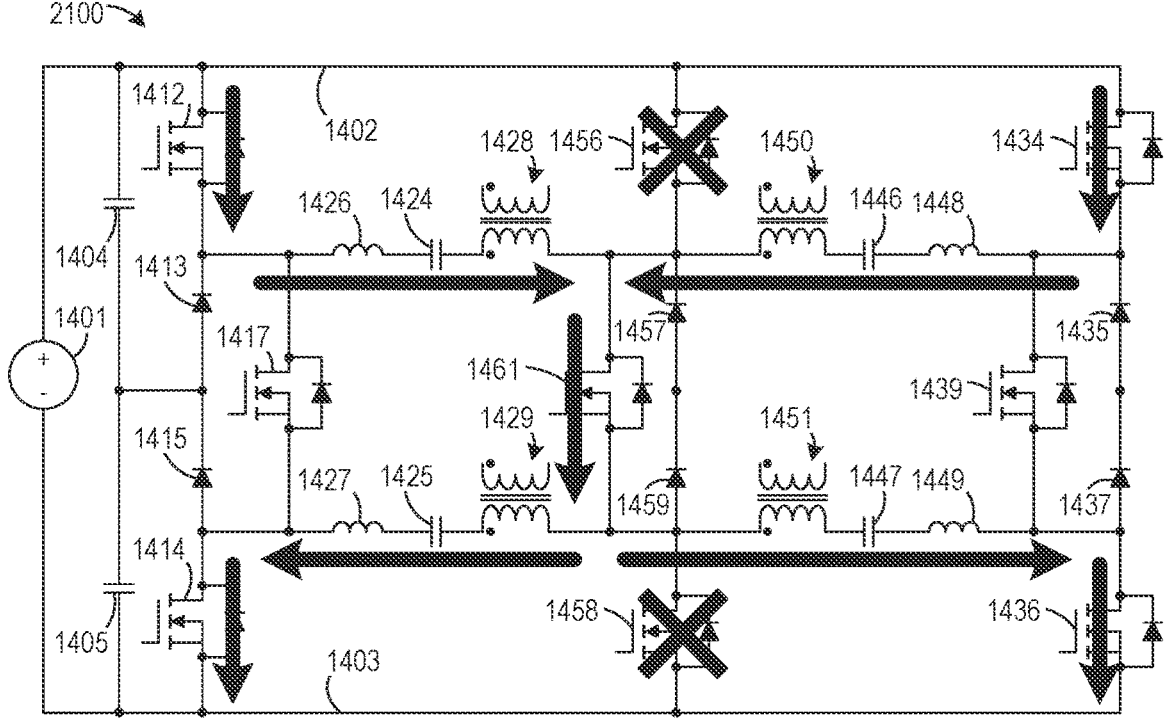
FIGS. 21 and 22 illustrate operational modes of the voltage converter of FIG. 14 during a fourth control scheme according to one or more embodiments.
Figure 22:
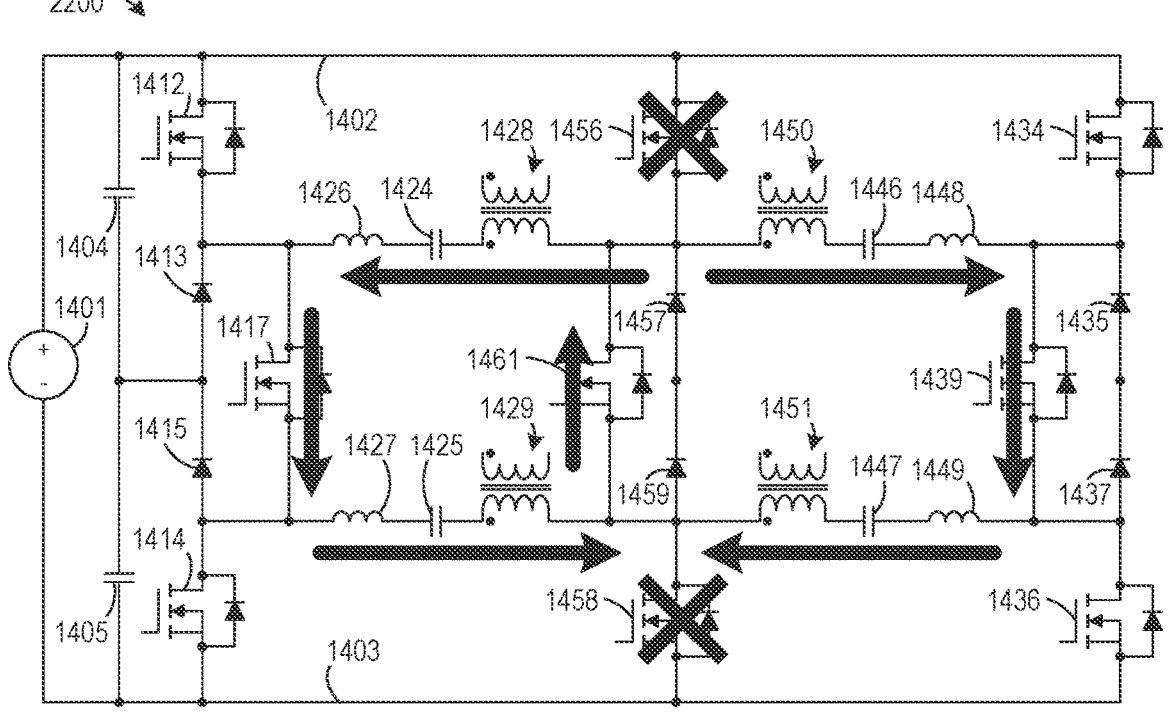

A fourth control scheme is illustrated in FIGS. 21 and 22 that show two operating modes 2100, 2200 of a half bridge operation in which the four transformers 1428, 1429, 1450, 1451 are operated in a series/parallel arrangement. In the first operating mode 2100 of FIG. 21, switching devices 1412, 1414, 1434, 1436, 1461 are controlled into their conducting modes, and current from the voltage source 1401 flows through the transformers 1428, 1429, 1450, 1451 as indicated by the bold arrows. In the second operating mode 2200 of FIG. 22, switching devices 1417, 1439, 1461 are controlled into their conducting modes, and current flows in an opposite direction through the transformers 1428, 1429, 1450, 1451 as indicated. In both operating modes 2100, 2200, the switching device 1461 remains controlled into its conducting mode, and the switching devices 1456, 1458 remain controlled into their non-conducting modes to facilitate the arrangements shown.

Connecting the secondary windings 1432, 1433, 1454, 1455 to the output diode assembly 300 of FIG. 3 and controlling the voltage converter 1400 according to the first control scheme of FIGS. 15 and 16 results in the Vout being equal to the Vin divided by two. When coupled to the output diode assembly 400 of FIG. 4, the Vout is equal to Vin divided by four. When coupled to the output diode assembly 500 of FIG. 5, the Vout is equal to the Vin.

Figure 23:
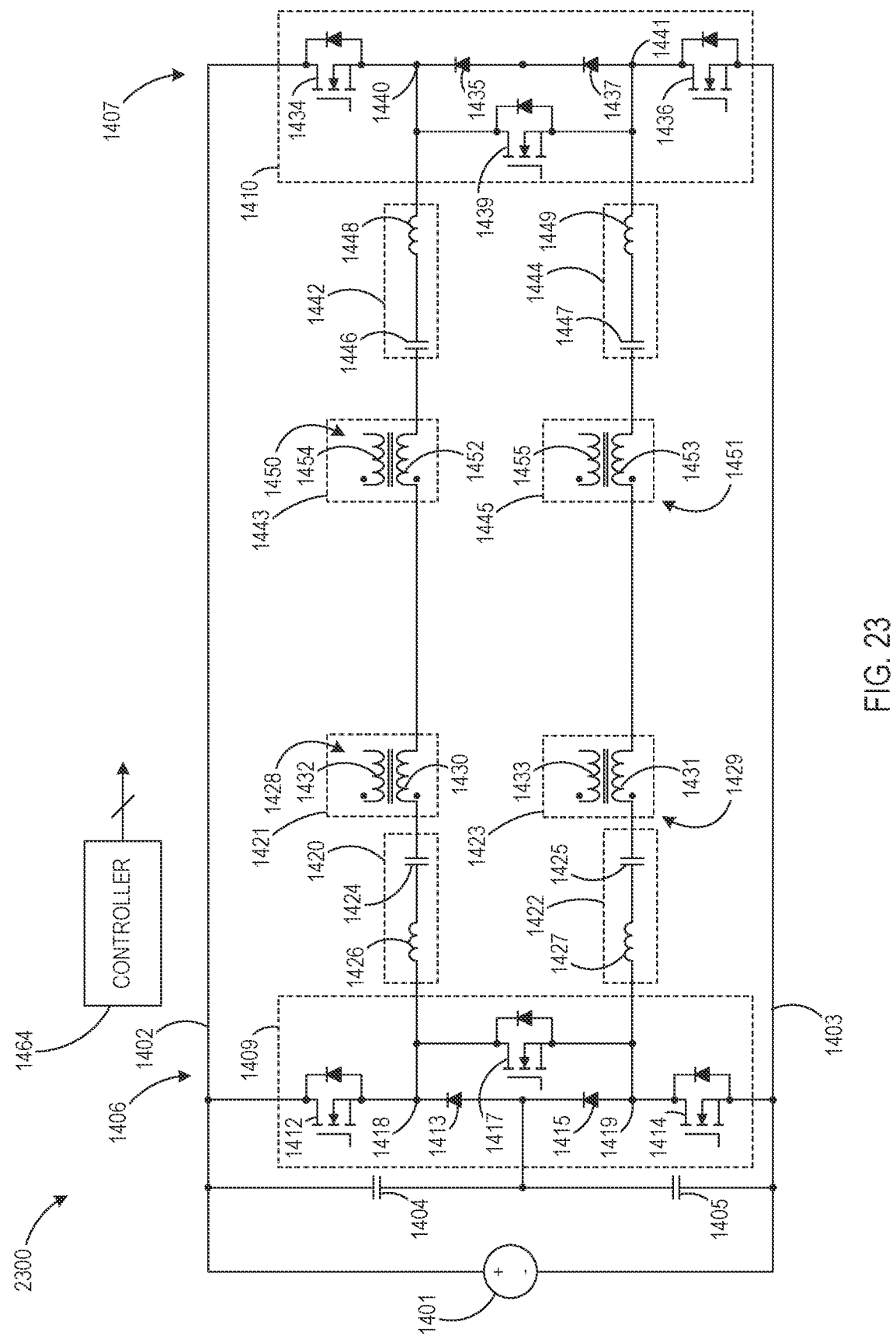
FIG. 23 is a schematic block diagram of a voltage converter according to one or more embodiments.

FIG. 23 is a schematic block diagram of a voltage converter 2300 according to another embodiment. The voltage converter 2300 includes the same components as the voltage converter 1400 of FIG. 14 except for the central switch leg 1408. Accordingly, the components of the voltage converter 2300 retain the same reference numerals and description as recited above in FIG. 14.

Based on the control schemes described hereinabove, one skilled in the art will recognize that the controller 1464 may control the switching devices 1412, 1414, 1417, 1434, 1436, 1439 of the voltage converter 2300 based on the four transformers 1428, 1429, 1450, 1451 being coupled in series for either a full bridge control scheme or a half bridge control scheme. When operated according to the full bridge control scheme, a connection of the secondary windings 1432, 1433, 1454, 1455 to the output diode assembly 300 of FIG. 3 results in the Vout being equal to the Vin divided by two. When connected to the output diode assembly 400 of FIG. 4, the Vout is equal to the Vin divided by four. When operated according to the half bridge control scheme, a connection of the secondary windings 1432, 1433, 1454, 1455 to the output diode assembly 300 of FIG. 3 results in the Vout being equal to the Vin divided by four. When connected to the output diode assembly 400 of FIG. 4, the Vout is equal to the Vin divided by eight.

Figure 24:
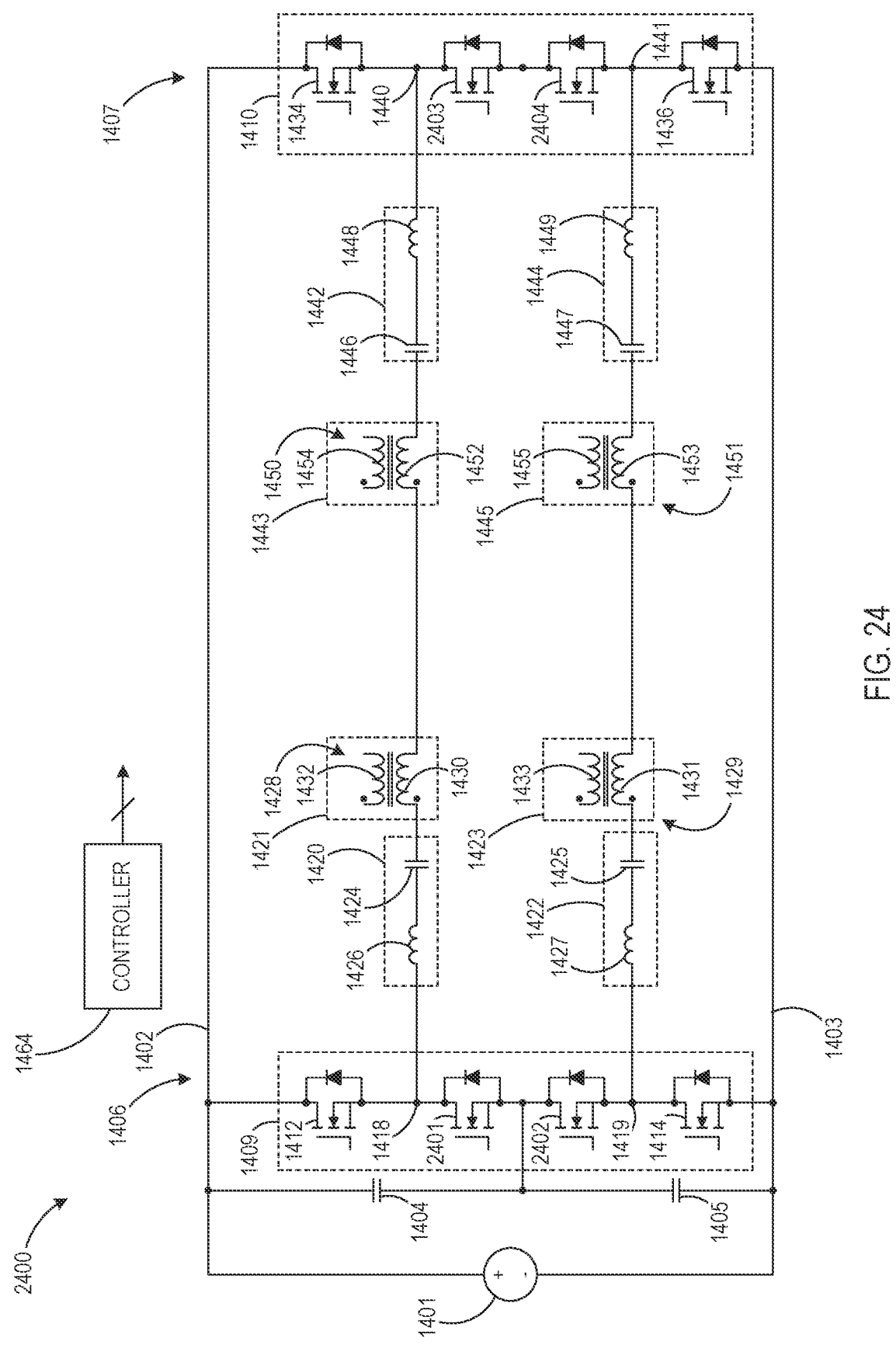
FIG. 24 is a schematic block diagram of a voltage converter according to one or more embodiments.

FIG. 24 is a schematic block diagram of a voltage converter 2400 according to another embodiment. The voltage converter 2400 is a modification of the voltage converter 2300, and similar components as those of the voltage converter 2300 retain the same reference numerals and description as recited above. While the switch assemblies 1409, 1410 of the voltage converter 2300 include four switching device pairs (two switching device pairs in each assembly 1409, 1410), the switch assemblies 1409, 1410 of the voltage converter 2400 substitute the diodes 1413, 1415, 1435, 1437 for controllable switching devices such as MOS-FETs 2401-2404. Furthermore, the switching devices 1417, 1439 are also eliminated.

With the substitution of the switching devices 2401-2404 for the diodes 1413, 1415, 1435, 1437 of the voltage converter 2300, one skilled in the art will recognize that the controller 1464 may control the switching devices 1412, 1414, 1434, 1436, and 2401-2404 of the voltage converter 2400 based on the four transformers 1428, 1429, 1450, 1451 being coupled in series for a full bridge control scheme, a half bridge control scheme, or an asymmetrical half bridge control scheme. When operated according to the full bridge control scheme, a connection of the secondary windings 1432, 1433, 1454, 1455 to the output diode assembly 300 of FIG. 3 results in the Vout being equal to the Vin divided by two. When connected to the output diode assembly 400 of FIG. 4, the Vout is equal to the Vin divided by four. When operated according to the half bridge control scheme, a connection of the secondary windings 1432, 1433, 1454, 1455 to the output diode assembly 300 of FIG. 3 results in the Vout being equal to the Vin divided by four. When connected to the output diode assembly 400 of FIG. 4, the Vout is equal to the Vin divided by eight. When operated according to the asymmetrical half bridge control scheme, a connection of the secondary windings 1432, 1433, 1454, 1455 to the output diode assembly 300 of FIG. 3 results in the Vout being equal to the Vin divided by eight. When connected to the output diode assembly 400 of FIG. 4, the Vout is equal to the Vin divided by sixteen.

Figure 25:
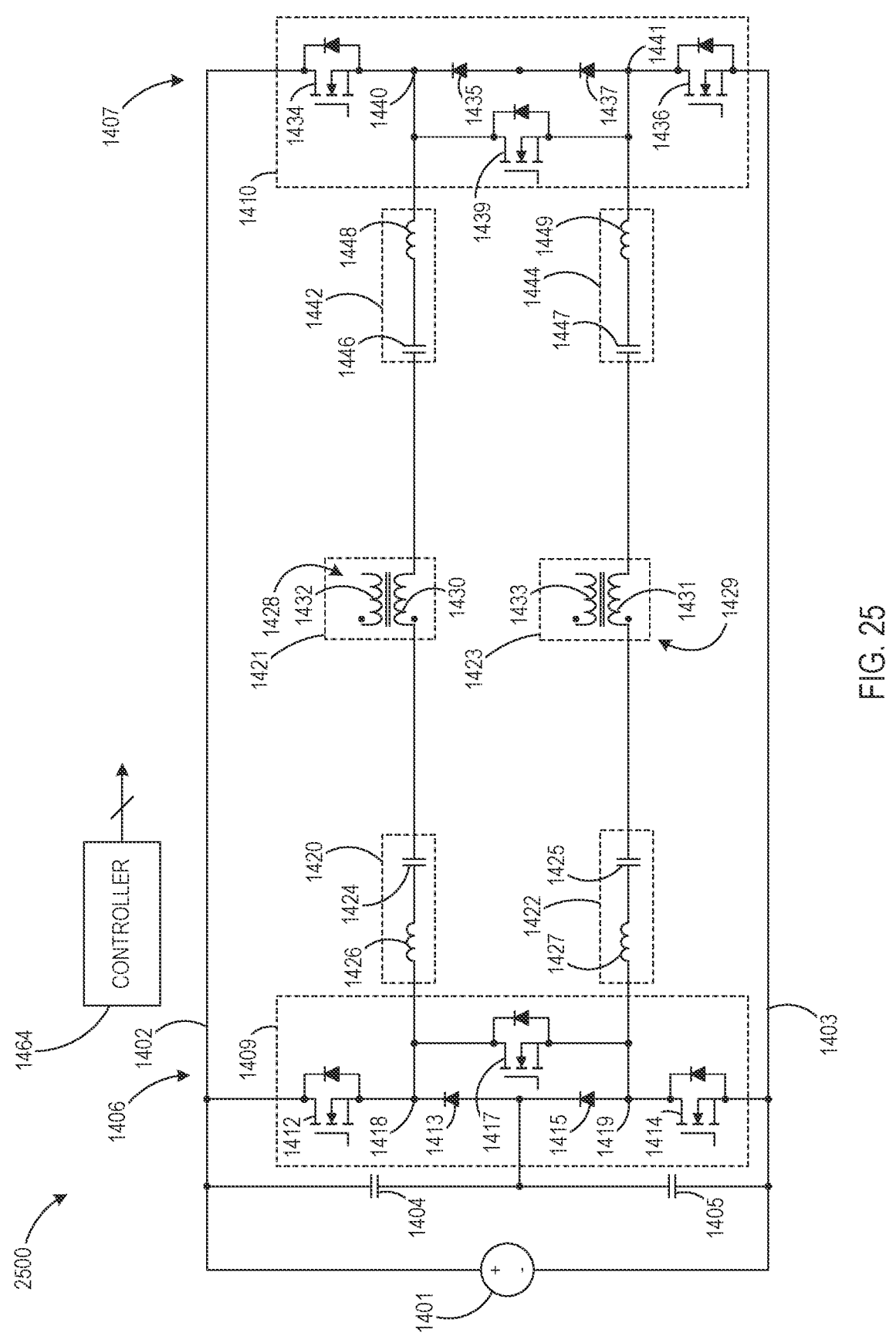
FIG. 25 is a schematic block diagram of a voltage converter according to one or more embodiments.

FIG. 25 is a schematic block diagram of a voltage converter 2500 according to another embodiment. The voltage converter 2500 includes the same components as the voltage converter 2500 of FIG. 23 except for the transformer assemblies 1443, 1445. Accordingly, the common components of the voltage converter 2500 retain the same reference numerals and description as recited above in FIG. 23.

Figure 26:
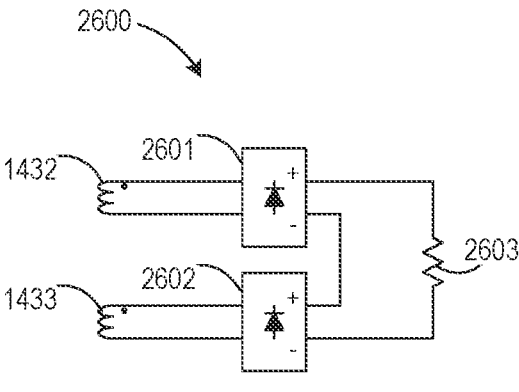
FIG. 26 is a schematic block diagram of an output diode assembly according to one or more embodiments.
Figure 27:
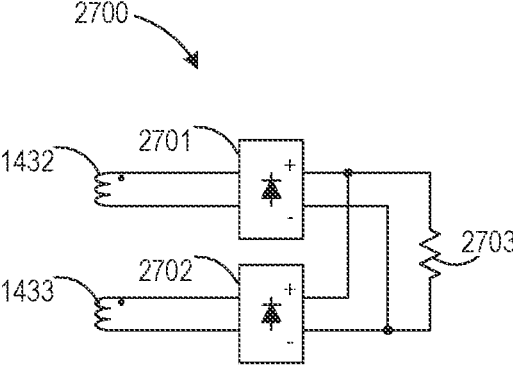
FIG. 27 is a schematic block diagram of an output diode assembly according to one or more embodiments.

FIGS. 27-26 illustrate embodiments of secondary side schematics coupleable to the secondary windings 1432, 1433 according to various examples. In FIG. 26, an output diode assembly 2600 is illustrated that includes two rectifier or diode bridges 2601, 2602 coupleable to the secondary windings 1432, 1433. The diode bridges 2601, 2602 in FIG. 26 are arranged in a parallel arrangement. That is, the outputs of diode bridges 2601, 2602 are coupled in series. A load 2603 is coupled in series with the positive output of the diode bridge 2601 and the negative output of the diode bridge 2602.

In FIG. 27, an output diode assembly 2700 is illustrated that includes two rectifier or diode bridges 2701, 2702 coupleable to the secondary windings 1432, 1433. The diode bridges 2701, 2702 in FIG. 27 are arranged in a parallel arrangement. That is, the outputs of diode bridges 2701, 2702 are coupled in parallel. A load 2703 is coupled in parallel across the outputs of the diode bridges 2701, 2702.

Returning to FIG. 25, one skilled in the art will recognize that the controller 1464 may control the switching devices 1412, 1414, 1417, 1434, 1436, 1439 of the voltage converter 2300 based on the two transformers 1428, 1429 being coupled in series for either a full bridge control scheme or a half bridge control scheme. When operated according to the full bridge control scheme, a connection of the secondary windings 1432, 1433 to the output diode assembly 2600 of FIG. 26 results in the Vout being equal to the Vin multiplied by two. When connected to the output diode assembly 2700 of FIG. 27, the Vout is equal to the Vin. When operated according to the half bridge control scheme, a connection of the secondary windings 1432, 1433 to the output diode assembly 2600 of FIG. 26 results in the Vout being equal to the Vin. When connected to the output diode assembly 2700 of FIG. 27, the Vout is equal to the Vin divided by two.

Figure 28:
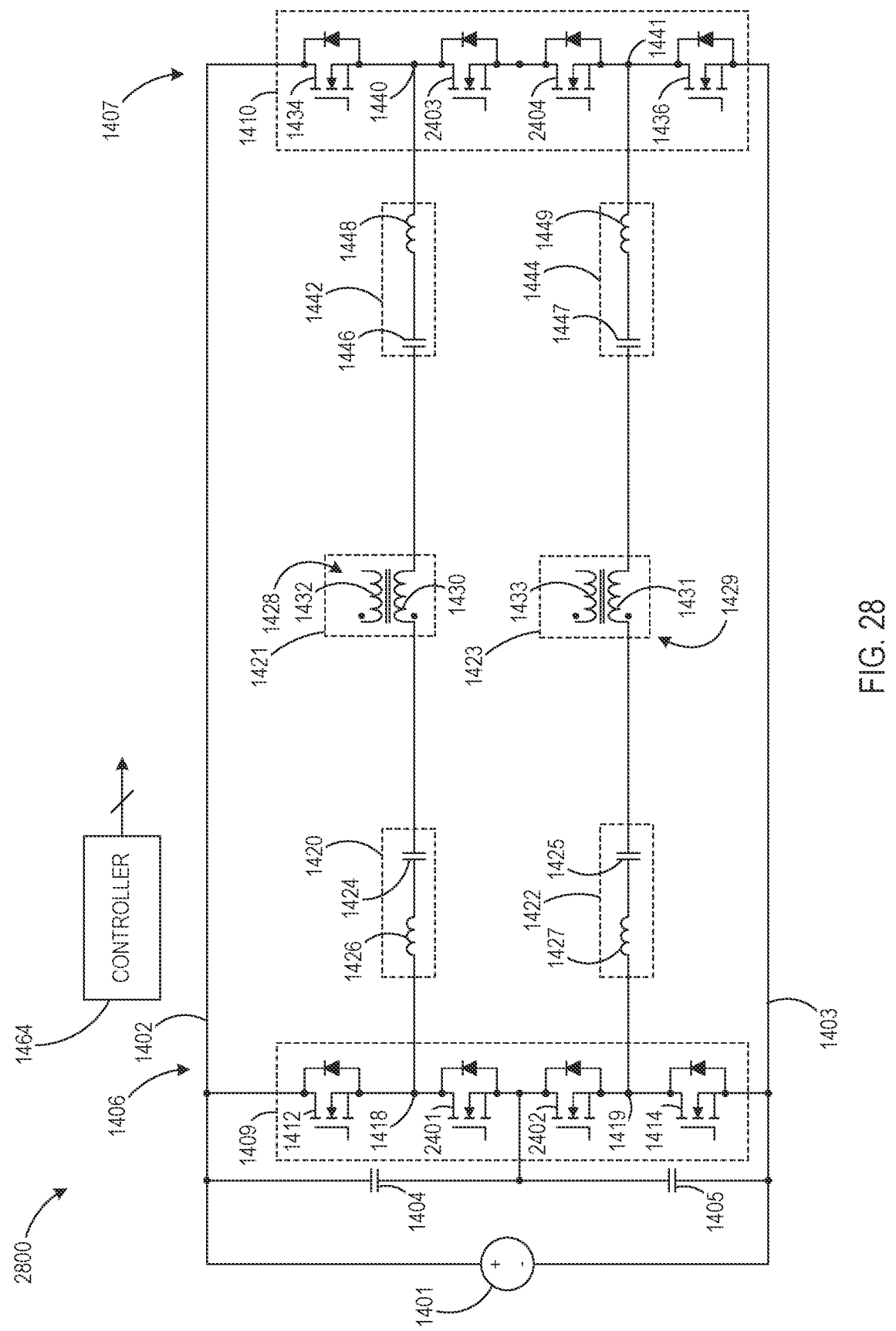
FIG. 28 is a schematic block diagram of a voltage converter according to one or more embodiments.

FIG. 28 is a schematic block diagram of a voltage converter 2800 according to another embodiment. The voltage converter 2800 includes the same components as the voltage converter 2400 of FIG. 24 except for the transformer assemblies 1443, 1445. Accordingly, the common components of the voltage converter 2800 retain the same reference numerals and description as recited above in FIG. 24.

One skilled in the art will recognize that the controller 1464 may control the switching devices 1412, 1414, 1434, 1436, and 2401-2404 of the voltage converter 2800 based on the two transformers 1428, 1429 being coupled in series for a full bridge control scheme, a half bridge control scheme, or an asymmetrical half bridge control scheme. When operated according to the full bridge control scheme, a connection of the secondary windings 1432, 1433 to the output diode assembly 2600 of FIG. 26 results in the Vout being equal to the Vin multiplied by two. When connected to the output diode assembly 2700 of FIG. 27, the Vout is equal to the Vin. When operated according to the half bridge control scheme, a connection of the secondary windings 1432, 1433, 1454, 1455 to the output diode assembly 2600 of FIG. 26 results in the Vout being equal to the Vin. When connected to the output diode assembly 2700 of FIG. 27, the Vout is equal to the Vin divided by two. When operated according to the asymmetrical half bridge control scheme, a connection of the secondary windings 1432, 1433, 1454, 1455 to the output diode assembly 2600 of FIG. 26 results in the Vout being equal to the Vin divided by two. When connected to the output diode assembly 2700 of FIG. 27, the Vout is equal to the Vin divided by four.

Figure 29:
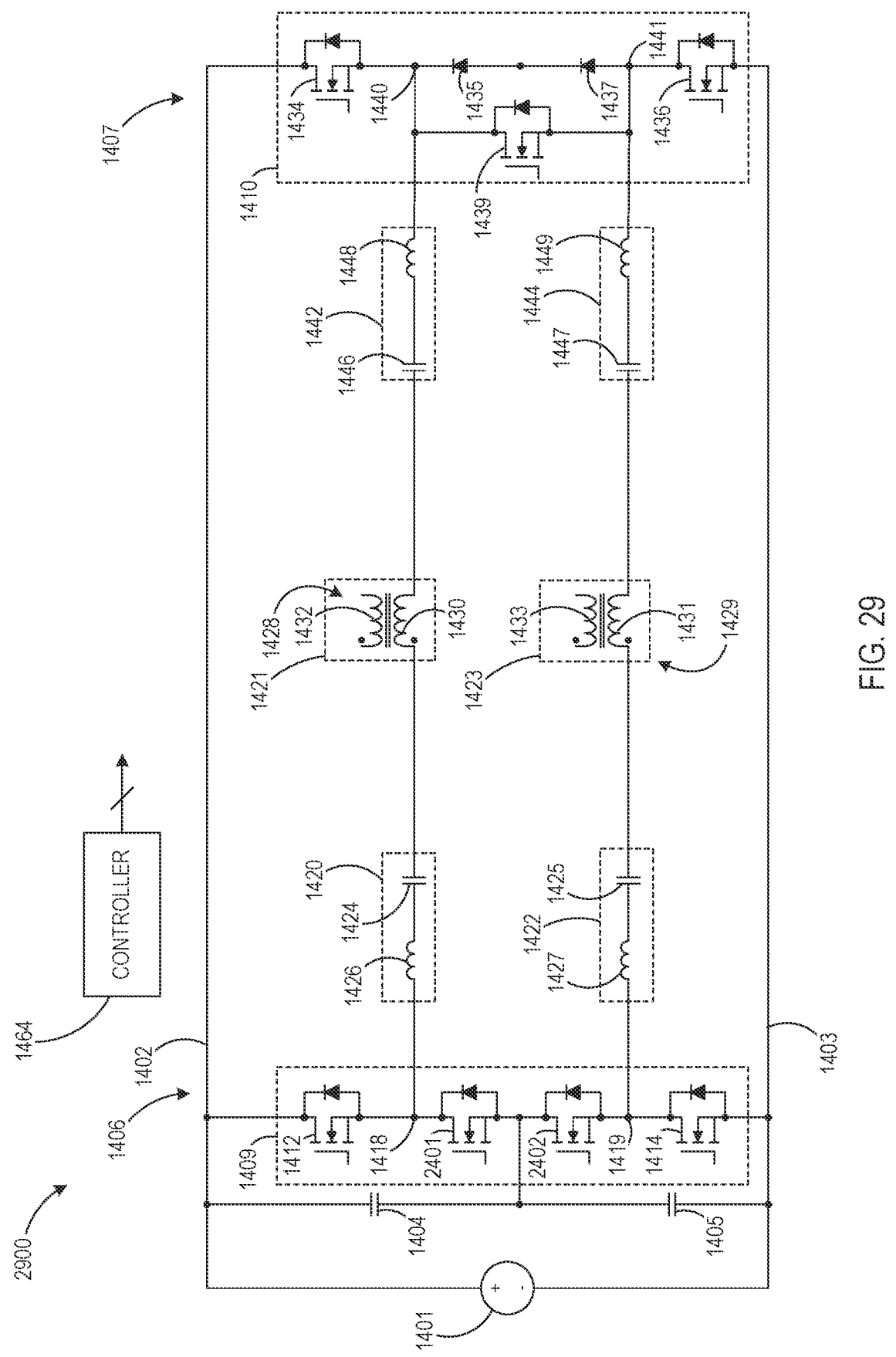
FIG. 29 is a schematic block diagram of a voltage converter according to one or more embodiments.

FIG. 29 is a schematic block diagram of a voltage converter 2900 according to another embodiment. The voltage converter 2900 is a modification of the voltage converter 2800 of FIG. 28. In particular, the switch assembly 1410 of the voltage converter 2800 is substituted with the switch assembly 1410 of the voltage converter 2500.

Figure 30:
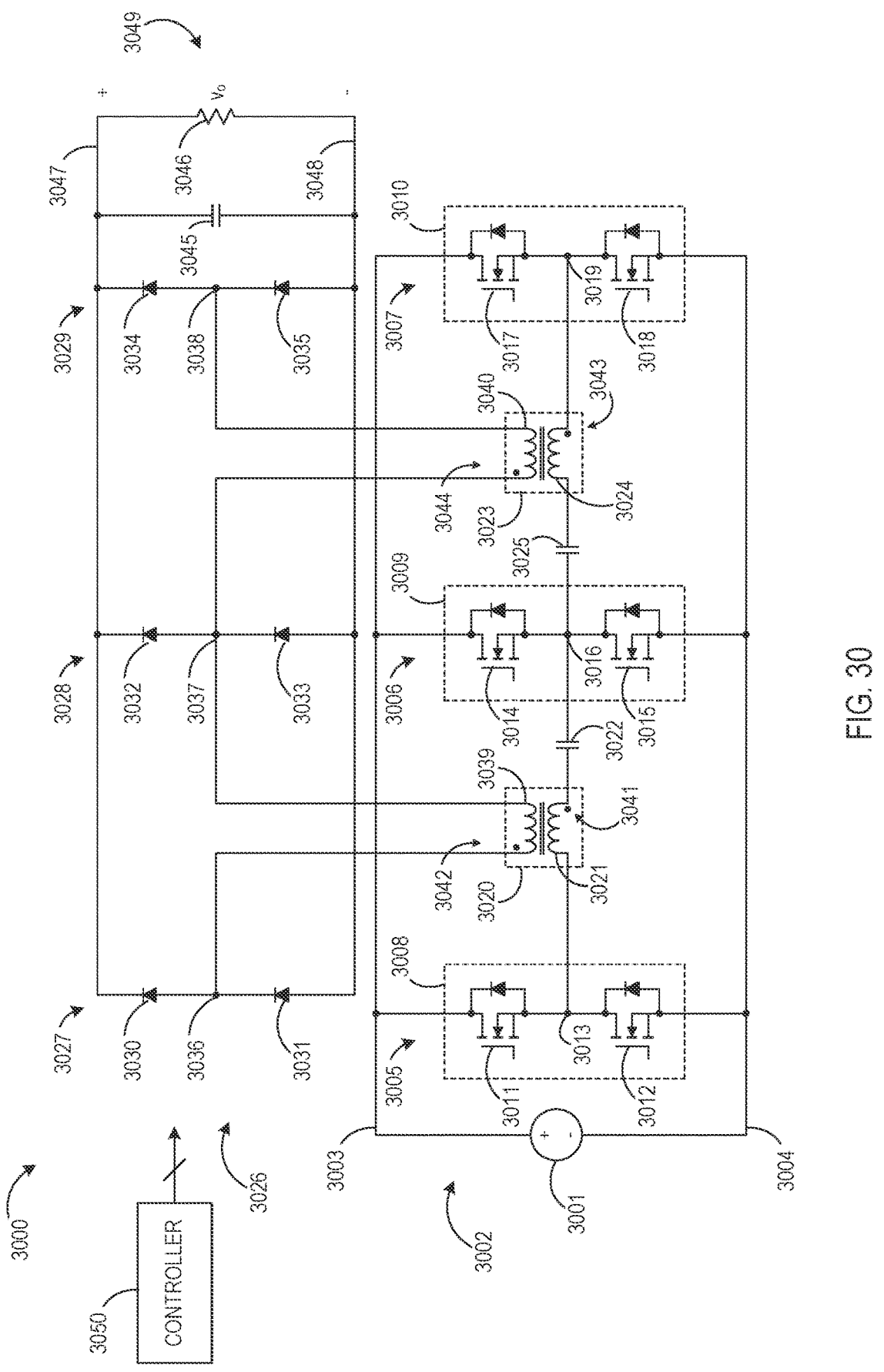
FIG. 30 is a schematic diagram of a voltage converter according to one or more embodiments.

FIG. 30 is a schematic block diagram of a voltage converter 3000 according to an embodiment. A voltage source 3001 is coupled to a primary side 3002 of the voltage converter 3000 having a voltage bus having a positive rail 3003 and a negative rail 3004. The voltage converter 3000 includes a plurality of switch legs 3005-3007 coupled in parallel across the voltage bus 3003, 3004. Each leg includes a respective switch assembly 3008-3010 comprising a plurality of switching components as described hereinbelow. The switch assembly 3008 includes a pair of switching devices 3011, 3012 and are serially coupled together at a common node 3013. The switch assembly 3009 includes a pair of switching devices 3014, 3015 serially coupled together at a common node 3016, and the switch assembly 3010 includes a pair of switching devices 3017, 3018 serially coupled together at a common node 3019. In the embodiment illustrated, switching devices 3011, 3012, 3014, 3015, 3017, and 3018 are MOSFETs.

A first transformer assembly 3020 includes a primary winding 3021 serially coupled between the common node 3013 and a capacitor 3022, which is further coupled with the common node 3016. A second transformer assembly 3023 includes a primary winding 3024 serially coupled with the common nodes 3016, 3019 and a capacitor 3025. While not illustrated in FIG. 30, it is contemplated that the voltage converter 3000 may also include a pair of resonant assemblies, each including a capacitor and an inductor, serially coupled with the primary windings 3021, 3024 as illustrated in FIG. 14. If used, the resonant assemblies may allow the capacitors 3022, 3025 to be removed.

A secondary side 3026 of the voltage converter 3000 includes a plurality of diode legs 3027-3029, each with a respective pair of diodes 3030-3035. The diodes 3030, 3031 are serially coupled via a common node 3036, the diodes 3032, 3033 are serially coupled via a common node 3037, and the diodes 3034, 3035 are serially coupled via a common node 3038. The first transformer assembly 3020 further includes a secondary winding 3039 serially coupled between the common nodes 3036, 3037, and the second transformer assembly 3023 further includes a secondary winding 3040 serially coupled between the common nodes 3037, 3038. A dot end 3041 of the primary winding 3021 is opposite a dot end 3042 of the secondary winding 3039, and a dot end 3043 of the primary winding 3024 is opposite a dot end 3044 of the secondary winding 3040. The secondary side 3026 additionally includes a capacitor 3045 and a load 3046 coupled across first and second rails 3047, 3048 of an output voltage bus 3049.

A controller 3050, coupled to the switch assemblies 3005-3007, is configured to control switching device elements of the switch assemblies 3005-3007 during voltage conversion operations. As described herein, various switch control schemes may be used by the controller 3050 to electrically arrange the switch assemblies 3005-3007 and transformer assemblies 3020, 3023 in configurable coupling arrangements as described herein.

Figure 31:
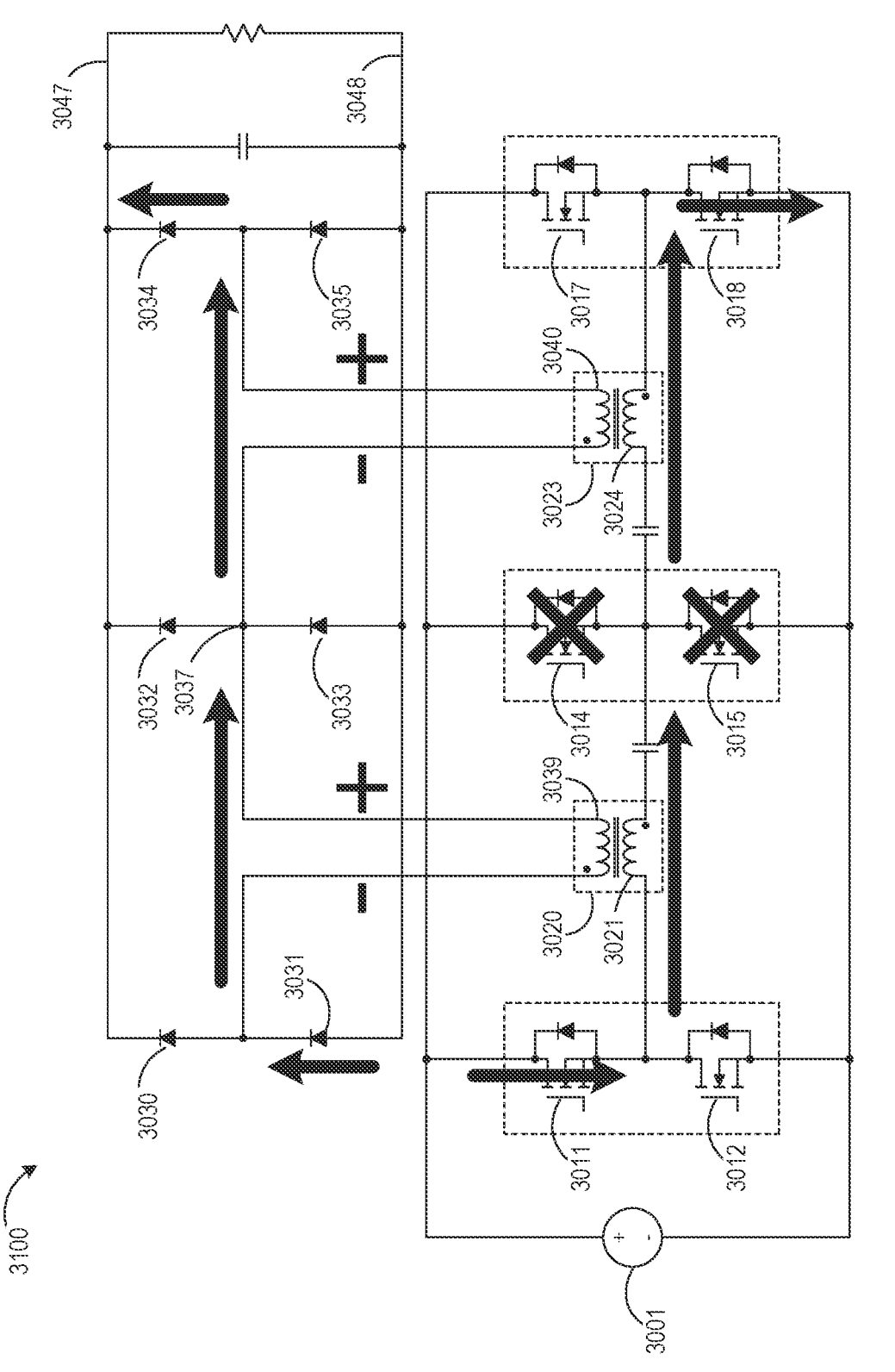
FIGS. 31 and 32 illustrate operational modes of the voltage converter of FIG. 30 during a first control scheme according to one or more embodiments.
Figure 32:
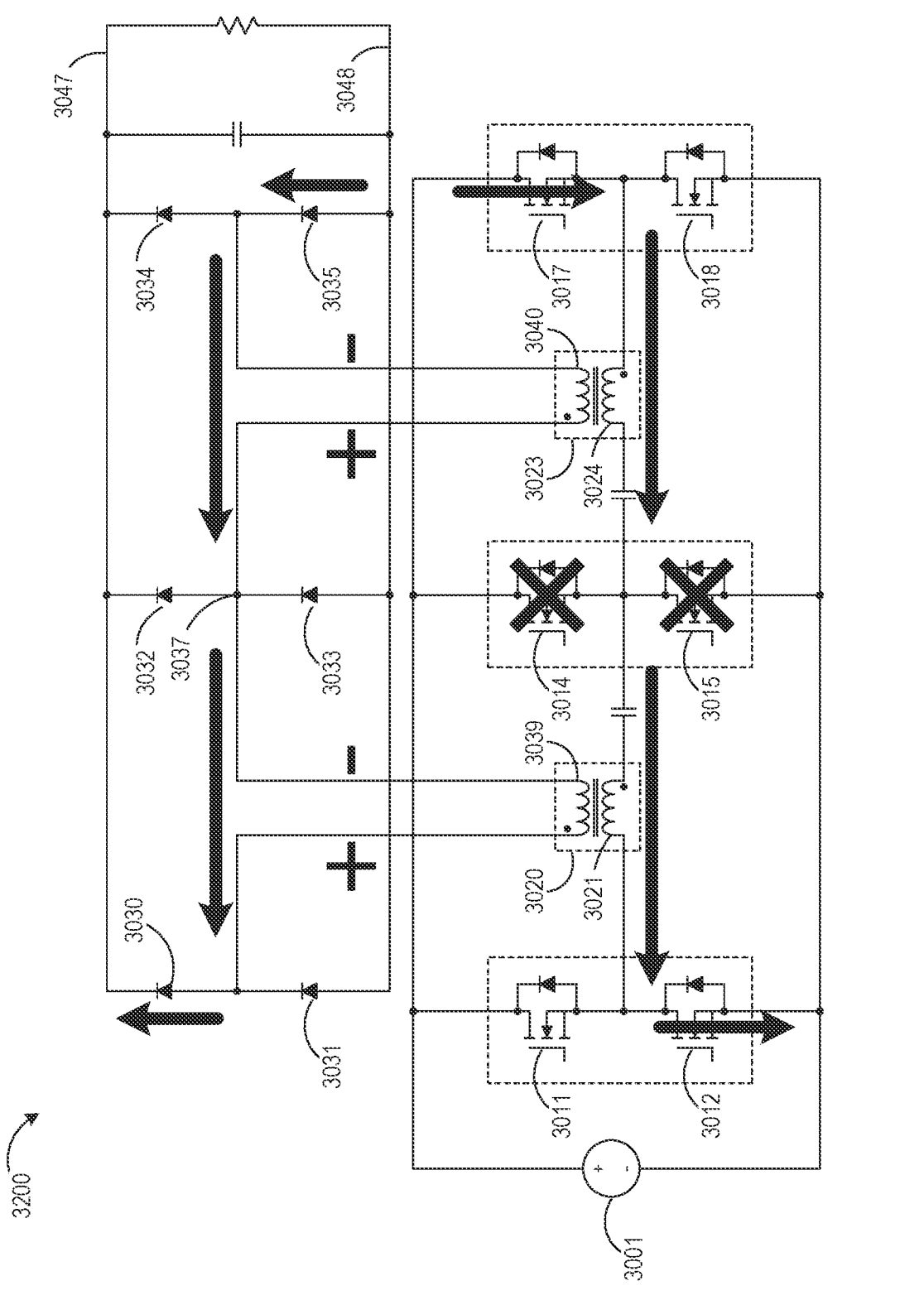

Based on the arrangement of the voltage converter 3000 of FIG. 30, multiple control schemes may be used to operate the voltage converter 3000 to produce output voltages in a wide range of values with a high efficiency. A first control scheme is illustrated in FIGS. 31 and 32 that show two operating modes 3100, 3200 of a full bridge operation in which the two transformers 3020, 3023 are operated in series (e.g., a two-transformer-in-series full bridge operational control scheme). In the first operating mode 3100 of FIG. 31, switching devices 3011, 3018 are controlled into their conducting modes, and switching devices 3012, 3017 are controlled into their non-conducting modes. In this manner, current from the voltage source 3001 flows through the transformers 3020, 3023 as indicated by the bold arrows.

The current flows through the primary windings 3021, 3024, as indicated, from their non-dot ends toward their dot ends. Accordingly, current in the secondary windings 3039, 3040 is caused to flow from their dot ends to their non-dot ends. As shown, the top diodes 3030, 3032, 3034 are paralleled to the first output rail 3047, and their anodes are connected to the secondary windings 3039, 3040, the winding node with the highest voltage potential dictates which diode turns on. The full bridge series operation of the operating mode 3100 results in the non-dot end of the secondary winding 3040 having the highest voltage potential due to the stacking of the voltages across the series-coupled transformers 3020, 3023. As such, diode 3034 turns on to provide the voltage to the first output rail 3047. Similarly, the bottom diodes 3031, 3033, 3035 are paralleled to the second output rail 3048, and the winding node with the lowest voltage potential dictates which diode turns on. Diode 3031, thus, turns on to draw current from the second output rail 3048.

In the second operating mode 3200, switching devices 3012, 3017 are controlled into their conducting modes, and switching devices 3011, 3018 are controlled into their non-conducting modes. Accordingly, current from the voltage source 3001 flows in an opposite direction through the transformers 3020, 3023 as indicated. In this mode 3200, the current flows through the primary windings 3021, 3024, as indicated, from their dot ends toward their non-dot ends. Accordingly, current in the secondary windings 3039, 3040 is caused to flow from their non-dot ends to their dot ends. As such, diode 3030 turns on to provide the voltage to the first output rail 3047, and diode 3035 turns on to draw current from the second output rail 3048.

In both operating modes 3100, 3200, switching devices 3014, 3015 remain controlled into their non-conducting modes to facilitate the series connection of the transformer assemblies 3020, 3023.

Figure 33:
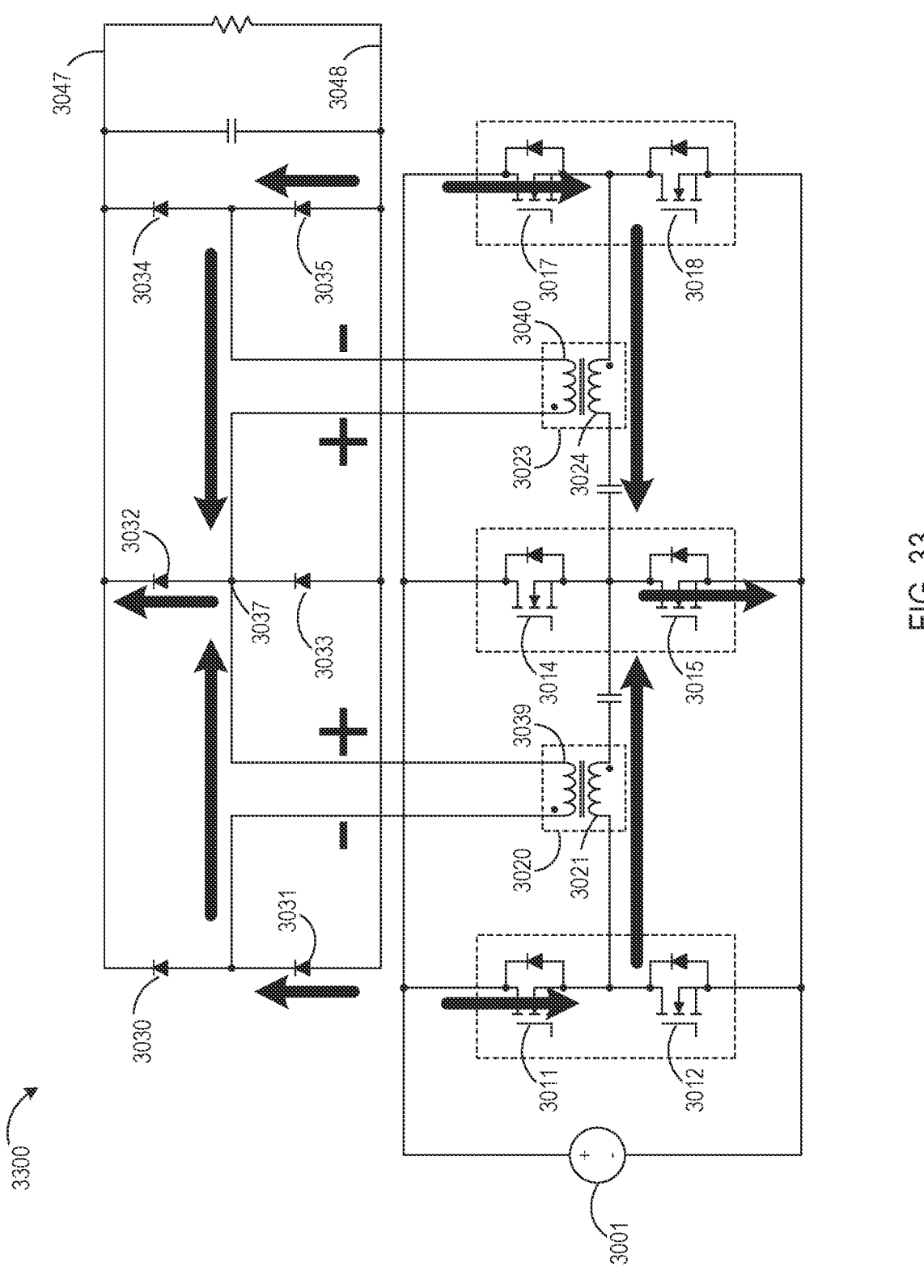
FIGS. 33 and 34 illustrate operational modes of the voltage converter of FIG. 30 during a second control scheme according to one or more embodiments.
Figure 34:
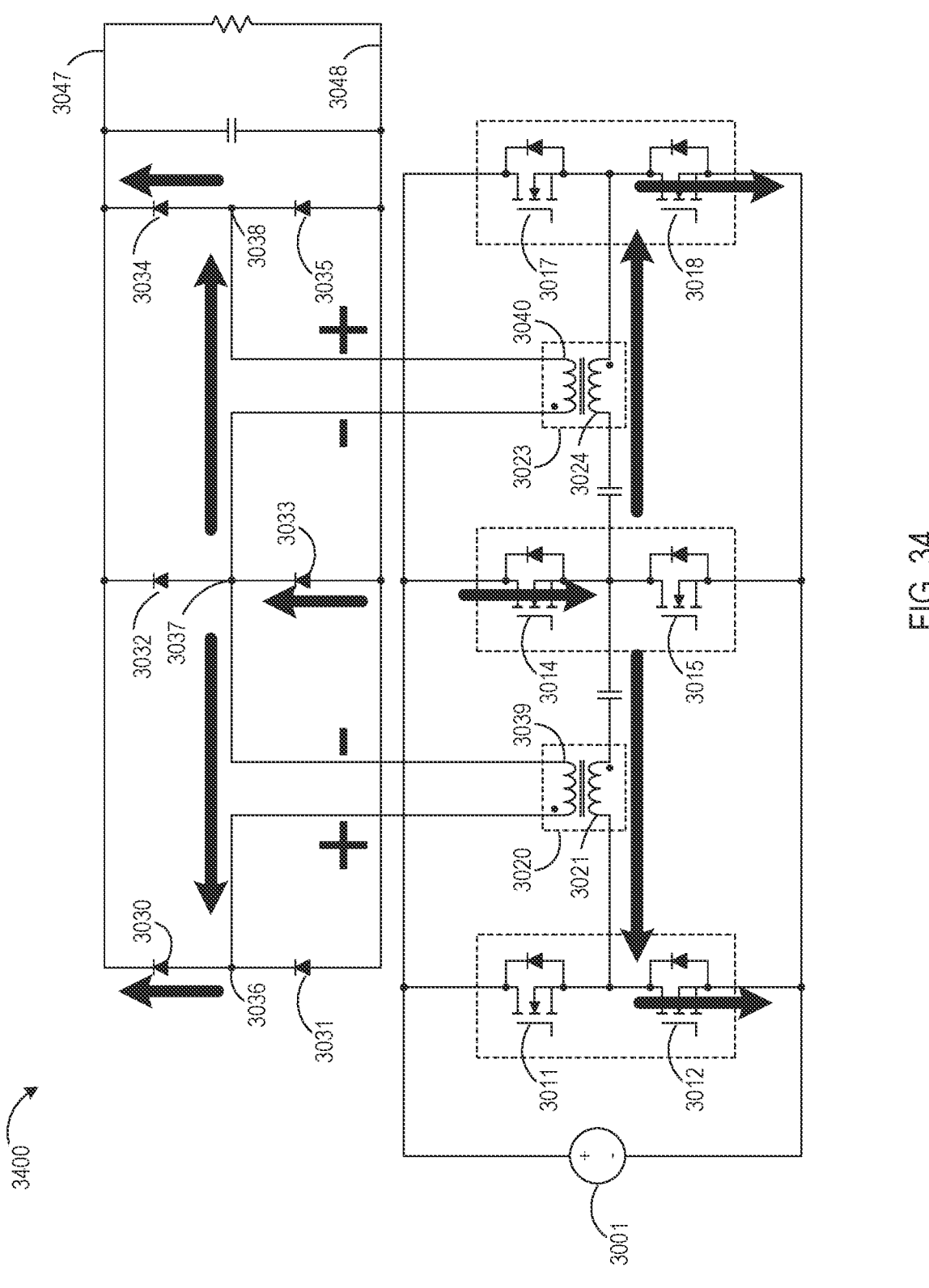

A second control scheme is illustrated in FIGS. 33 and 34 that show two operating modes 3300, 3400 of a parallel full bridge operation in which the transformers 3020, 3023 are operated in parallel (e.g., a two-transformer-in-series parallel full bridge operational control scheme). In the first operating mode 3300 of FIG. 33, switching devices 3011, 3015, 3017 are controlled into their conducting modes, and switching devices 3012, 3014, and 3018 are controlled into their non-conducting modes. In this manner, current from the voltage source 3001 flows through the transformers 3020, 3023 in contrary directions as indicated by the bold arrows.

In the primary winding 3021 of transformer 3020, current flows from its non-dot end toward its dot end. However, in the primary winding 3024 of second transformer assembly 3023, the current flows from its dot end toward its non-dot end. Accordingly, current in the secondary winding 3039 flows from its dot end toward its non-dot end, and current in the secondary winding 3040 flows from its non-dot end toward its dot end. The parallel full bridge operational control scheme operation of the operating mode 3300 results in the common node 3037 between the secondary windings 3039, 3040 having the highest voltage potential due to the parallel voltages. As such, diode 3032 turns on to provide the voltage to the first output rail 3047. Diodes 3031 and 3035 turn on to draw current from the second output rail 3048.

In the second operating mode 3400, switching devices 3012, 3018 are controlled into their conducting modes, and switching devices 3011, 3015, and 3017 are controlled into their non-conducting modes. In this manner, current from the voltage source 3001 flows in an opposite direction through the transformers 3020, 3023 as indicated. In the primary winding 3021 of transformer 3020, current flows from its dot end toward its non-dot end. In the primary winding 3024 of second transformer assembly 3023, the current flows from its non-dot end toward its dot end. Accordingly, current in the secondary winding 3039 flows away from the common node 3037 and toward the common nodes 3036, 3038. As such, diodes 3030, 3034 turn on to provide the voltage to the first output rail 3047, and diode 3033 turns on to draw current from the second output rail 3048.

Figure 35:
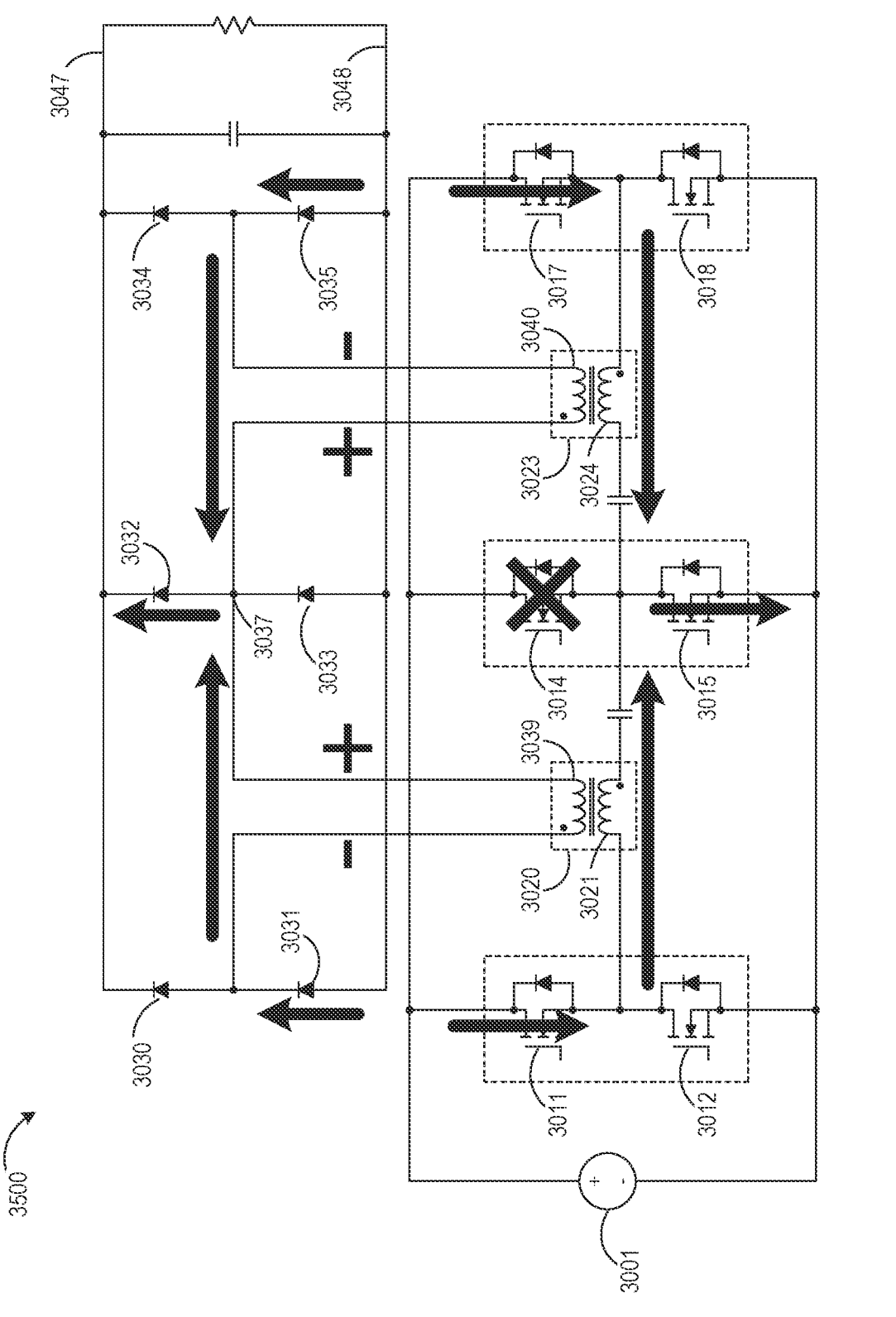
FIGS. 35 and 36 illustrate operational modes of the voltage converter of FIG. 30 during a third control scheme according to one or more embodiments.
Figure 36:
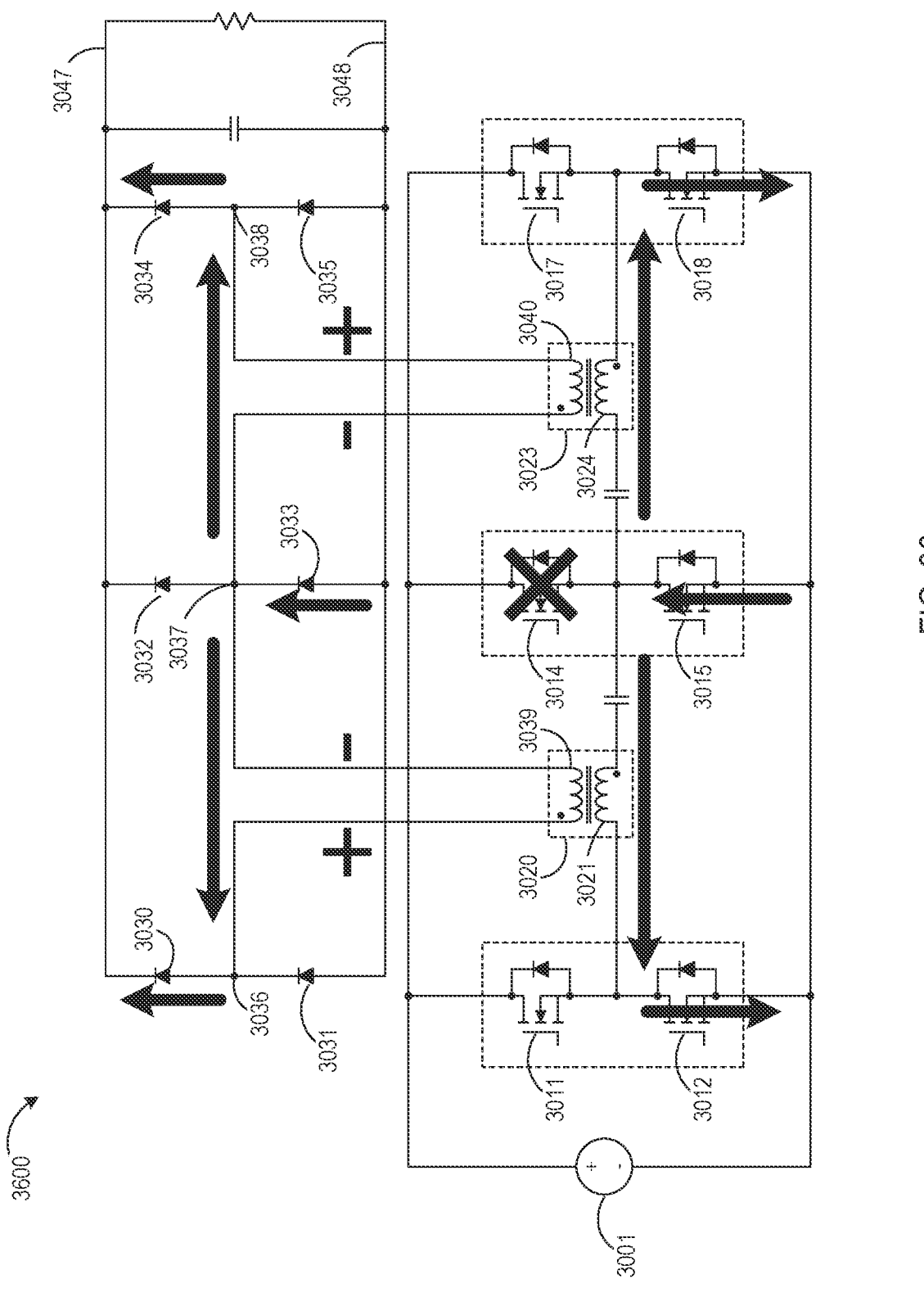

A third control scheme is illustrated in FIGS. 35 and 36 that show two operating modes 3500, 3600 of a parallel half bridge operation in which the transformers 3020, 3023 are operated in parallel (e.g., a parallel half bridge operational control scheme). In the first operating mode 3500 of FIG. 35, switching devices 3011, 3015, 3017 are controlled into their conducting modes, and switching devices 3012, 3018 are controlled into their non-conducting modes. In this manner, current from the voltage source 3001 flows through the transformers 3020, 3023 in contrary directions as indicated by the bold arrows.

In the primary winding 3021 of transformer 3020, current flows from its non-dot end toward its dot end. However, in the primary winding 3024 of second transformer assembly 3023, the current flows from its dot end toward its non-dot end. Accordingly, current in the secondary winding 3039 flows from its dot end toward its non-dot end, and current in the secondary winding 3040 flows from its non-dot end toward its dot end. The parallel half bridge operational control scheme operation of the operating mode 3500 results in the common node 3037 between the secondary windings 3039, 3040 having the highest voltage potential due to the parallel voltages. As such, diode 3032 turns on to provide the voltage to the first output rail 3047. Diodes 3031 and 3035 turn on to draw current from the second output rail 3048.

In the second operating mode 3600, switching devices 3012, 3015, 3018 are controlled into their conducting modes, and switching devices 3011, 3017 are controlled into their non-conducting modes. Accordingly, stored current within the transformers 3020, 3023 flows in an opposite direction as indicated. In the primary winding 3021 of transformer 3020, current flows from its dot end toward its non-dot end. In the primary winding 3024 of second transformer assembly 3023, the current flows from its non-dot end toward its dot end. Accordingly, current in the secondary winding 3039 flows away from the common node 3037 and toward the common nodes 3036, 3038. As such, diodes 3030, 3034 turn on to provide the voltage to the first output rail 3047, and diode 3033 turns on to draw current from the second output rail 3048.

In both operating modes 3500, 3600, switching device 3014 remains controlled into its non-conducting mode.

Figure 37:
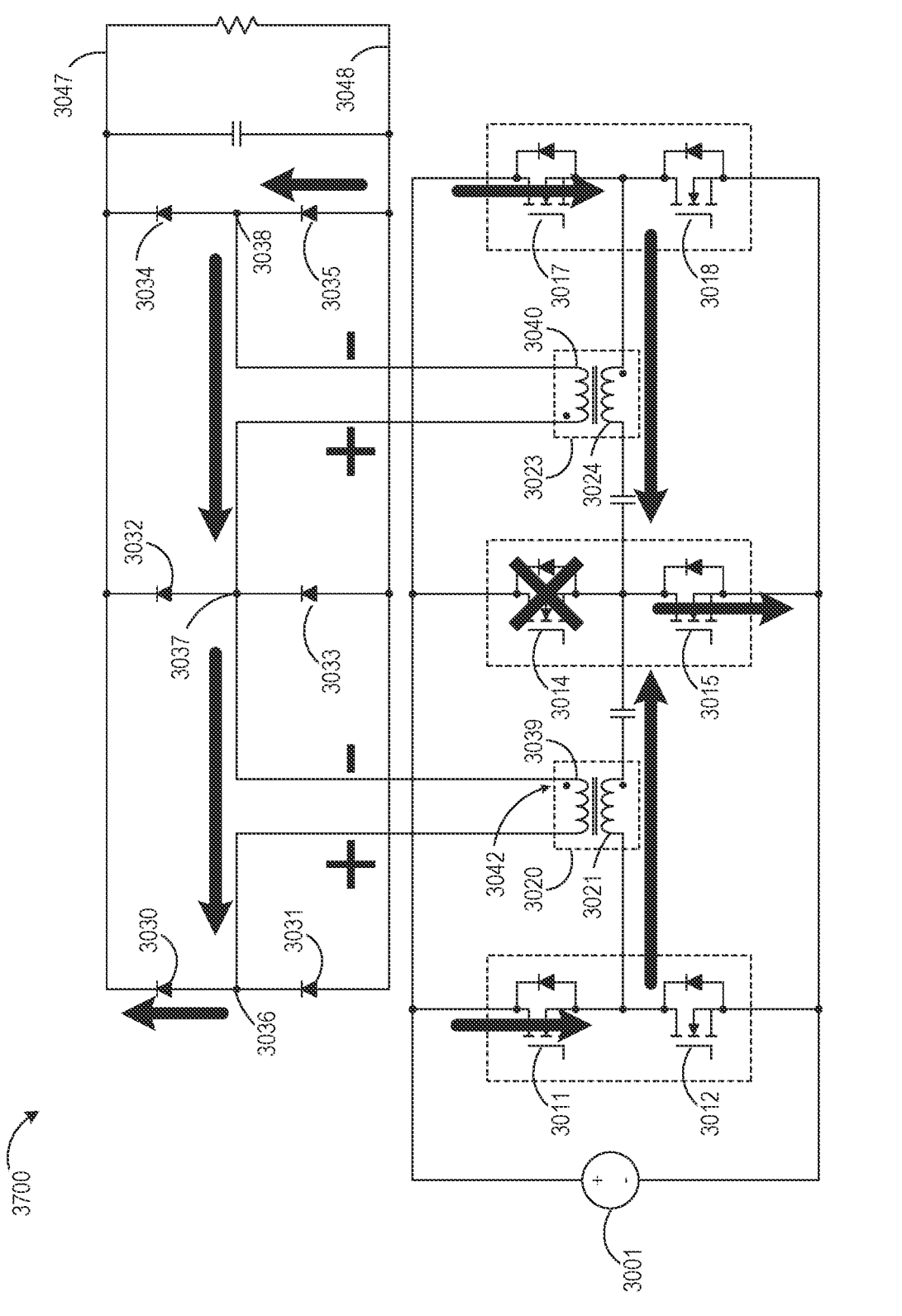
FIGS. 37 and 38 illustrate operational modes of a modification of the voltage converter of FIG. 30 during a control scheme according to one or more embodiments.
Figure 38:
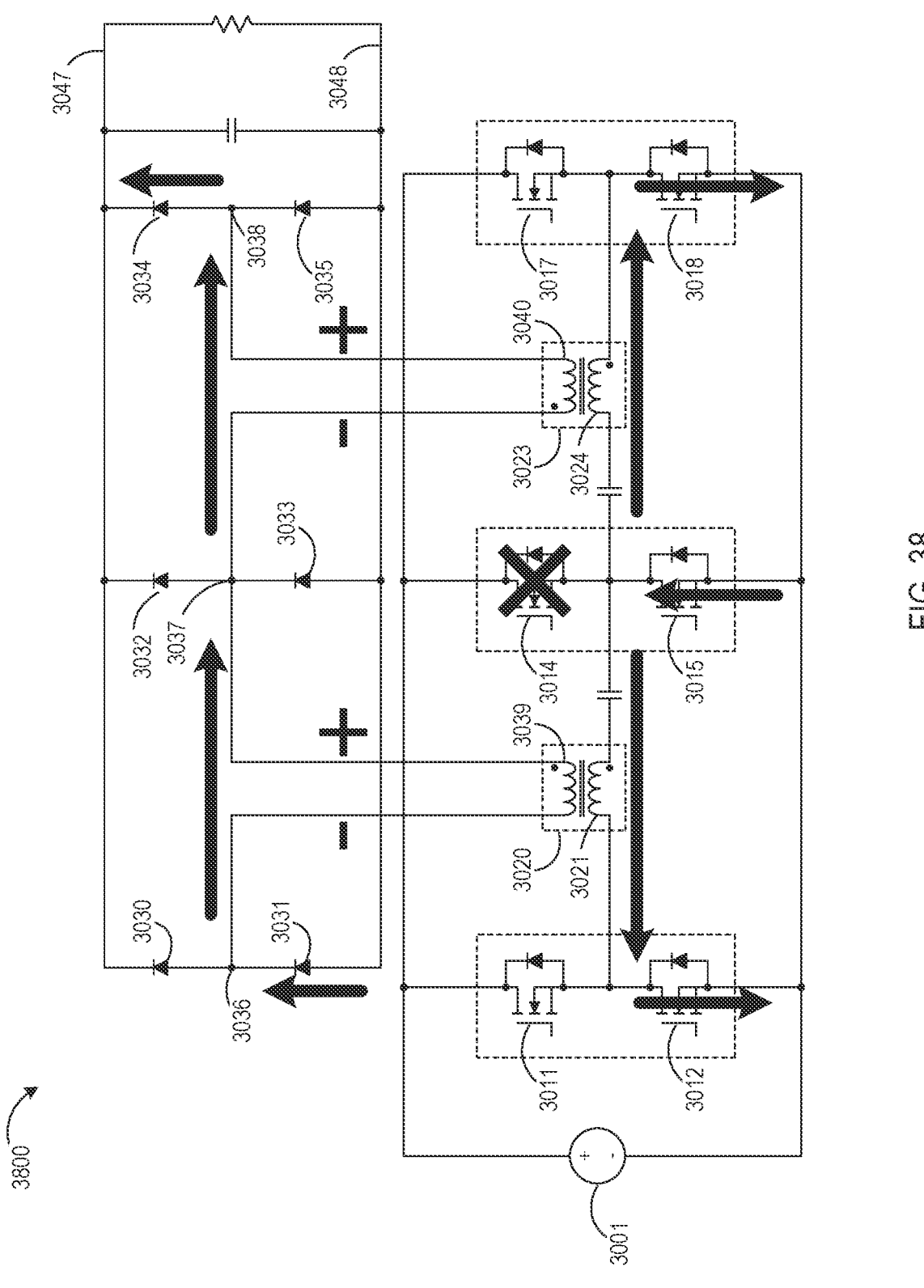

A control scheme is illustrated in FIGS. 37 and 38 that show two operating modes 3700, 3800 of a parallel half bridge operation in a similar manner as that of FIGS. 35 and 36. However, a modification of the voltage converter 3000 of FIG. 30 is shown in FIGS. 37 and 38 where the dot end 3042 of the secondary winding 3039 is repositioned to be on the same side of the first transformer assembly 3020 as the dot end 3041 of the primary winding 3021. The dot end 3044 of the secondary winding 3040, however, has not been changed. In the first operating mode 3500 of FIG. 35 that causes the transformers 3020, 3023 to be operated in parallel (e.g., a parallel half bridge operational control scheme), switching devices 3011, 3015, 3017 are controlled into their conducting modes, and switching devices 3012, 3018 are controlled into their non-conducting modes. In this manner, current from the voltage source 3001 flows through the transformers 3020, 3023 in contrary directions as indicated by the bold arrows.

In the primary winding 3021 of transformer 3020, current flows from its non-dot end toward its dot end. However, in the primary winding 3024 of second transformer assembly 3023, the current flows from its dot end toward its non-dot end. Accordingly, current in the secondary winding 3039, with its dot end 3042 on the same side as the dot end 3041, flows from its dot end toward its non-dot end, and current in the secondary winding 3040 flows from its non-dot end toward its dot end. The parallel half bridge operational control scheme operation of the operating mode 3700 results in the current in the secondary windings 3039, 3040 being caused to flow toward the common node 3036. As such, diode 3030 turns on to provide the voltage to the first output rail 3047. Diode 3035 turns on to draw current from the second output rail 3048.

In the second operating mode 3800, switching devices 3012, 3015, 3018 are controlled into their conducting modes, and switching devices 3011, 3017 are controlled into their non-conducting modes. Accordingly, stored energy within the transformers 3020, 3023 and capacitors 3022, 3025 is caused to flow in an opposite direction as indicated. In the primary winding 3021 of transformer 3020, current flows from its dot end toward its non-dot end. In the primary winding 3024 of second transformer assembly 3023, the current flows from its non-dot end toward its dot end. Accordingly, current in the secondary winding 3039 flows away toward the common node 3038. As such, diode 3034 turns on to provide the voltage to the first output rail 3047, and diode 3031 turns on to draw current from the second output rail 3048.

In both operating modes 3700, 3800, switching device 3014 remains controlled into its non-conducting mode.

The modification to the voltage converter 3000 of FIG. 30 illustrated in FIGS. 37, 38 illustrates an example of the type of changes that can be made by one skilled in the art to one or more of the embodiments described herein. Such modifications are considered to be within the scope of this disclosure.

Figure 39:
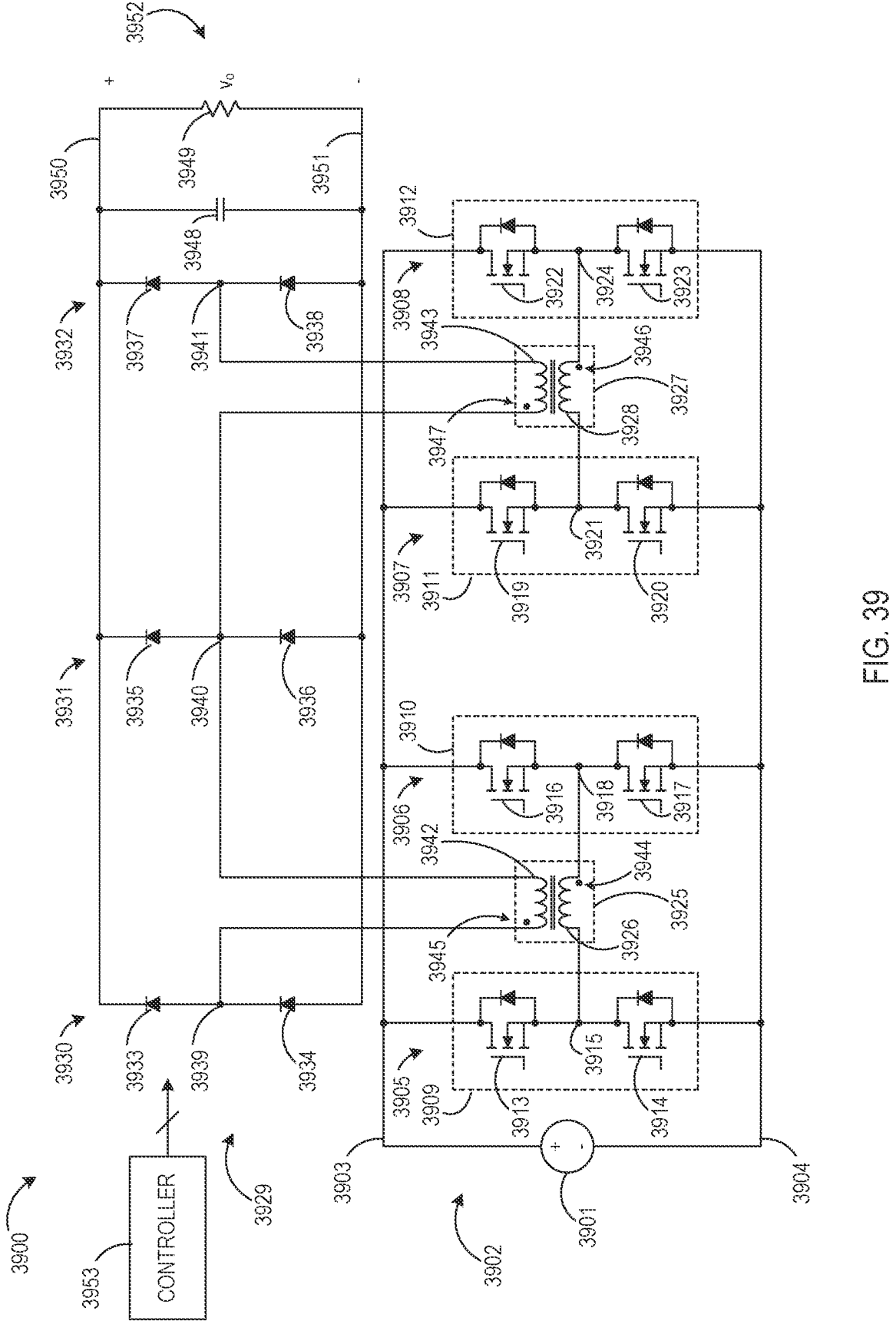
FIG. 39 is a schematic diagram of a voltage converter according to one or more embodiments.

FIG. 39 is a schematic block diagram of a voltage converter 3900 according to an embodiment. A voltage source 3901 is coupled to a primary side 3902 of the voltage converter 3900 having a voltage bus having a positive rail 3903 and a negative rail 3904. The voltage converter 3900 includes a first pair of switch legs 3905, 3906 coupled together in parallel across the voltage bus 3903, 3904 in a first full bridge arrangement and a second pair of switch legs 3907, 3908 coupled together in parallel across the voltage bus 3903, 3904 in a second full bridge arrangement. Each leg includes a respective switch assembly 3909-3912 comprising a plurality of switching components as described hereinbelow. The switch assembly 3909 includes a pair of switching devices 3913, 3914 and are serially coupled together at a common node 3915. The switch assembly 3910 includes a pair of switching devices 3916, 3917 serially coupled together at a common node 3918. The switch assembly 3911 includes a pair of switching devices 3919, 3920 serially coupled together at a common node 3921. The switch assembly 3912 includes a pair of switching devices 3922, 3923 serially coupled together at a common node 3924. In the embodiment illustrated, switching devices are MOSFETs. A first transformer assembly 3925 includes a primary winding 3926 serially coupled between the common nodes 3915, 3918. A second transformer assembly 3927 includes a primary winding 3928 serially coupled between the common nodes 3921, 3924.

A secondary side 3929 of the voltage converter 3900 includes a plurality of diode legs 3930-3932, each with a respective pair of diodes 3933-3938. The diodes 3933, 3934 are serially coupled via a common node 3939, the diodes 3935, 3936 are serially coupled via a common node 3940, and the diodes 3937, 3938 are serially coupled via a common node 3941. The first transformer assembly 3925 further includes a secondary winding 3942 scrially coupled between the common nodes 3939, 3940, and the second transformer assembly 3927 further includes a secondary winding 3943 serially coupled between the common nodes 3940, 3941. A dot end 3944 of the primary winding 3926 is opposite a dot end 3945 of the secondary winding 3942, and a dot end 3946 of the primary winding 3928 is opposite a dot end 3947 of the secondary winding 3943. The secondary side 3929 additionally includes a capacitor 3948 and a load 3949 coupled across first and second rails 3950, 3951 of an output voltage bus 3952.

A controller 3953, coupled to the switch assemblies 3905-3908, is configured to control switching device elements of the switch assemblies 3905-3908 during voltage conversion operations. As described herein, various switch control schemes may be used by the controller 3953 to electrically arrange the switch assemblies 3905-3908 and transformer assemblies 3925, 3927 in configurable coupling arrangements as described herein.

Figure 40:
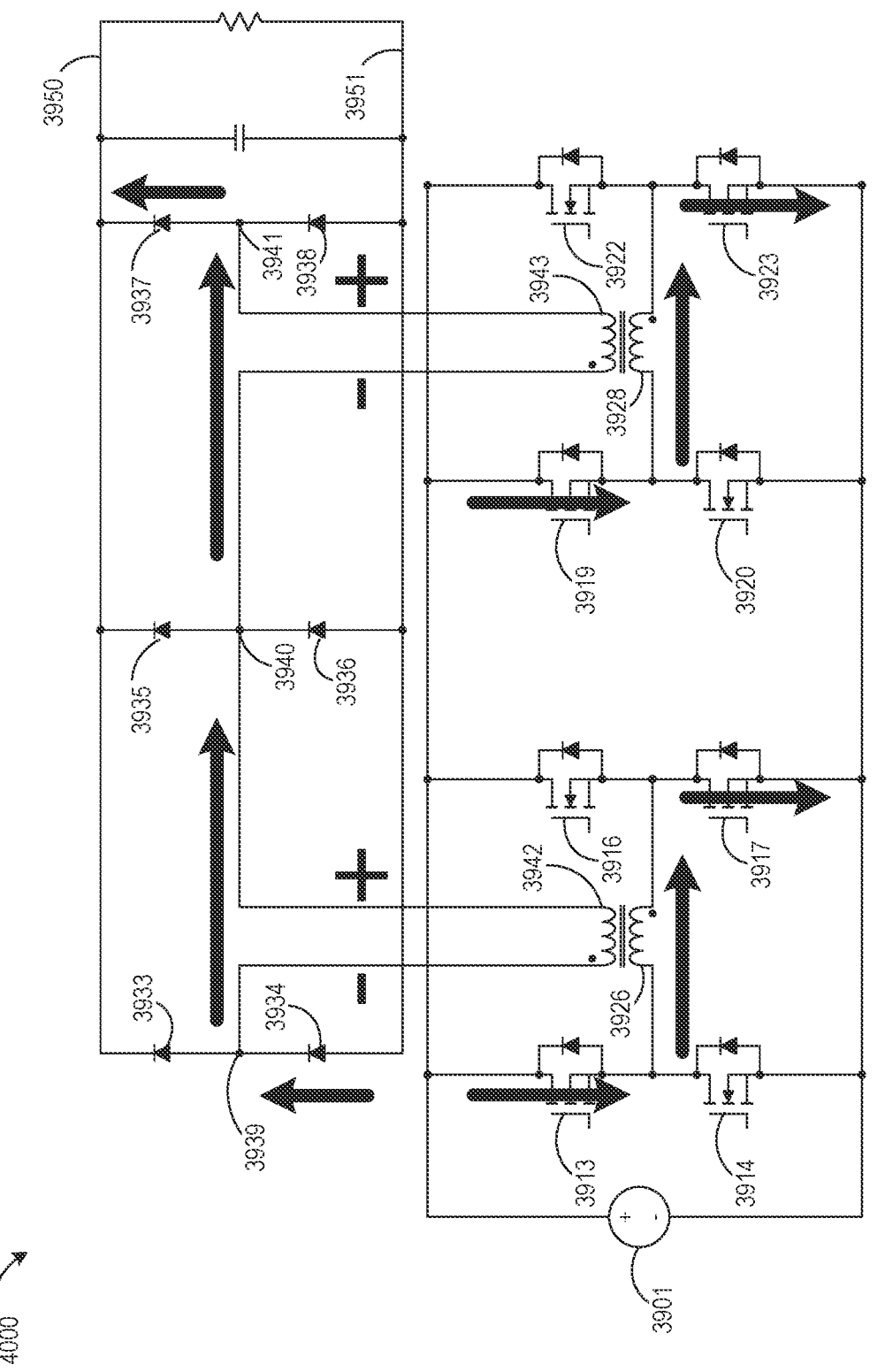
FIGS. 40 and 41 illustrate operational modes of the voltage converter of FIG. 39 during a first control scheme according to one or more embodiments.
Figure 41:
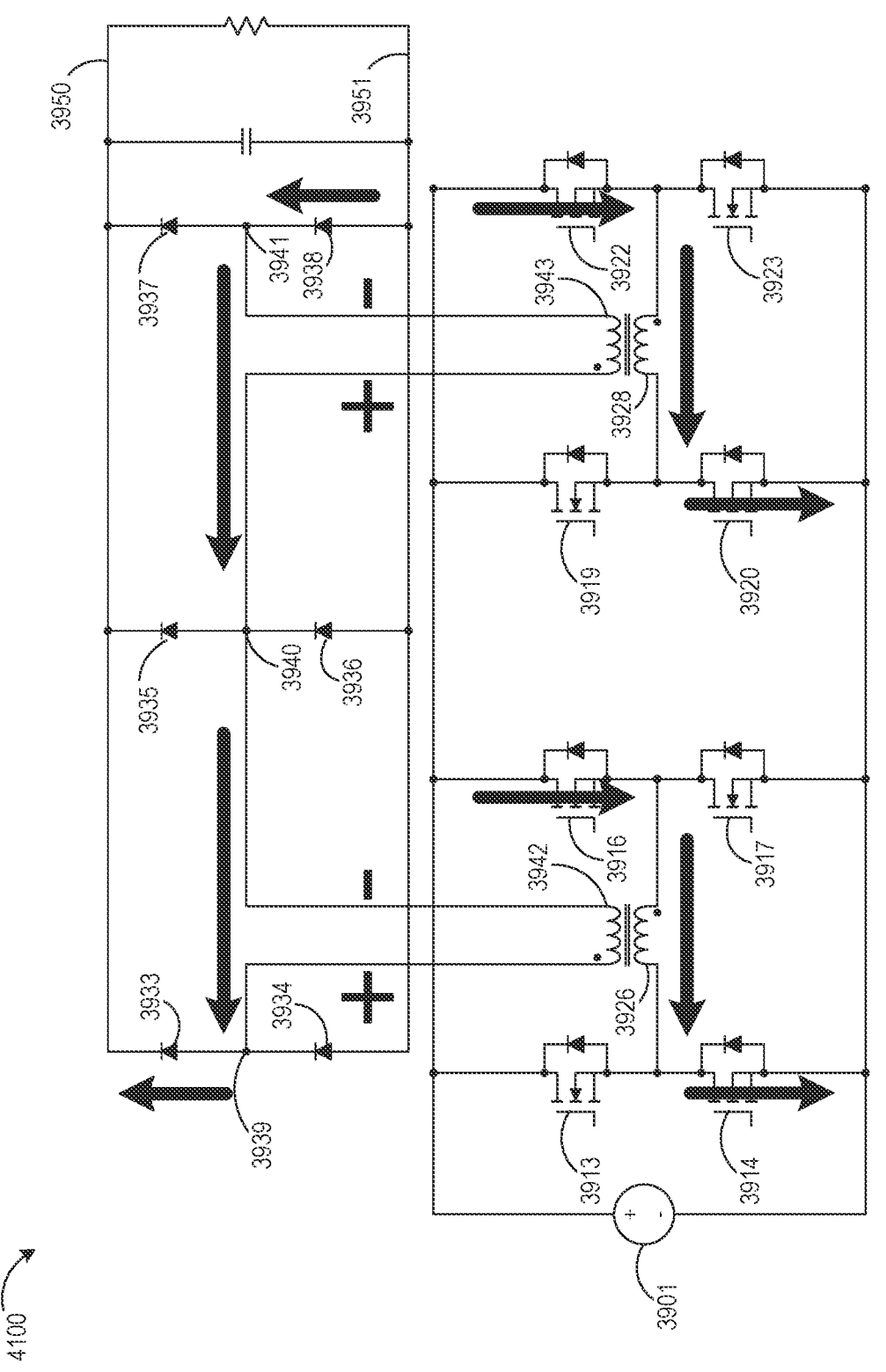

Based on the arrangement of the voltage converter 3900 of FIG. 39, multiple control schemes may be used to operate the voltage converter 3900 to produce output voltages in a wide range of values with a high efficiency. A first control scheme is illustrated in FIGS. 40 and 41 that show two operating modes 4000, 4100 of a full bridge operation (e.g., a full bridge current direction matching operational control scheme) in which current flows through the primary windings 3926, 3928 of the transformers 3925, 3927 in a same direction (e.g., from a non-dot end toward a dot end). In the first operating mode 4000 of FIG. 40, switching devices 3913, 3917 and 3919, 3923 are controlled into their conducting modes, and switching devices 3914, 3916 and 3920, 3922 are controlled into their non-conducting modes. In this manner, current from the voltage source 3901 flows through the primary windings 3926, 3928 as indicated by the bold arrows.

In this operating mode 4000, the current flows through the primary windings 3926, 3928, from their non-dot ends toward their dot ends. Similar to the operating mode 3100, current in the secondary windings 3942, 3943 is caused to flow from their dot ends to their non-dot ends. As such, diode 3937 turns on to provide the voltage to the first output rail 3950. Diode 3934 turns on to draw current from the second output rail 3951.

In the second operating mode 4100, switching devices 3914, 3916 and 3920, 3922 are controlled into their conducting modes, and switching devices 3913, 3917 and 3919, 3923 are controlled into their non-conducting modes. Accordingly, current from the voltage source 3901 flows in an opposite direction through the primary windings 3926, 3928 as indicated from their dot ends toward their non-dot ends. In response, current in the secondary windings 3942, 3943 is caused to flow from their non-dot ends to their dot ends. As such, diode 3933 turns on to provide the voltage to the first output rail 3950, and diode 3938 turns on to draw current from the second output rail 3951.

Figure 42:
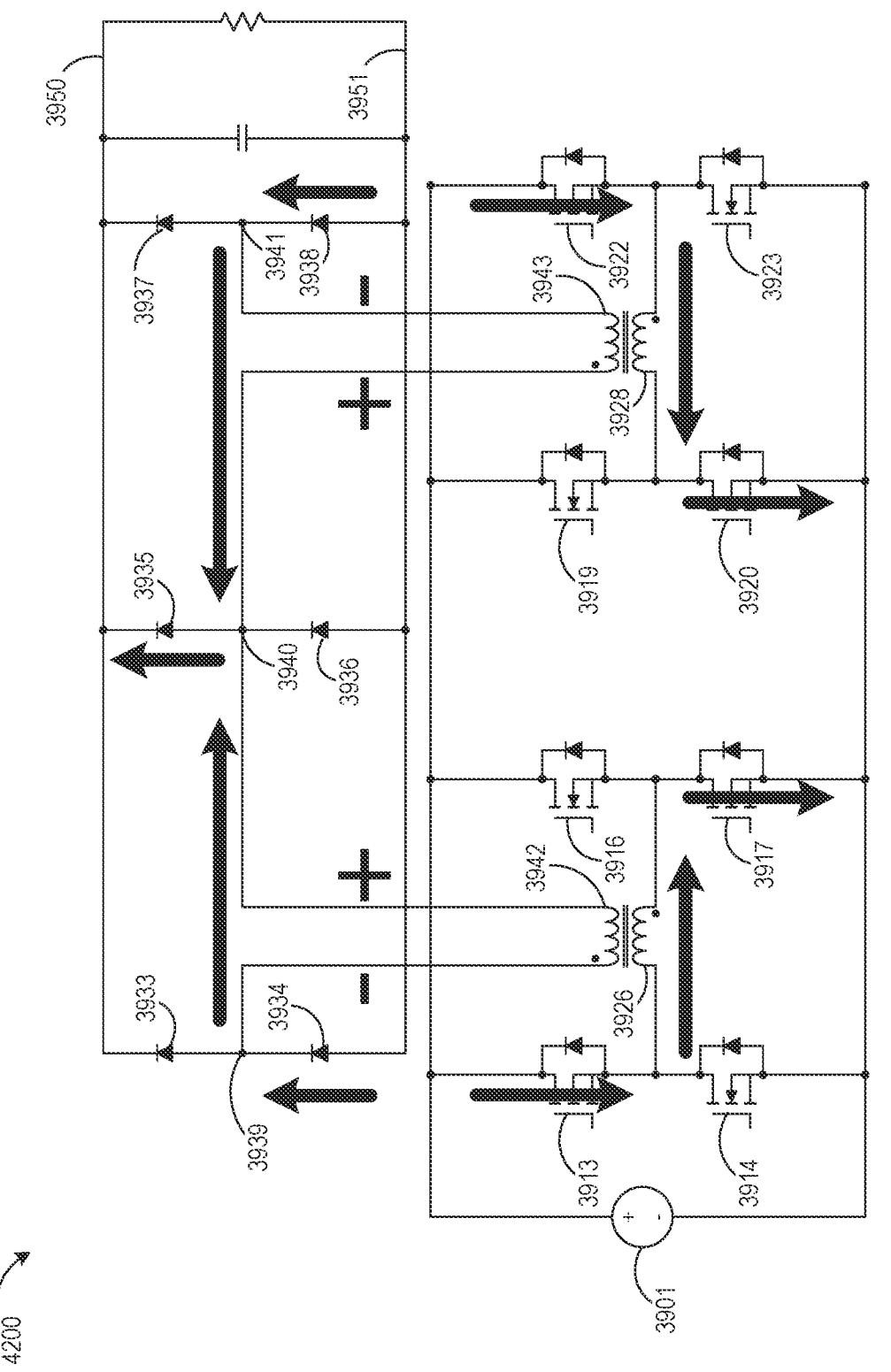
FIGS. 42 and 43 illustrate operational modes of the voltage converter of FIG. 39 during a second control scheme according to one or more embodiments.
Figure 43:
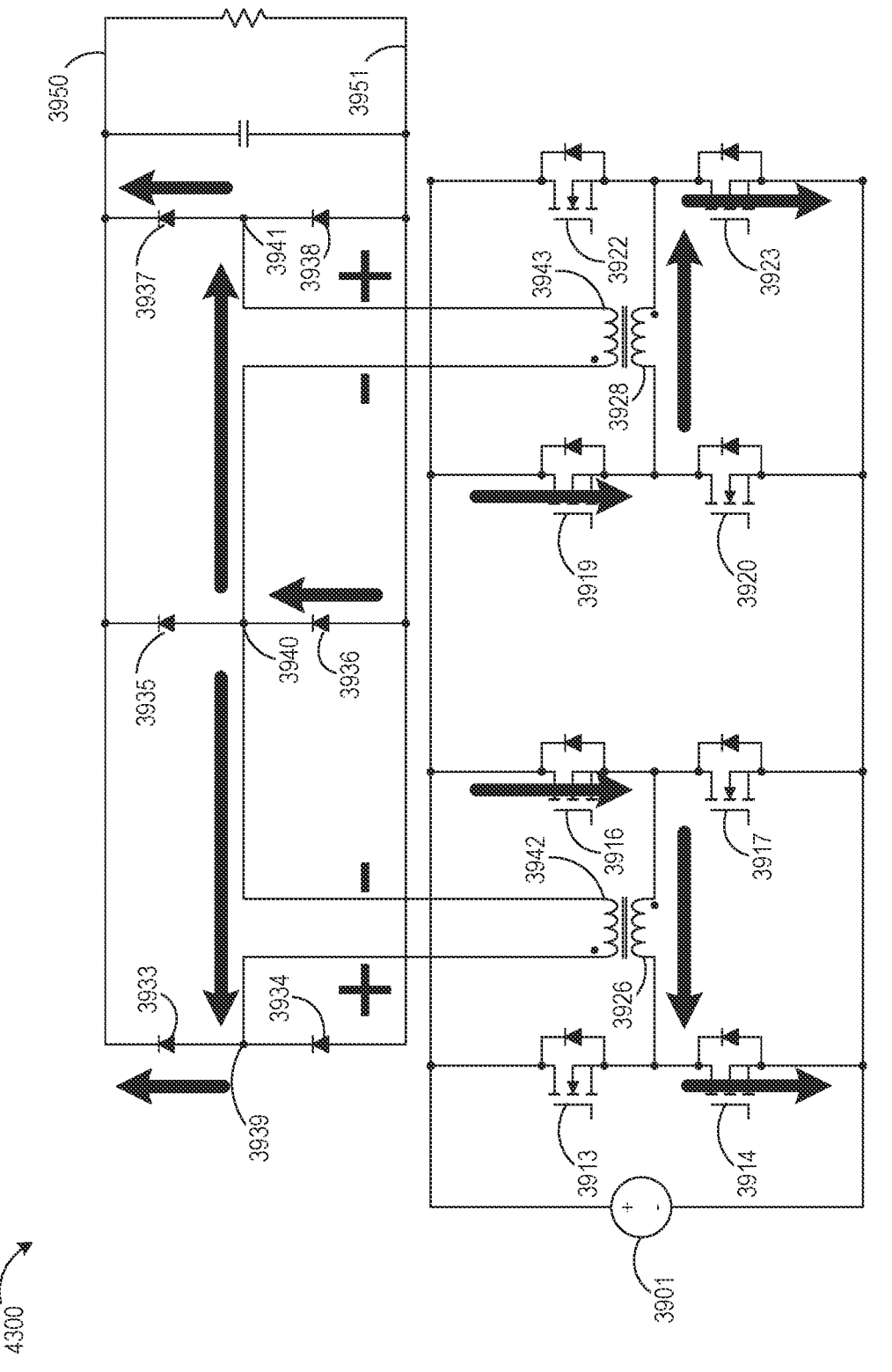

A second control scheme is illustrated in FIGS. 42 and 43 that show two operating modes 4200, 4300 of a full bridge operation (e.g., a full bridge current direction opposing operational control scheme) in which current flows through the primary windings 3926, 3928 of the transformers 3925, 3927 in opposite directions. In the first operating mode 4000 of FIG. 40, switching devices 3913, 3917 and 3920, 3922 are controlled into their conducting modes, and switching devices 3914, 3916 and 3919, 3923 are controlled into their non-conducting modes. In this manner, current from the voltage source 3901 flows through the primary winding 3926 from its non-dot end toward its dot end and through the primary winding 3928 from its dot end toward its non-dot end.

Similar to the operating mode 3500, current in the secondary windings 3942, 3943 is caused to flow toward the common central node (e.g., common node 3940). As such, diode 3935 turns on to provide the voltage to the first output rail 3950. Diodes 3934, 3938 turn on to draw current from the second output rail 3951.

In the second operating mode 4300, switching devices 3914, 3916 and 3919, 3923 are controlled into their conducting modes, and switching devices 3913, 3917 and 3920, 3922 are controlled into their non-conducting modes. Accordingly, current from the voltage source 3901 flows in an opposite direction through the primary windings 3926, 3928 as shown. In response, current from the voltage source 3901 flows through the primary winding 3926 from its dot end toward its non-dot end and through the primary winding 3928 from its non-dot end toward its dot end.

Similar to the operating mode 3600, current in the secondary windings 3942, 3943 is caused to flow away from the common central node (e.g., common node 3940). As such, diodes 3933, 3937 turn on to provide the voltage to the first output rail 3950, and diode 3936 turns on to draw current from the second output rail 3951.

Figure 44:
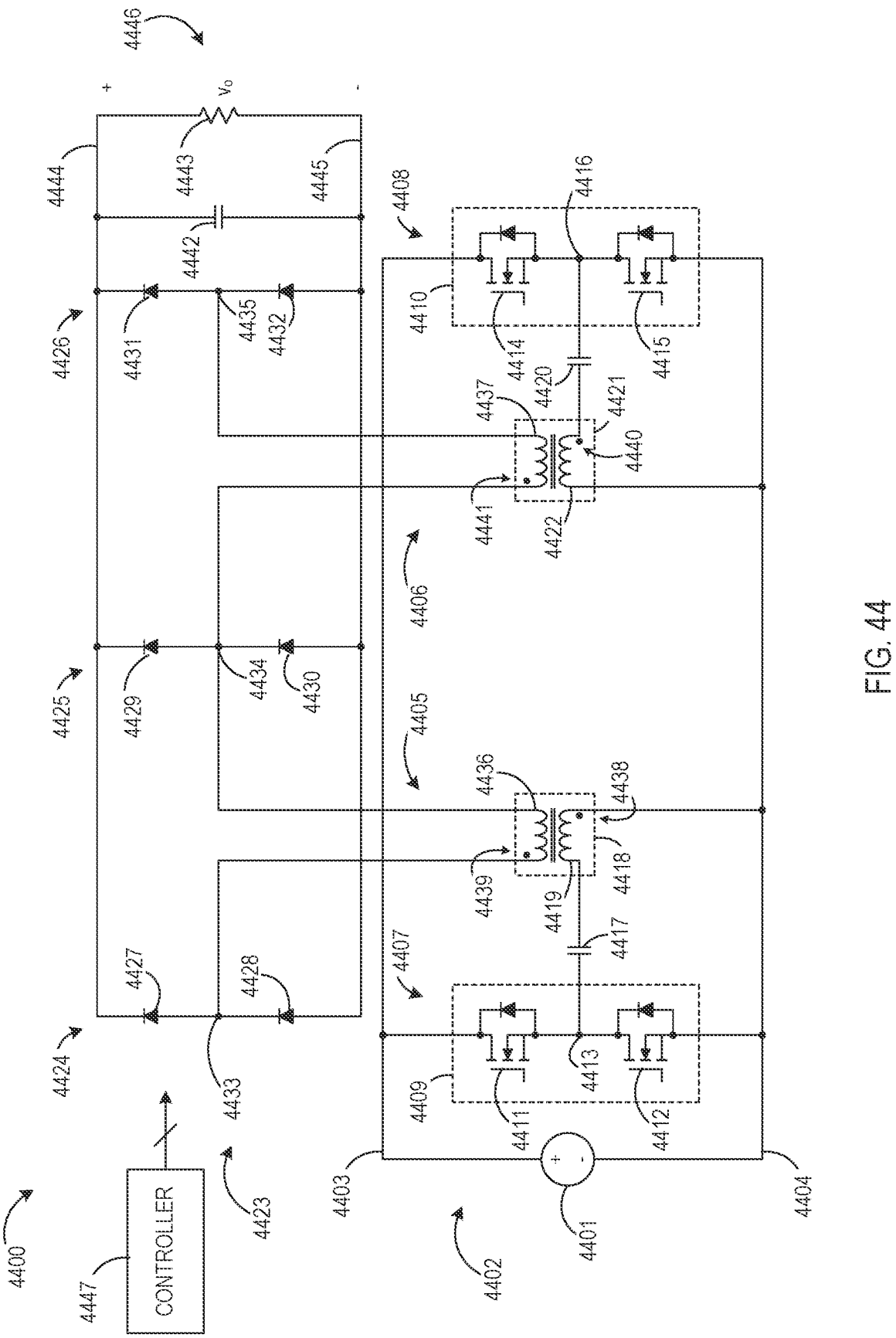
FIG. 44 is a schematic diagram of a voltage converter according to one or more embodiments.

FIG. 44 is a schematic block diagram of a voltage converter 4400 according to an embodiment. A voltage source 4401 is coupled to a primary side 4402 of the voltage converter 4400 having a voltage bus having a positive rail 4403 and a negative rail 4404. The voltage converter 4400 includes a pair of half bridges 4405, 4406 coupled in parallel across the voltage bus 4403, 4404. A half bridge switch leg 4407 of the half bridge 4405 is coupled across the voltage bus 4403, 4404 and a half bridge switch leg 4408 of the half bridge 4406 is coupled across the voltage bus 4403, 4404. Each leg includes a respective switch assembly 4409, 4410 comprising a plurality of switching components as described hereinbelow. The switch assembly 4409 includes a pair of switching devices 4411, 4412 are serially coupled together at a common node 4413. The switch assembly 4410 includes a pair of switching devices 4414, 4415 serially coupled together at a common node 4416. In the embodiment illustrated, switching devices are MOSFETs. A capacitor 4417 is coupled between the common node 4413 and a first transformer assembly 4418 that includes a primary winding 4419 serially coupled between the capacitor 4417 and the negative rail 4404. Another capacitor 4420 is coupled between the common node 4416 and a second transformer assembly 4421 that includes a primary winding 4422 serially coupled between the capacitor 4420 and the negative rail 4404.

A secondary side 4423 of the voltage converter 4400 includes a plurality of diode legs 4424-4426, each with a respective pair of diodes 4427-4432. The diodes 4427, 4428 are serially coupled via a common node 4433, the diodes 4429, 4430 are serially coupled via a common node 4434, and the diodes 4431, 4432 are serially coupled via a common node 4435. The first transformer assembly 4418 further includes a secondary winding 4436 serially coupled between the common nodes 4433, 4434, and the second transformer assembly 4421 further includes a secondary winding 4437 serially coupled between the common nodes 4434, 4435. A dot end 4438 of the primary winding 4419 is opposite a dot end 4439 of the secondary winding 4436, and a dot end 4440 of the primary winding 4422 is opposite a dot end 4441 of the secondary winding 4437. The secondary side 4423 additionally includes a capacitor 4442 and a load 4443 coupled across first and second rails 4444, 4445 of an output voltage bus 4446.

A controller 4447, coupled to the switch assemblies 4407, 4408 is configured to control switching device elements of the switch assemblies 4407, 4408 during voltage conversion operations. As described herein, various switch control schemes may be used by the controller 4447 to electrically arrange the switch assemblies 4407, 4408 and transformer assemblies 4418, 4421 in configurable coupling arrangements as described herein.

Figure 45:
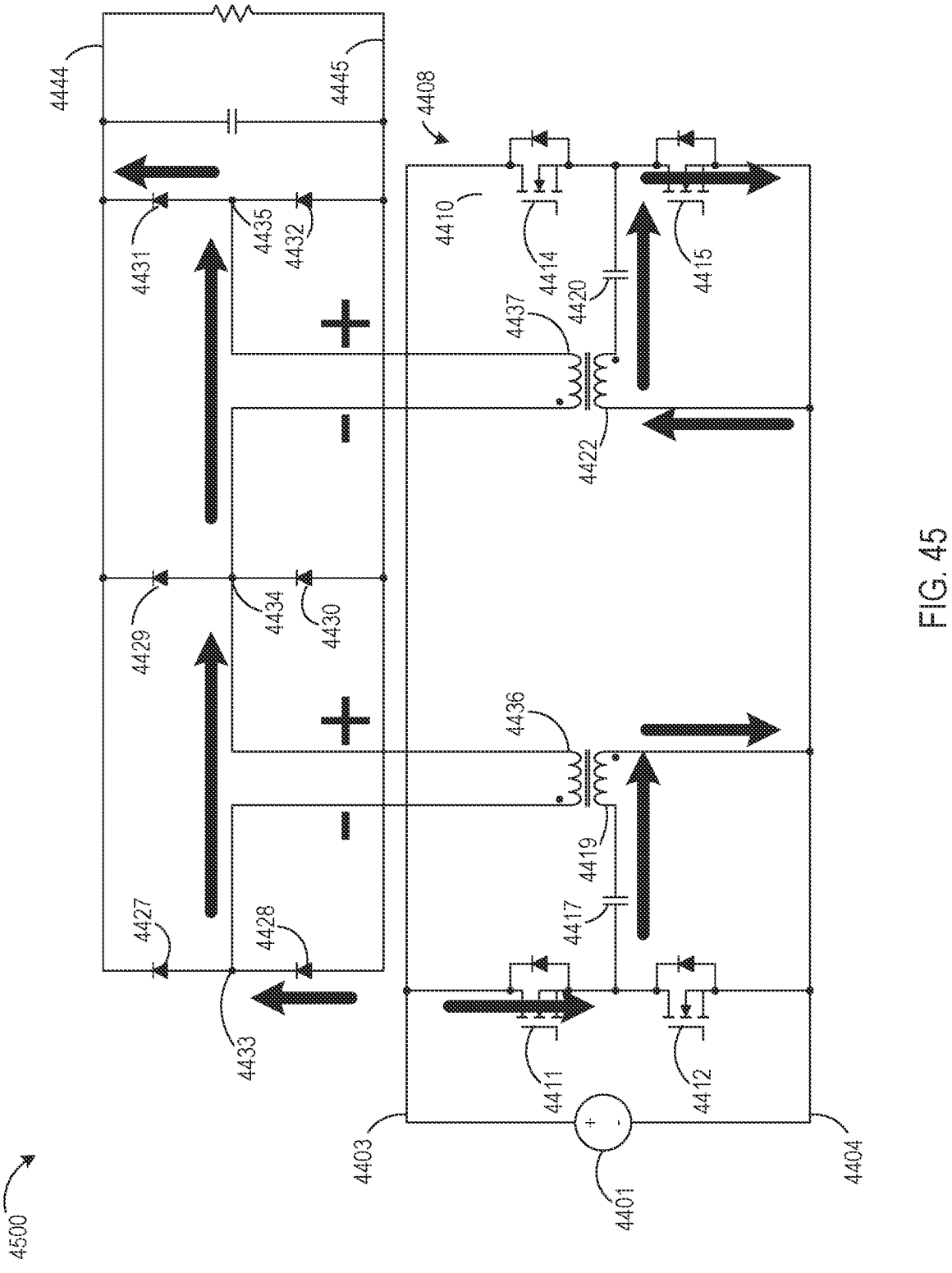
FIGS. 45 and 46 illustrate operational modes of the voltage converter of FIG. 44 during a first control scheme according to one or more embodiments.
Figure 46:
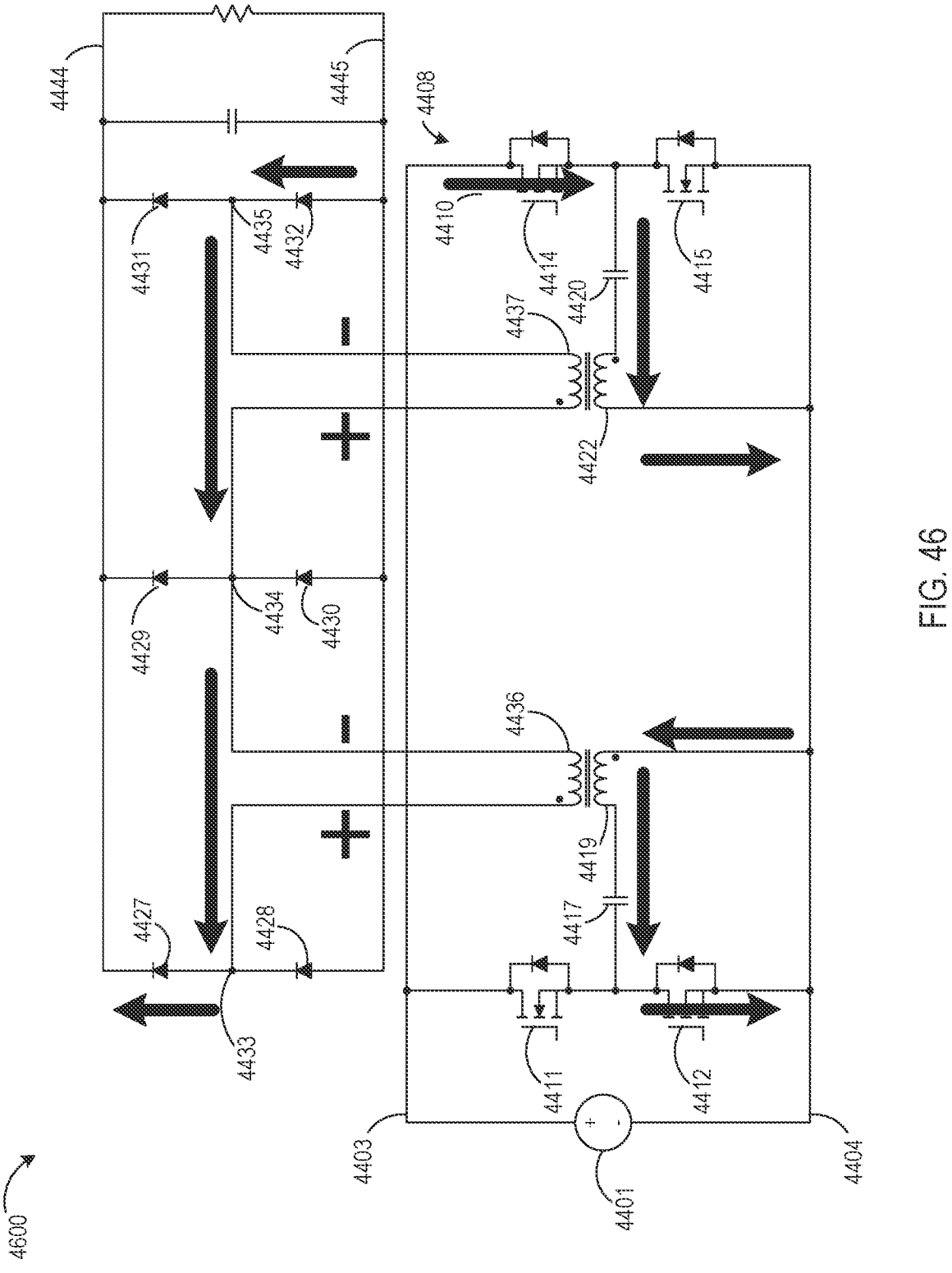

Based on the arrangement of the voltage converter 4400 of FIG. 44, multiple control schemes may be used to operate the voltage converter 4400 to produce output voltages in a wide range of values with a high efficiency. A first control scheme is illustrated in FIGS. 45 and 46 that show two operating modes 4500, 4600 of a half bridge operation (e.g., a half bridge current direction matching operational control scheme) in which current flows through the primary windings 4419, 4422 of the transformers 4418, 4421 in a same direction (e.g., from a non-dot end toward a dot end). In the first operating mode 4500 of FIG. 45, switching devices 4411, 4415 are controlled into their conducting modes, and switching devices 4412, 4414 are controlled into their non-conducting modes. In this manner, current from the voltage source 4401 flows through the primary winding 4419, and stored current in the transformer 4421 flows as indicated by the bold arrows.

In this operating mode 4500, the current flows through the primary windings 4419, 4422, from their non-dot ends toward their dot ends. Similar to the operating modes 3100 and 4000, current in the secondary windings 4436, 4437 is caused to flow from their dot ends to their non-dot ends. As such, diode 4431 turns on to provide the voltage to the first output rail 4444. Diode 4428 turns on to draw current from the second output rail 4445.

In the second operating mode 4600, switching devices 4412, 4414 are controlled into their conducting modes, and switching devices 4411, 4415 are controlled into their non-conducting modes. Accordingly, current flows through the primary windings 4419, 4422, from their dot ends toward their non-dot ends. Similar to the operating modes 3200 and 4100, current in the secondary windings 4436, 4437 is caused to flow from their non-dot ends to their dot ends. As such, diode 4427 turns on to provide the voltage to the first output rail 4444, and diode 4432 turns on to draw current from the second output rail 4445.

Figure 47:
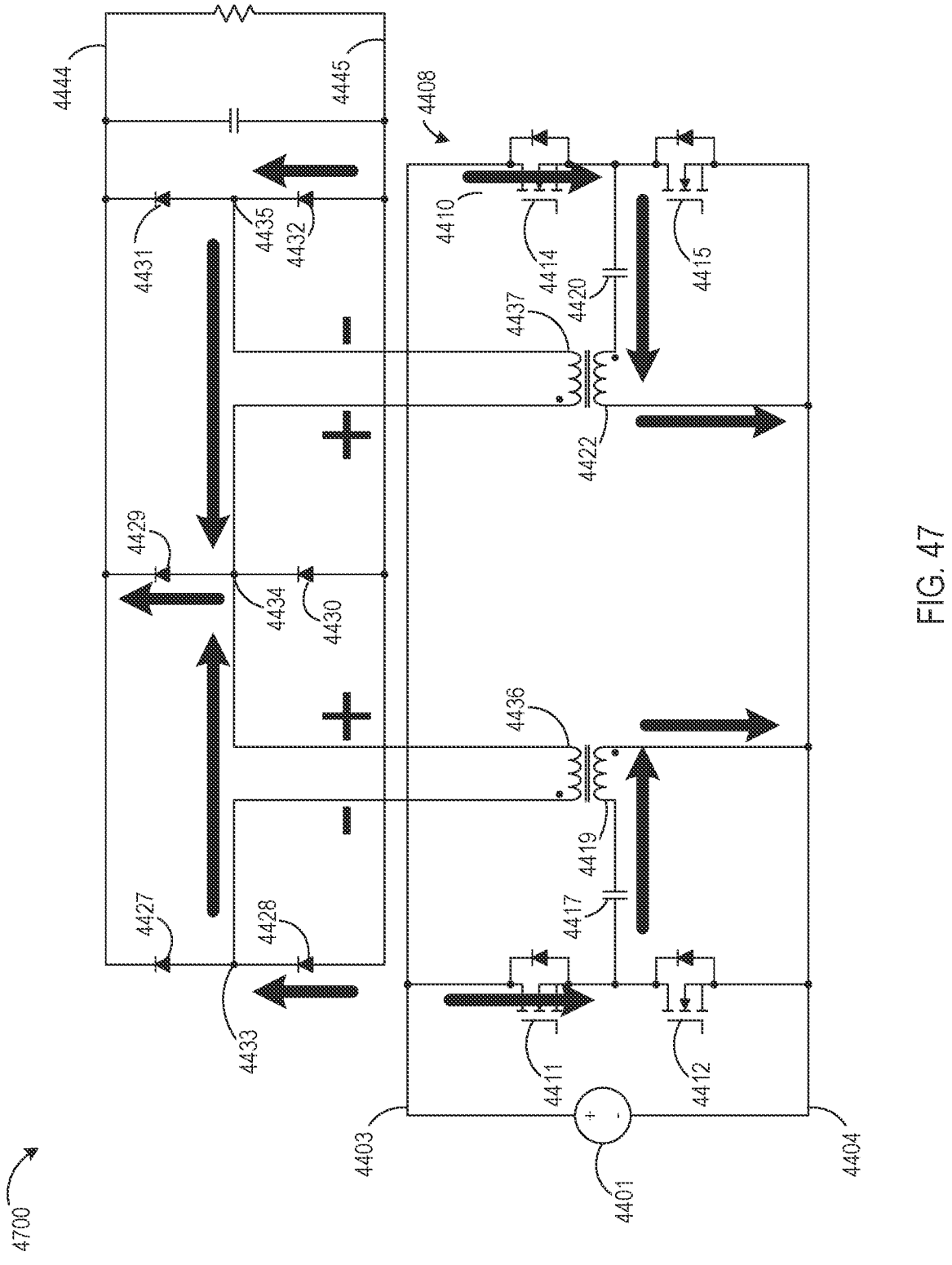
FIGS. 47 and 48 illustrate operational modes of the voltage converter of FIG. 44 during a second control scheme according to one or more embodiments.
Figure 48:
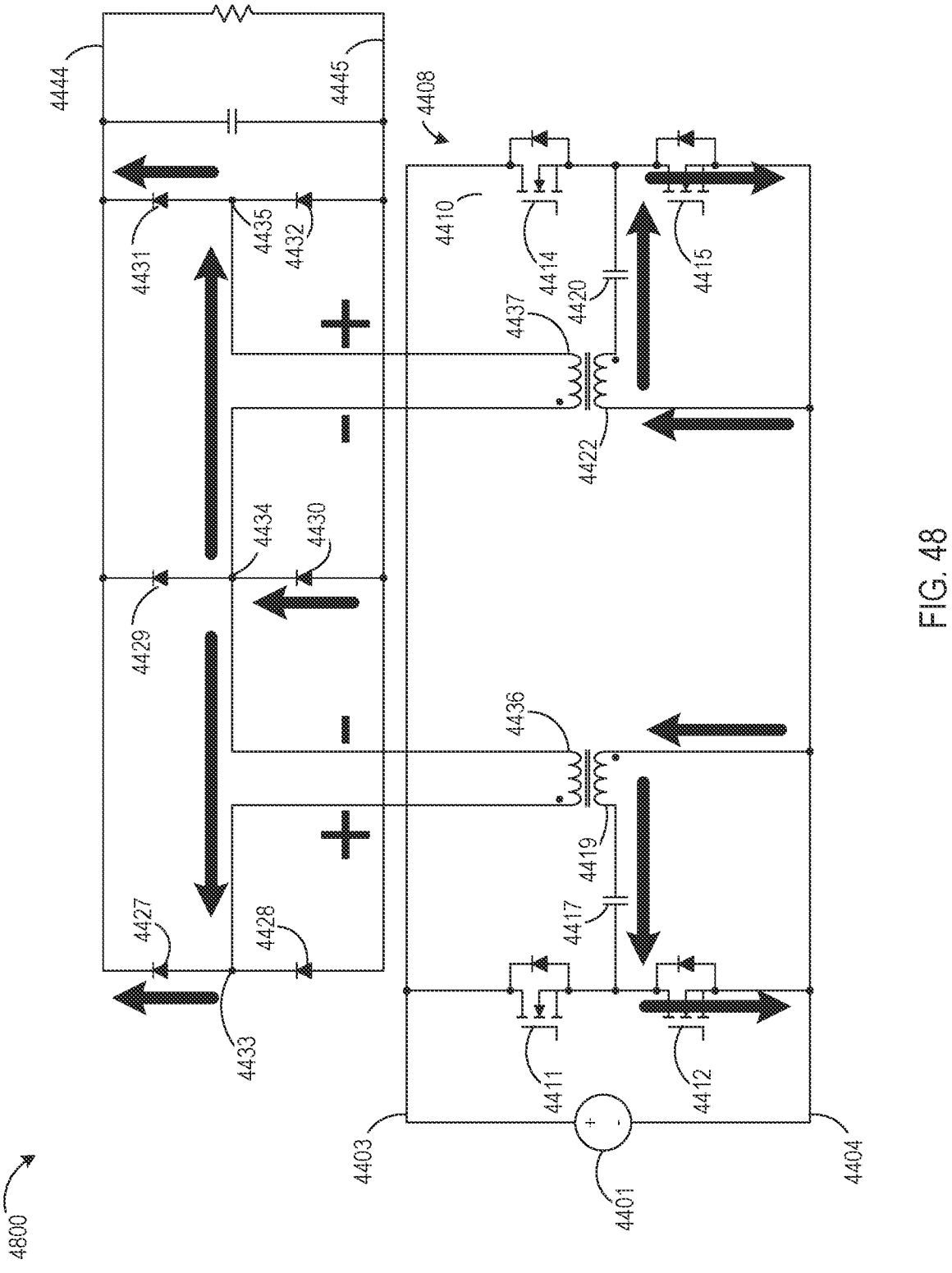

A second control scheme is illustrated in FIGS. 47 and 48 that show two operating modes 4700, 4800 of a half bridge operation (e.g., a half bridge current direction opposing operational control scheme) in which current flows through the primary windings 4419, 4422 of the transformers 4418, 4421 in opposite directions. In the first operating mode 4500 of FIG. 45, switching devices 4411, 4414 are controlled into their conducting modes, and switching devices 4412, 4415 are controlled into their non-conducting modes. In this manner, current from the voltage source 4401 flows through the primary winding 4419 from its non-dot end toward its dot end and through the primary winding 4422 from its dot end toward its non-dot end.

In this operating mode 4700, the current flows through the primary winding 4419 from its non-dot end toward its dot ends and through the primary winding 4422 from its dot end toward its non-dot end. In this manner, current in the secondary windings 4436, 4437 is caused to flow toward the common node 4434. As such, diode 4429 turns on to provide the voltage to the first output rail 4444. Diodes 4428, 4432 turn on to draw current from the second output rail 4445.

Similar to the operating modes 3500 and 4200, current in the secondary windings 4436, 4437 is caused to flow toward the common central node (e.g., common node 4434). As such, diode 4429 turns on to provide the voltage to the first output rail 4444. Diodes 4428, 4432 turn on to draw current from the second output rail 4445.

In the second operating mode 4800, switching devices 4412, 4415 are controlled into their conducting modes, and switching devices 4411, 4414 are controlled into their non-conducting modes. Accordingly, stored current in the primary winding 4419 flows from its dot end toward its non-dot end, and stored current in the primary winding 4422 flows from its non-dot end toward its dot end as shown. In response, current in the secondary windings 4436, 4437 is caused to flow away from the common central node (e.g., common node 4434). As such, diodes 4427, 4431 turn on to provide the voltage to the first output rail 4444, and diode 4430 turns on to draw current from the second output rail 4445.

Figure 49:
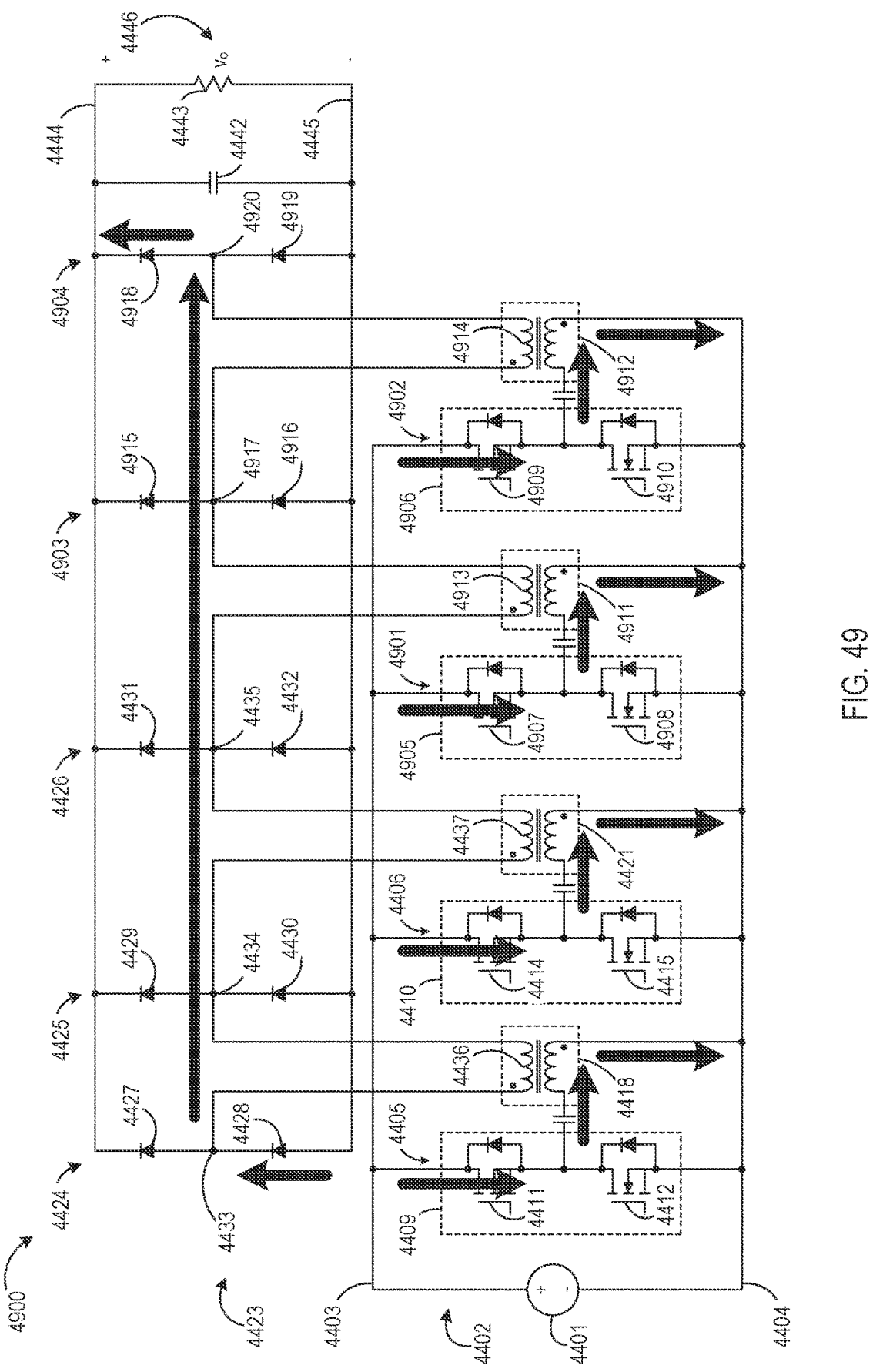
FIG. 49 is a schematic diagram of a voltage converter according to one or more embodiments.

The voltage converter 4900 shown in FIG. 49 expands the two-half-bridge parallel arrangement of FIG. 44 to illustrate expansion of both the primary side 4402 and the secondary side 4423 to include additional half bridges 4901, 4902 and diode legs 4903, 4904. Half bridges 4901, 4902 include switch assemblies 4905, 4906 with switching devices 4907-4910 and include transformer assemblies 4911, 4912 with secondary windings 4913, 4914. Diode legs 4903, 4904 include diodes 4915, 4916 serially coupled between the first and second output rails 4444, 4445 via a common node 4917 and diodes 4918, 4919 serially coupled between the first and second output rails 4444, 4445 via a common node 4920.

Each additional bridge/transformer configuration activated during operation adds a multiplier to the turns ratio of the voltage converter 4900. For example, effective turns ratios of N/4:1, N/3:1, N/2:1, and N:1 can be produced by activating four, three, two, or one of the configurations. For example, activation of the half bridges 4405, 4406, 4901, and 4902 as shown in FIG. 49 results in an effective turn ratio of N/4:1 as the current flows from the second output rail 4445 and through the diode 4428, through the four secondary windings 4436, 4437, 4913, 4914, and through the diode 4918. In another example, an effective turn ratio of N/3:1 may be generated by disactivating the half bridge 4902 while leaving the others activated. In response, the current will flow through the diode 4915 to the first output rail 4444 rather than through the diode 4918 as shown. Additional or fewer bridge/transformer/diode configurations may be included in the voltage converter 4900 as desired.

Figure 50:
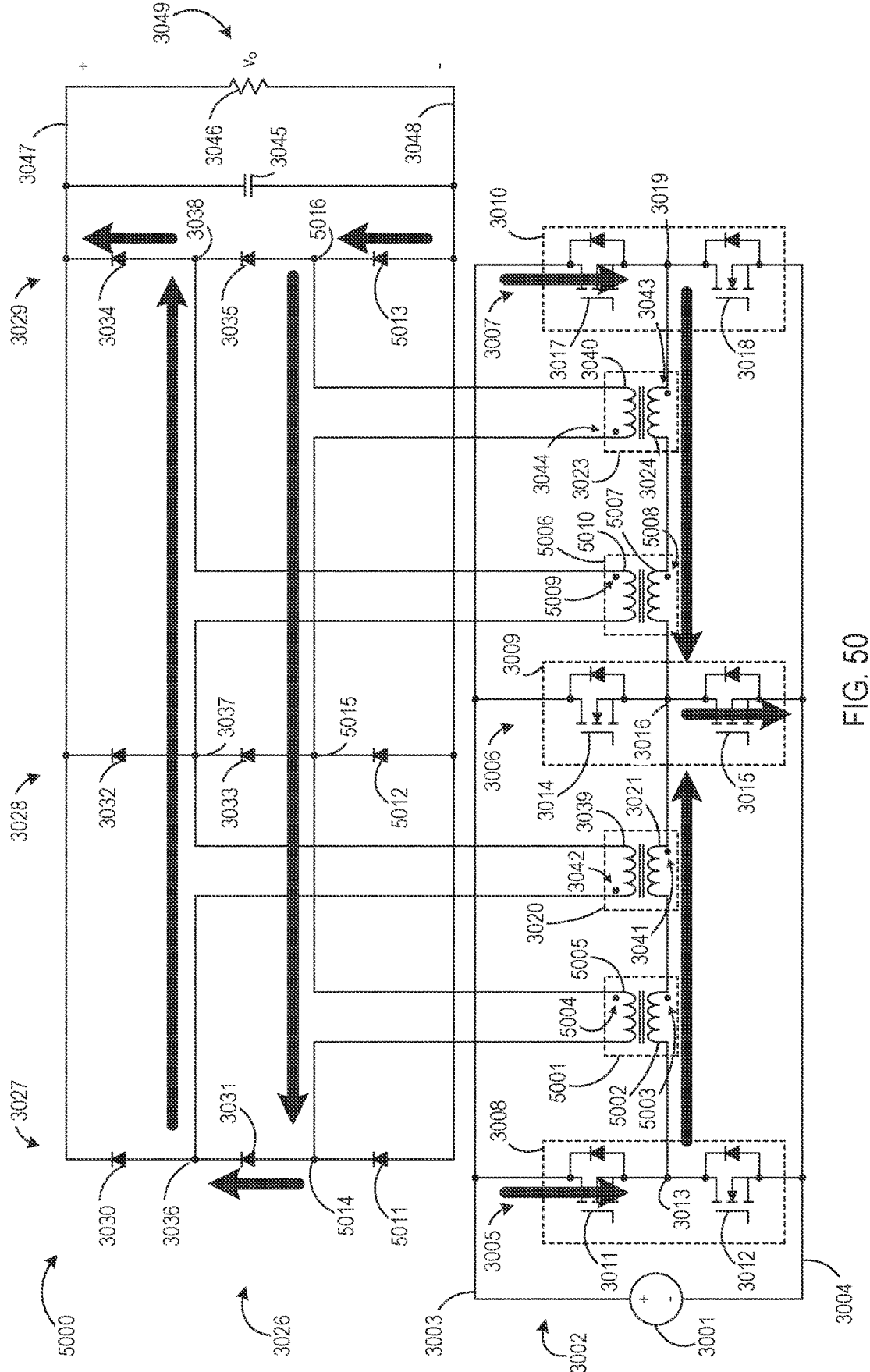
FIG. 50 is a schematic diagram of a voltage converter according to one or more embodiments.

The voltage converter 5000 shown in FIG. 50 is based on the voltage converter 3000 illustrated in FIG. 30 according to an example. The voltage converter 5000 includes an additional transformer assembly 5001 having a primary winding 5002 serially coupled between the primary winding 3021 of the first transformer assembly 3020 and the common node 3013. A dot end 5003 of the primary winding 5002 is on a same end of the transformer assembly 5001 as a dot end 5004 of the secondary winding 5005 of the transformer assembly 5001. Another transformer assembly 5006 has a primary winding 5007 serially coupled between the primary winding 3024 of the second transformer assembly 3023 and the common node 3016. A dot end 5008 of the primary winding 5007 is on a same end of the transformer assembly 5006 as a dot end 5009 of the secondary winding 5010 of the transformer assembly 5006.

The secondary side 3026 includes additional components as well. A third diode 5011-5013 is added to each diode leg 3027-3029. A respective common node 5014-5016 serially couples diode pairs 3031/5010, 3033/5011, and 3035/5012. The secondary winding 5005 is coupled between common nodes 5014, 5015, and the secondary winding 3039 is coupled between common nodes 3036, 3037. The secondary winding 5010 is coupled between common nodes 3037, 3038, and the secondary winding 3040 is coupled between common nodes 5015, 5016.

The current flows illustrated in the primary side 3002 that result from controlling the switch legs 3005-3007 as described in FIG. 35 result in the current flow shown in the secondary side 3026. Diodes 5013, 3031, 3034 pass the current therethrough while the voltages across the secondary windings 3040, 5005, 3039, 5010 sum in a serial manner.

Based on the configuration illustrated in FIG. 50, effective turns ratios of N/4:1 and N/2:1 can be produced by activating the switch legs 3005-3007 as shown and described with respect to FIGS. 35-40.

Advantages provided by the disclosed embodiments herein include being able to design transformers with very high efficiency and reduced hotspot. CM noise is low through dv/dt matching between primary and secondary windings. The distribution of heat dissipation by the four transformer circuits provides an advantage for low profile cold plate/liquid cooled approaches. One hardware design allows multiple products to address different market requirements reducing development time and cost. Finally, the embodiments herein provide high performance with regard to density and efficiency.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A power conversion apparatus comprising:

a voltage bus comprising a first rail and a second rail;

a plurality of switch legs coupled between the first rail and the second rail, each switch leg comprising a switch assembly;

a first resonant assembly coupled in series with a first transformer assembly, wherein the first resonant assembly and the first transformer assembly are coupled between a first switch leg of the plurality of switch legs and a second switch leg of the plurality of switch legs; and a second resonant assembly coupled in series with a second transformer assembly, wherein the second resonant assembly and the second resonant assembly are coupled between the second switch leg and a third switch leg of the plurality of switch legs.

2. The power conversion apparatus of claim 1, wherein:

the first switch leg comprises a first pair of switching devices coupled in series via a first common node between the first rail and the second rail;

the second switch leg comprises a second pair of switching devices coupled in series via a second common node between the first rail and the second rail; and the third switch leg comprises a third pair of switching devices coupled in series via a third common node between the first rail and the second rail.

3. The power conversion apparatus of claim 2, wherein:

the first resonant assembly and the first transformer assembly are coupled in series between the first common node and the second common node; and the second resonant assembly and the second transformer assembly are coupled in series between the second common node and the third common node.

4. The power conversion apparatus of claim 2, wherein each switching device of the first, second, and third switch legs comprises a MOSFET.

5. The power conversion apparatus of claim 2, wherein each switching device of the first, second, and third switch legs comprises a diode;

wherein the first switch leg further comprises:

a first MOSFET coupled with a first diode of the first pair of switching devices via a fourth common node and with the first rail; and a second MOSFET coupled with a second diode of the first pair of switching devices via a fifth common node and with the second rail;

wherein the second switch leg further comprises:

a third MOSFET coupled with a first diode of the second pair of switching devices via a sixth common node and with the first rail; and a fourth MOSFET coupled with a second diode of the second pair of switching devices via a seventh common node and with the second rail; and wherein the first switch leg further comprises:

a fifth MOSFET coupled with a first diode of the third pair of switching devices via an eighth common node and with the first rail; and a sixth MOSFET coupled with a second diode of the third pair of switching devices via a ninth common node and with the second rail.

6. The power conversion apparatus of claim 5, wherein:

the first resonant assembly and the first transformer assembly are coupled in series between the fourth common node and the sixth common node; and the second resonant assembly and the second transformer assembly are coupled in series between the sixth common node and the eighth common node.

7. The power conversion apparatus of claim 1, wherein:

the first resonant assembly is coupled with the first transformer assembly via a first common node;

the second resonant assembly is coupled with the second transformer assembly via a second common node; and the power conversion apparatus further comprises a parallel assembly coupled between the first and second common nodes, the parallel assembly comprising:

a pair of switching devices coupled in series; and an inductor coupled in series with the pair of switching devices.

8. The power conversion apparatus of claim 1, wherein the first transformer assembly comprises a first transformer coupled in series with a second transformer;

wherein the second transformer assembly comprises a third transformer coupled in series with a fourth transformer; and wherein each of the first, second, third, and fourth transformers comprises a primary winding and a secondary winding.

9. The power conversion apparatus of claim 8 further comprising an output diode assembly comprising:

a first diode bridge comprising:

an input coupled with the secondary winding of the first transformer;

a positive output; and a negative output;

a second diode bridge comprising:

an input coupled with the secondary winding of the second transformer;

a positive output; and a negative output;

a third diode bridge comprising:

an input coupled with the secondary winding of the third transformer;

a positive output; and a negative output;

a fourth diode bridge comprising:

an input coupled with the secondary winding of the fourth transformer;

a positive output; and a negative output.

10. The power conversion apparatus of claim 9, wherein:

the positive output of the first diode bridge is coupled with the positive output of the second diode bridge and with a load;

the negative output of the first diode bridge is coupled with the negative output of the second diode bridge, with the positive output of the third diode bridge and with the positive output of the fourth diode bridge; and the negative output of the third diode bridge is coupled with the negative output of the fourth diode bridge and with the load.

11. The power conversion apparatus of claim 9, wherein the positive outputs of each of the first, second, third, and fourth diode bridges are coupled together and with a load; and wherein the negative outputs of each of the first, second, third, and fourth diode bridges are coupled together and with the load.

12. The power conversion apparatus of claim 9, wherein:
the positive output of the first diode bridge is coupled with a load;
the positive output of the second diode bridge is coupled with the negative output of the first diode bridge;
the positive output of the third diode bridge is coupled with the negative output of the second diode bridge;
the positive output of the fourth diode bridge is coupled with the negative output of the third diode bridge; and
the negative output of the fourth diode bridge is coupled with the load.

13. The power conversion apparatus of claim 1, wherein the first transformer assembly comprises a first transformer;
wherein the second transformer assembly comprises a second transformer; and
wherein each of the first and second transformers comprises a primary winding and a secondary winding; and
further comprising a secondary side comprising:
a first diode switch leg comprising a pair of diodes serially coupled via a first common node;
a second diode switch leg comprising a pair of diodes serially coupled via a second common node; and
a third diode switch leg comprising a pair of diodes serially coupled via a third common node;
wherein the secondary winding of the first transformer is coupled between the first and second common nodes;
wherein the secondary winding of the second transformer is coupled between the second and third common nodes;
wherein a dot end of the primary winding of the first transformer is formed on an opposite side of the first transformer than a dot end of the secondary winding of the first transformer; and
wherein a dot end of the primary winding of the second transformer is formed on an opposite side of the second transformer than a dot end of the secondary winding of the second transformer.

14. A power converter comprising:
a voltage bus configured to receive a voltage from a power source, the voltage bus comprising a first rail and a second rail;
a first switch leg comprising a switch assembly coupled to the voltage bus;
a second switch leg comprising a switch assembly coupled to the voltage bus;
a third switch leg comprising a switch assembly coupled to the voltage bus;
a first resonant assembly and a first transformer assembly coupled in series between the first switch leg and the second switch leg;
a second resonant assembly and a second transformer assembly coupled in series between the second switch leg and the third switch leg; and
a controller coupled with the switch assemblies of the first, second, and third switch legs and configured to control the first, second, and third switch legs to generate a voltage in the first and second transformer assemblies based on the voltage from the power source.

15. The power converter of claim 14, wherein:
the switch assembly of the first switch leg comprises a first controllable switch coupled in series with a second controllable switch via a first common node;
the switch assembly of the second switch leg comprises a third controllable switch coupled in series with a fourth controllable switch via a second common node; and the switch assembly of the third switch leg comprises a fifth controllable switch coupled in series with a sixth controllable switch via a third common node.

16. The power converter of claim 15, wherein the controller is further configured to control the controllable switches according to a four-transformer-in-series full bridge operational control scheme, a two-transformer-in-series parallel half bridge operational control scheme, a two-transformer-in-series parallel full bridge operational control scheme, and a four-transformer-in-series half bridge operational control scheme.

17. The power converter of claim 15 wherein the controller is further configured to:
control the first controllable switch and the sixth controllable switch into conducting modes during a first operating mode;
control the second controllable switch and the fifth controllable switch into non-conducting modes during the first operating mode;
control the second controllable switch and the fifth controllable switch into conducting modes during a second operating mode;
control the first controllable switch and the sixth controllable switch into non-conducting modes during the second operating mode; and
control the third controllable switch and the fourth controllable switch into non-conducting modes during the first and second operating modes.

18. The power converter of claim 15 wherein the controller is further configured to:
control the first controllable switch, the fourth controllable switch, the fifth controllable switch into conducting modes during a first operating mode;
control the second controllable switch and the sixth controllable switch into non-conducting modes during the first operating mode;
control the second controllable switch, the fourth controllable switch, and the sixth controllable switch into conducting modes during a second operating mode;
control the first controllable switch and the fifth controllable switch into non-conducting modes during the second operating mode; and
control the third controllable switch into non-conducting modes during the first and second operating modes.

19. The power converter of claim 15 wherein the controller is further configured to:
control the first controllable switch, the fourth controllable switch, the fifth controllable switch into conducting modes during a first operating mode;
control the second controllable switch, the third controllable switch, and the sixth controllable switch into non-conducting modes during the first operating mode;
control the second controllable switch, the third controllable switch, and the sixth controllable switch into conducting modes during a second operating mode; and
control the first controllable switch, the fourth controllable switch, and the fifth controllable switch into non-conducting modes during the second operating mode.

20. The power converter of claim 15 wherein the controller is further configured to:
control the first controllable switch and the sixth controllable switch into conducting modes during a first operating mode;
control the second controllable switch into a non-conducting mode during the first operating mode;

control the second controllable switch and the sixth controllable switch into conducting modes during a second operating mode;

control the first controllable switch into a non-conducting mode during the second operating mode; and control the third controllable switch, the fourth controllable switch, and the fifth controllable switch into non-conducting modes during the first and second operating modes.

\* \* \* \* \*